US009465227B2

(12) United States Patent
Popovich et al.

(10) Patent No.: US 9,465,227 B2
(45) Date of Patent: Oct. 11, 2016

(54) LASER ILLUMINATION DEVICE

(71) Applicant: DIGILENS INC., Sunnyvale, CA (US)

(72) Inventors: Milan Momcilo Popovich, Leicester (GB); Jonathan David Waldern, Los Altos Hills, CA (US); John James Storey, Wallaton (GB)

(73) Assignee: DIGILENS, INC., Sunnyvale, CA (US)

( * ) Notice: Subject to any disclaimer, the term of this patent is extended or adjusted under 35 U.S.C. 154(b) by 0 days.

(21) Appl. No.: 14/986,287

(22) Filed: Dec. 31, 2015

(65) Prior Publication Data

US 2016/0124241 A1 May 5, 2016

Related U.S. Application Data

(63) Continuation of application No. 14/056,081, filed on Oct. 17, 2013, which is a continuation of application No. 13/549,868, filed on Jul. 16, 2012, now Pat. No. 8,565,560, which is a continuation of application No.

(Continued)

(30) Foreign Application Priority Data

Sep. 25, 2007 (GB) .................................... 0718706.5

(51) Int. Cl.
*G02B 6/34* (2006.01)
*G02B 27/48* (2006.01)
(Continued)

(52) U.S. Cl.
CPC ............ *G02B 27/48* (2013.01); *G02F 1/13342* (2013.01); *G03B 21/2033* (2013.01); *G02F 1/133606* (2013.01)

(58) Field of Classification Search
CPC ............. G02F 2201/307; G02F 6/124; G02F 1/0147; G02F 1/292; G02F 1/13471; G02F 1/134309; G02B 6/124; G02B 6/02085; G02B 6/12007; G03H 1/02; G11B 7/0065; G11B 7/24044
USPC .............. 385/10, 37, 7, 11; 349/202, 201, 2; 359/3, 15, 86, 22, 24, 618, 634; 23/454
See application file for complete search history.

(56) References Cited

U.S. PATENT DOCUMENTS 5,751,452 A    5/1998   Tanaka et al.
5,942,157 A    8/1999   Sutherland et al.
(Continued)

FOREIGN PATENT DOCUMENTS

DE     19751190 A1    5/1999
WO      9804650 A1    2/1998
WO   2007015141 A2    2/2007

OTHER PUBLICATIONS

Goodman, "Some Fundamental Properties of Speckle", J. Opt. Soc. Am. Nov. 1976, vol. 66, No. 11, pp. 1145-1150.
(Continued)

*Primary Examiner* — Ellen Kim
(74) *Attorney, Agent, or Firm* — Brooks Kushman P.C.

(57) ABSTRACT

An Electrically Switchable Bragg Grating (ESBG) despeckler device comprising at least one ESBG element recorded in a hPDLC sandwiched between transparent substrates to which transparent conductive coatings have been applied. At least one of said coatings is patterned to provide a two-dimensional array of independently switchable ESBG pixels. Each ESBG pixel has a first unique speckle state under said first applied voltage and a second unique speckle state under said second applied voltage.

20 Claims, 32 Drawing Sheets

Related U.S. Application Data

12/670,730, filed as application No. PCT/IB2008/001909 on Jul. 22, 2008, now Pat. No. 8,224,133.

(60) Provisional application No. 60/935,109, filed on Jul. 26, 2007.

(51) Int. Cl.
  *G02F 1/1334* (2006.01)
  *G03B 21/20* (2006.01)
  *G02F 1/1335* (2006.01)

(56) References Cited

U.S. PATENT DOCUMENTS

| | | | |
|---|---|---|---|
| 6,115,152 A * | 9/2000 | Popovich | G02B 5/32 353/30 |
| 7,139,109 B2 * | 11/2006 | Mukawa | G02B 5/32 359/15 |
| 7,356,224 B2 | 4/2008 | Levner et al. | |
| 7,583,423 B2 | 9/2009 | Sutherland et al. | |
| 2005/0254752 A1 | 11/2005 | Domash et al. | |
| 2007/0012777 A1 | 1/2007 | Tsikos et al. | |

OTHER PUBLICATIONS

Gabor, "Laser Speckle and Its Elimination", IBM Reserach and Development Sep. 1970, vol. 14, No. 5, pp. 509-514.

Born et al. "Optics of Crystals", Principles of Optics 5th Edition 1975, pp. 705-707.

Butler et al. "Diffractive Properties of Highly Birefringent Volume Gratings: Investigation", J. Opt. Soc. Am. B. Feb. 2002, vol. 19, No. 2, pp. 183-189.

Saleh et al., "Fourier Optics: 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.

Herman et al., "Production and Uses of Diffractionless Beams", J. opt. Soc. Am. A. Jun. 1991, vol. 8, No. 6, pp. 932-942.

McLeod, "Axicons and Their Uses", Journal of the Optical Society of America Feb. 1960, vol. 50, No. 2, pp. 166-169.

Trisnadi, "Hadamard Speckle Contrast Reduction", Optics Letters Jan. 1, 2004, vol. 29, No. 1, pp. 11-13.

Goodman, "Statistical Properties of Laser Speckle Patterns" Applied Physics 1975, vol. 9, Chapter 2, Laser Speckle and Related Phenomena, pp. 9-75.

* cited by examiner

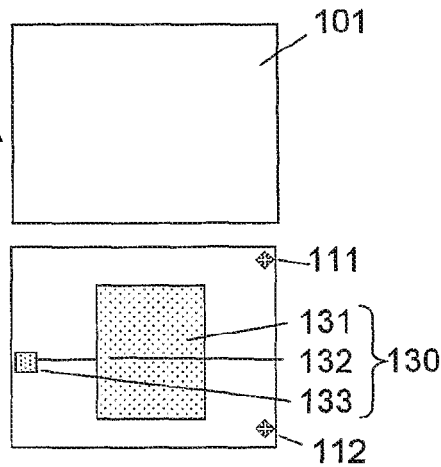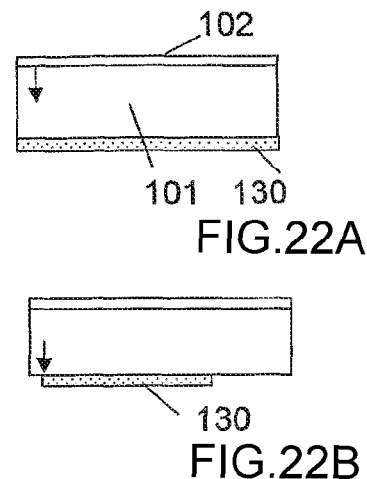

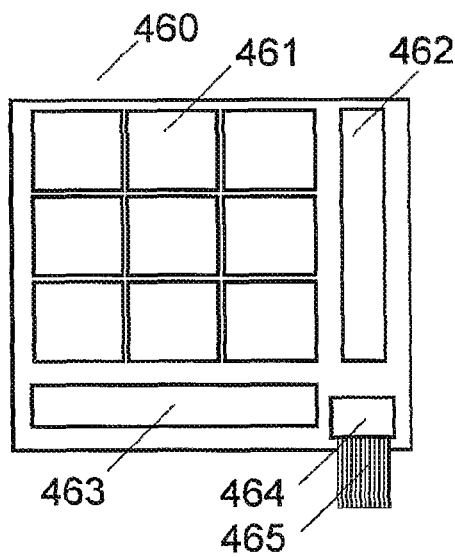
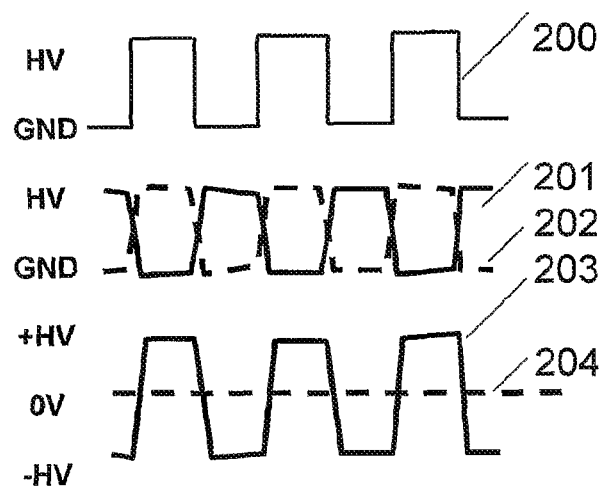
FIG.46    FIG.47
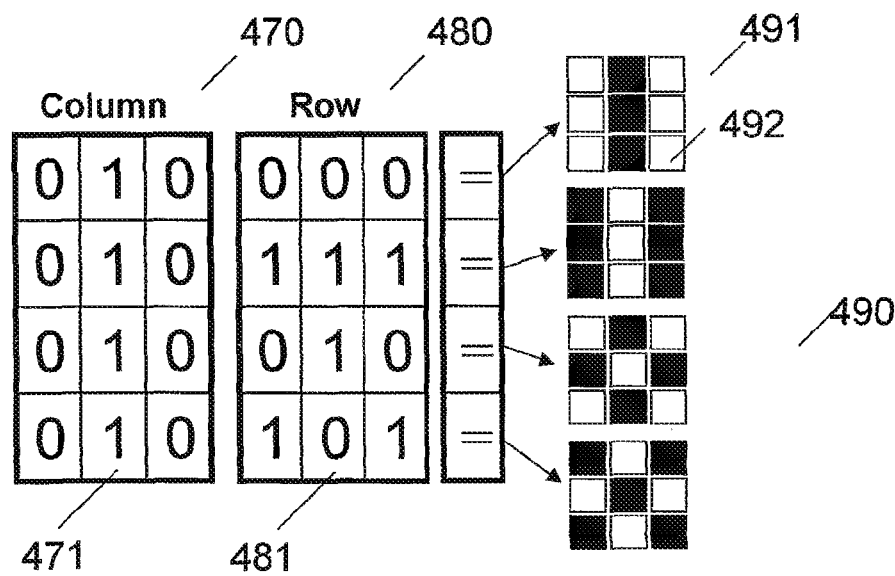
FIG.48

FIG. 64A
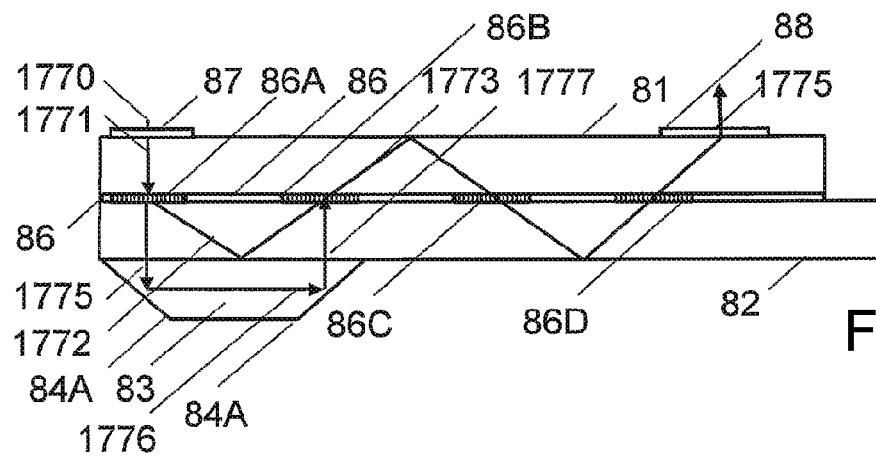
FIG. 64B
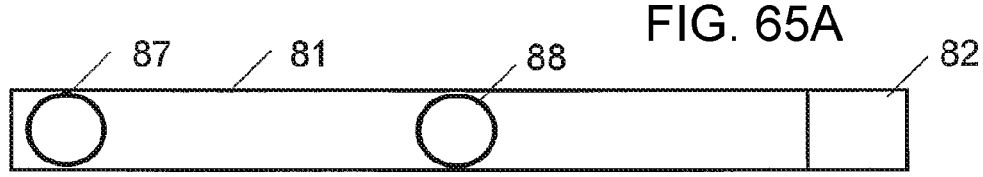
FIG. 65A
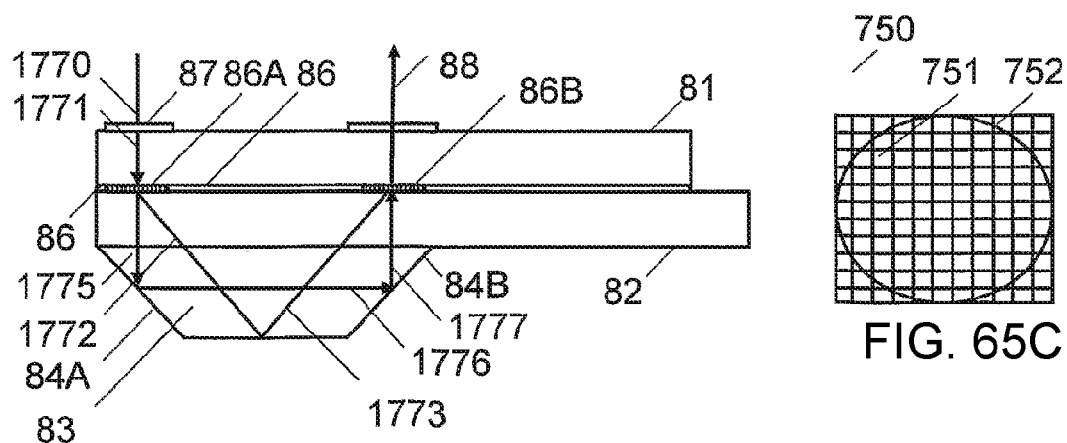
FIG. 65B
FIG. 65C

LASER ILLUMINATION DEVICE

CROSS-REFERENCE TO RELATED APPLICATIONS

This application is a Continuation of U.S. Ser. No. 14/056,081 filed Oct. 17, 2013, which is a Continuation of U.S. Ser. No. 13/549,868 filed Jul. 16, 2012, now U.S. Pat. No. 8,565,560, which is a Continuation of U.S. Ser. No. 12/670,730, filed Mar. 17, 2010, now U.S. Pat. No. 8,224,133, which is a 371 of International PCT/M2008/001909 filed Jul. 22, 2008, which claims the benefit of U.S. Provisional Application No. 60/935,109 filed Jul. 26, 2007, which claims priority to GB 0718706.5 filed Sep. 25, 2007. This application incorporates by reference in its entirety PCT US2006/043938 filed 13 Nov. 2006, which claims the benefit of U.S. provisional patent application 60/935,109 filed 26 Jul. 2007, entitled LASER DISPLAYS. This application incorporates by reference in their entireties U.S. provisional patent application Ser. Nos. 60/789,595 filed on 6 Apr. 2006, entitled METHOD AND APPARATUS FOR PROVIDING A TRANSPARENT DISPLAY. Ser. No. 61/071,230 filed 18 Apr. 2008, entitled SCROLLING ILLUMINATOR; Ser. No. 61/071,229 filed 18 Apr. 2008, entitled SCROLLING FLAT PANEL DISPLAY; and Ser. No. 61/071,232 filed 18 Apr. 2008 DUAL SCREEN PROJECTION DISPLAY 33. This application incorporates by reference in its entirety the United Kingdom patent application GB0718706.5 filed 25 Sep. 2007.

BACKGROUND OF THE INVENTION

The present invention relates to an illumination device, and more particularly to a laser illumination device based on electrically switchable Bragg gratings.

Miniature solid-state lasers are currently being considered for a range of display applications. The competitive advantage of lasers in display applications results from increased lifetime, lower cost, higher brightness and improved color gamut. As lasers are polarized, they are ideally suited to Liquid Crystal on Silicon (LCoS) or High Temperature Poly Silicon (HTPS) projectors. In contrast to incoherent sources, lasers do not result in light from unwanted polarization states being discarded.

Laser displays suffer from speckle, a sparkly or granular structure seen in uniformly illuminated rough surfaces. Speckle arises from the high spatial and temporal coherence of lasers. Speckle reduces image sharpness and is distracting to the viewer.

Several approaches for reducing speckle contrast have been proposed based on spatial and temporal decorrelation of speckle patterns. More precisely, speckle reduction is based on averaging multiple (M) sets of speckle patterns from a speckle surface resolution cell with the averaging taking place over the human eye integration time. The speckle resolution cell is essentially the smallest area of the image that the eye can resolve. Under optimal conditions speckle contrast is reduces from unity to the square root of M. The value of M should be as large as possible. However, the value of M is limited by the numerical aperture of the imaging optics. In other words the minimum cell size is approximately equal to the laser wavelength divided by the numerical aperture.

Speckle may be characterized by the parameter speckle contrast which is defined as the ratio of the standard deviation of the speckle intensity to the mean speckle intensity. Temporally varying the phase pattern faster than the eye temporal resolution destroys the light spatial coherence, thereby reducing the speckle contrast.

The basic statistical properties of speckle are discussed by J. W. Goodman in a first paper entitled "Some Fundamental Properties of Speckle" (J. Opt. Soc. Am. 66, pp. 1145-1149, 1976) and a second paper entitled "Statistical Properties of Laser Speckle Patterns" (Topics in Applied Physics volume 9, edited by J. C. Dainty, pp. 9-75, Springer-Verlag, Berlin Heidelberg, 1984).

There are two types of speckle: objective and subjective speckle. As noted in an article by D. Gabor in the IBM Journal of Research and Development, Volume 14, Number 5, Page 509 (1970) "Objective" speckle arises from the uneven illumination of an object with a multiplicity of waves that interfere at its surface. "Subjective" speckle arises at rough objects even if they are illuminated evenly by a single wave. In practical terms, objective speckle results from scattering in the illumination system while subjective speckle occurs at the projection screen. As its name implies objective speckle is not influenced by the viewer's perception of the displayed image. A photographic emulsion spread over the surface of the object would record all of the key characteristics of objective speckle. Even a perfect optical system cannot do better than to reproduce it exactly. Subjective speckle on the other hand arises by a diffraction effect at the receiving optics or, more exactly, by the limitation of the amount of light admitted into receiving optics (the eye, in the case of a display). The only remedy for subjective speckle is to widen the aperture of the receiving optics or to perform an equivalent optical process. This is due to fundamental information theory limitations and not any practical optical consideration.

The characteristics of objective and subjective speckle may be illustrated by considering a typical projection system. The illumination and beam shaping optics (for example components such as diffusers or fly's eye integrators) generates scattering that eventually creates a speckle pattern onto the microdisplay panel surface. The projection lens images this pattern onto the screen giving the objective speckle pattern. The screen takes the objective speckle pattern and scatters it into the viewing space. The human eye only collects a tiny portion of this light. Since the objective speckle acts like a coherent illumination field, the diffusion of the screen produces a new speckle pattern at the retina with a different speckle grain. This is the subjective speckle pattern. The subjective speckle pattern will be influenced by screen diffuser materials and lenticular structures and other features commonly used in screens. Since a well-designed projection lens usually collects most of the light transmitted through or reflected by the microdisplay panel, the objective speckle pattern generated is well reproduced at the screen, allowing for some modification due to optical aberrations. The cumulative speckle seen by the eye is the sum of the objective and subjective speckles.

Removing the objective speckle is relatively easy since the speckle pattern is well transferred from the illumination to the screen: any change in the illumination will be transferred to the screen. Traditionally, the simplest way has been to use a rotating diffuser that provides multiplicity of speckle patterns while maintaining a uniform a time-averaged intensity profile. This type of approach is often referred to as angle diversity. Note that, if the objective speckle is suppressed at the screen, it will be suppressed at every plane between the projection lens and the screen.

Suppression of subjective speckle is more difficult. Because of large disparity between the projection optics and eye optics numerical apertures (or F-numbers), the objective speckle grain is much larger than the subjective speckle grain. Therefore, the objective speckle provides a relatively uniform illumination to the screen within one resolution cell of the eye regardless of the position of the rotating diffuser or other speckle reduction means in the illumination path. For the purposes of quantifying the subjective speckle it is convenient to define the speckle contrast as the ratio of the resolution spots of the eye and the projection optic at the screen.

The characteristics of speckle depend on whether it is observed in the near or far field. The far field of an optical system is the angular spectrum of the plane waves traversing or generated by the optical system. In case of a diffractive optical element such as a Computer Generated Hologram (CGH), the far field is a series of points located in the two dimensional angular spectrum, each point representing the intensity of a specific plane wave diffracted, refracted, reflected or diffused at a specific angle. If only one beam strikes the optical element, no overlap of plane waves occurs, each plane wave being spatially demultiplexed in the far field. This is not the case for the near field. The far field effectively at infinity, which according to Rayleigh-Sommerfeld theory is any distance after a specific finite distance, which is a function of the size of the beam (that is, the effective aperture of the CGH), the wavelength, the size of the microstructures in the element (amount of beam deflection), and other factors. Therefore, in order to change the speckle pattern of an individual beamlet in the far field, it is best to use phase diversity. Angular diversity would not produce good results, since none of the wave fronts would be overlapping and interfering. However, phase diversity would create a different phase pattern on a single beamlet and this would change the speckle. Speckle patterns in the far field are characterized by very small-grained speckle structures.

In the near field (that is any location closer than the Rayleigh-Sommerfeld distance), many different wave fronts are interfere and overlap resulting in a very large amount of local wave front interference and hence speckle. Therefore, in order to reduce speckle in the near field, it is advantageous to make slight variations to the angles of the overlapping beamlets. In other words, angular diversity despeckling schemes will be the most effective. Speckle in the near field is characterized by larger grains. The different grain structure in the near and far fields can lead to the erroneous conclusion that Fresnel CGH (near field) gives less speckle than Fourier CGHs (far field). This is not the case; the nature of the speckle is different in the two cases.

The extent to which speckle can be corrected in the near and far fields has implications for the type of despecklers to be used in specific projector applications. In the case of a laser projector using traditional projection imaging apparatus, the image of a microdisplay is not in the far field of the despeckler, and thus angular diversity would be the most effective solution. In the case of a laser projector using diffractive imaging, the image is actually the far field of the microdisplay itself, and very close to the far field of the despeckler. Therefore, it is best to use a combination of angular diversity and phase diversity.

Techniques for speckle reduction are commonly classified into the categories of angular, phase and wavelength diversity according to the optical property used to generate the speckle patterns. Angular diversity typically relies on the use of rotating diffusers or vibrating screens. Phase diversity is typically provided by electrically controlled phase modulators. Wavelength diversity is provided by multiple laser sources or tunable single laser sources. In the case of laser arrays, speckle reduces as the inverse of the square root of the number of die. Mechanical methods of suppressing speckle suffer from the problems of noise, mechanical complexity and size.

It is known that speckle may be reduce by using an electro optic device to generate variation in the refractive index profile of material such that the phase fronts of light incident on the device are modulated in phase and or amplitude. The published Internal Patent Application No. WO/2007/015141 entitled LASER ILLUMINATOR discloses a despeckler based on a new type of electro optical device known as an Electrically Switchable Bragg Grating (ESBG).

An ESBG in its most basic form is formed by recording a volume phase grating, or hologram, in a polymer dispersed liquid crystal (PDLC) mixture. Typically, ESBG despeckler devices are fabricated by first placing a thin film of a mixture of photopolymerizable monomers and liquid crystal material between parallel glass plates. Techniques for making and filling glass cells are well known in the liquid crystal display industry. One or both glass plates support electrodes, typically transparent indium tin oxide films, for applying an electric field across the PDLC layer. A volume phase grating is then recorded by illuminating the liquid material with two mutually coherent laser beams, which interfere to form the desired grating structure. During the recording process, the monomers polymerize and the HPDLC mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the PDLC layer. When an electric field is applied to the hologram via transparent electrodes, the natural orientation of the LC droplets is changed causing the refractive index modulation of the fringes to reduce and the hologram diffraction efficiency to drop to very low levels. Note that the diffraction efficiency of the device can be adjusted, by means of the applied voltage, over a continuous range from near 100% efficiency with no voltage applied to essentially zero efficiency with a sufficiently high voltage applied. U.S. Pat. Nos. 5,942,157 and 5,751,452 describe monomer and liquid crystal material combinations suitable for fabricating ESBG despeckler devices. A publication by Butler et al. ("Diffractive properties of highly birefringent volume gratings: investigation", Journal of the Optical Society of America B, Volume 19 No. 2, February 2002) describes analytical methods useful to design ESBG despeckler devices and provides numerous references to prior publications describing the fabrication and application of ESBG despeckler devices.

The apparatus disclosed in Internal Patent Application No. WO/2007/015141 suffers from the problem that insufficient speckle states are produced using the ESBG configurations taught therein.

It is a first object of the present invention to provide an ESBG despeckler device that can overcome the problem of laser speckle.

It is a second object of the present invention to provide a compact, efficient laser display incorporating an ESBG despeckler device that can overcome the problem of laser speckle.

SUMMARY OF THE INVENTION

It is a first object of the present invention to provide an ESBG despeckler device that can overcome the problem of laser speckle.

It is a second object of the present invention to provide a compact, efficient laser display incorporating an ESBG despeckler device that can overcome the problem of laser speckle.

In a first embodiment of the invention there is provided an ESBG despeckler device comprising a least one ESBG element. Said ESBG element is recorded in a HPDLC sandwiched between transparent substrates to which transparent conductive coatings have been applied. At least one of said coatings is patterned to provide a two-dimensional array of independently switchable ESBG pixels. At least first and second voltages are applied across each ESBG element. Each ESBG element is characterized by a first unique speckle state under the first applied voltage and a second unique speckle state under the second applied voltage. The ESBG despeckler device is disposed along an illumination optical path.

The ESBG despeckler device is configured to modify the optical characteristics of incoming light to provide a set of speckle cells. Said first and second voltages are points on a time varying voltage characteristic wherein the voltage applied to each ESBG pixel is cyclically varied from zero to some specified maximum value at a high frequency. The effect of the varying voltage is to vary the optical effect of the ESBG despeckler device on incoming light in a corresponding fashion. In effect, the ESBG despeckler device generates a multiplicity of different speckle patterns within the human eye integration time. A human eye observing the display integrates said patterns to provide a substantially de-speckled final image.

In one embodiment of the invention the ESBG despeckler devices are configured using two ESBG elements disposed in sequence. The ESBG elements are operated in tandem with alternating voltages applied across the ESBG pixels. The optical effect of each ESBG pixel is varied from zero to maximum value at a high frequency by applying an electric field that varies in a corresponding varying fashion. Each incremental change in the applied voltage results in a unique speckle phase cell.

In one embodiment of the invention the ESBG despeckler device comprises identical first and second ESBG arrays and the waveforms applied to overlapping elements of said first and second ESBG arrays operate in anti-phase.

In one embodiment of the invention the ESBG despeckler device comprises identical first and second ESBG arrays and said second ESBG array is rotated through 180 degrees with respect to said first ESBG array.

In one embodiment of the invention the ESBG despeckler device comprises at least one ESBG element recorded using a Computer Generated Hologram (CGH). The CGH has a first surface and a second surface wherein said CGH is designed to convert a laser beam incident at said first surface into a multiplicity of beams from said second surface wherein each beam has a unique direction in space and a diffusion angle, wherein said beams have single point of origin.

In one embodiment of the invention the ESBG despeckler device comprises at least one ESBG element recorded using a CGH). The CGH has a first surface and a second surface wherein said CGH is designed to convert a laser beam incident at said first surface into a multiplicity of beams from said second surface wherein each beam has a unique direction in space and a diffusion angle, wherein said beams have points of origin equally spaced around the periphery of said CGH.

In one embodiment of the invention the ESBG despeckler device comprises at least one ESBG element recorded using a CGH. The CGH comprises an array of diffracting elements. Each said diffracting elements is characterized by a unique light diffusion function.

In one embodiment of the invention the ESBG despeckler device comprises identical first and second ESBG arrays each containing selectively switchable ESBG pixels.

In one embodiment of the invention the ESBG despeckler device comprises identical first and second ESBG arrays containing selectively switchable ESBG pixels. Each ESBG pixel is characterized by a unique grating vector.

In one embodiment of the invention in which the ESBG despeckler device comprises identical first and second ESBG arrays containing selectively switchable ESBG pixels each said ESBG pixel converts incident collimated light into divergent light.

In one embodiment of the invention in which the ESBG despeckler device comprises identical first and second ESBG arrays containing selectively switchable ESBG pixels each ESBG pixel converts incident light into diffuse light.

In one embodiment of the invention in which the ESBG despeckler device comprises identical first and second ESBG arrays containing selectively switchable ESBG pixels and at least one of the ESBG arrays provides a set of Hadamard diffusers.

In one embodiment of the invention the ESBG despeckler device stack of similarly configured ESBG arrays.

In one embodiment of the invention the ESBG despeckler device comprises a stack of ESBG arrays designed to operate on red, green or blue light.

In one embodiment of the invention the ESBG despeckler device comprises ESBG arrays disposed adjacent to each other in a plane.

In one embodiment of the invention in which the ESBG despeckler device comprises identical first and second ESBG arrays containing selectively switchable ESBG pixels the ESBG pixels substantially overlap in the illumination beam cross section.

In one embodiment of the invention in which the ESBG despeckler device comprises identical first and second ESBG arrays containing selectively switchable ESBG pixels the ESBG pixels are offset by a fraction of the ESBG element width in at least one of the vertical or horizontal array axes in the illumination beam cross section.

In one embodiment of the invention in which the ESBG despeckler device comprises identical first and second ESBG arrays containing selectively switchable ESBG pixels the ESBG pixels are offset by a integer number of ESBG element width in at least one of the vertical or horizontal array axes in the illumination beam cross section.

In one embodiment of the invention the ESBG despeckler device further comprises a diffractive optical element for converting incident off axis light into a direction normal to the surfaces of the ESBG despeckler device.

In one embodiment of the invention the ESBG despeckler device further comprises a diffractive illumination profile shaping element.

In one embodiment of the invention the ESBG despeckler device further comprises an electrically controllable phase modulator operative to provide phase retardation.

In one embodiment of the invention the ESBG despeckler further comprises an electro-optical polarization switch providing a phase shift of 0 or $\pi$ radians. The polarization switch may be a sub wavelength grating. The polarization switch is randomly switched with respect to the pixelated diffuser.

In one embodiment of the invention the ESBG despeckler device comprises at least one ESBG element wherein said ESBG element has a first phase retarding characteristic under a first voltage and a second phase retarding characteristic under a second voltage.

In one embodiment of the invention the ESBG despeckler device comprises at least one ESBG element wherein said ESBG element has a first light diffusing characteristic under a first voltage and a second light diffusing characteristic under a second voltage.

In one embodiment of the invention the ESBG despeckler device comprises at least one ESBG element which encodes the optical characteristics of an axicon.

In one embodiment of the invention the ESBG despeckler device comprises at least one ESBG element which encodes the optical characteristics of a sub wavelength grating phase retarder.

In one embodiment of the invention the ESBG despeckler device comprises at least one ESBG element which encodes the optical characteristics of a diffuser.

In one embodiment of the invention the ESBG despeckler device comprises a stack of three ESBG elements each having substantially the same optical function but designed to operate on red, green and blue light respectively.

In one embodiment of the invention the ESBG despeckler device comprises at least one ESBG element configured as either a variable diffuser a variable subwavelength grating or a variable axicon.

In one embodiment of the invention the ESBG despeckler device comprises red, green and blue ESBG elements disposed adjacent to each other.

In one embodiment of the invention there is provided a despeckler comprising a first ESBG array a second ESBG array and a DOE. The ESBG arrays are operated in antiphase. The ESBG arrays and the DOE are aligned with their surface orthogonal to an optical axis. The DOE directs on-axis incident laser light into an off-axis direction. The first and second ESBG arrays each deflect incident off-axis light into an on-axis direction. Said DOE may be a holographic element such as a Bragg hologram, Said DOE may be a ESBG In one embodiment of the invention there is provided a despeckler comprising a first ESBG array a second ESBG array and a Diffractive Optical Element (DOE). The ESBG arrays and the DOE are aligned with their surface orthogonal to an optical axis. The DOE directs off axis incident laser light into a direction parallel to said optical axis. The first ESBG device deflects incident on-axis light into an off axis direction. The second ESBG device deflects light incident in said off-axis direction light into an on-axis direction.

In one embodiment of the invention there is provided a despeckler comprising a first ESBG array a second ESBG array and a DOE. The ESBG arrays and the DOE are aligned with their surface orthogonal to an optical axis. The DOE directs on-axis incident laser light into an off-axis direction. The first and second ESBG devices are each operative to deflect incident off-axis light into an on-axis direction.

In one embodiment of the invention there is provided an ESBG despeckler device comprising an array in which the ESBG pixels encode diffusion characteristics.

In one embodiment of the invention there is provided an ESBG despeckler device comprising an array in which the ESBG pixels encode keystone correction.

In one embodiment of the invention the ESBG despeckler device comprises at least one ESBG element recorded by means of an apparatus comprise a laser source, a beam expanding lens system, a beam splitter, a mirror, a second lens, a computer generated hologram (CGH) and a cell containing the HPDLC mixture into which the ESBG is recorded. The CGH is designed to generate a set of beamlets from a single input beam.

In one embodiment of the invention there is provided ESBG despeckler device comprising two ESBG arrays configured to provide switchable optical path differences wherein the ESBG pixels substantially overlap. The pixels of the first ESBG array deflect normally incident collimated light through a specified angle. The pixels of the second ESBG array diffract incident light at said angle into direction normal to the second ESBG array. When the ESBG pixels are not in their diffracting states incident light is transmitted without substantial deviation. The lateral displacement of the beam when the ESBG pixels are in a diffracting state results in an optical path difference given by the product of the separation of the ESBG arrays, the average refractive index of the optical path between the arrays and the tangent of the diffraction angle.

In one embodiment of the invention there is provided an ESBG despeckler device in comprising three ESBG arrays configured to provide switchable optical path differences. The apparatus comprises three ESBG arrays aligned in series along an optical axis. The pixels of the first ESBG array deflects normally incident collimated light through a first angle. The pixels of second ESBG diffracts incident light at said first angle into a direction parallel to the axis. The pixels of the third ESBG array diffract light incident at said first angle such into a direction parallel to the optical axis. When the ESBG arrays pixels are not in their diffracting states incident light is transmitted without substantial deviation. When the second and third ESBG array pixels are not in their diffracting states the diffracted light is transmitted without deviation. The lateral displacement of the incident light when the ESBG array pixels are in a diffracting state results in an optical path difference given by the product of the separation of first and second ESBG arrays or second and third ESBG arrays, the average refractive index of the optical path between said gratings and the tangent of the diffraction angle.

In one embodiment of the invention there is provided a method of fabricating an ESBG array for use in the invention comprising the following steps:
  a first step in which a substrate to which a transparent electrode layer has been applied is provided;
  a second step in which portions of said transparent electrode layer are removed to provide a patterned electrode layer including at least one ESBG pixel pad;
  a third step in which a layer of UV absorbing dielectric material is deposited over said patterned electrode layer;
  a fourth step in which the portion of said UV absorbing dielectric material overlapping said ESBG pixel pad is removed;
  a fifth step in which a second substrate to which a transparent electrode layer has been applied is provided;
  a sixth step in which the transparent electrode layer of the second substrate layer is etched to provide a patterned electrode layer including a second ESBG pixel pad substantially identical to and spatially corresponding with the first ESBG pixel pad;
  a seventh step in which the two substrates processed according to the above steps are combined to form a cell with the electrode coated surfaces of the two cells aligned in opposing directions and having a small separation;

an eight step in which the cell is filled with a PDLC mixture;

a ninth step in which the cell face formed by the first substrate is illuminated by crossed UV laser beams, and simultaneously the cell face formed by the second is illuminated by an incoherent UV source forming an HPDLC region confined to the region between the first and second ESBG pixels and surrounded by a PDLC region.

In one embodiment of the invention there is provided a laser display comprising at least one laser die, a flat panel display, a projection lens and an ESBG despeckler device disposed along the path of the beam emitted by said laser. A variable voltage generator is coupled to the ESBG despeckler device.

In one embodiment of the invention there is provided a laser display according to the principles of the invention comprises a multiplicity of laser emitter die configured as a two dimensional array, a flat panel display, a projection lens and an ESBG despeckler device disposed along the path of the beam emitted by said laser. A variable voltage generator is coupled to the ESBG despeckler device.

In one embodiment of the invention a laser display further comprises an optical element disposed along the laser beam paths for shaping the intensity profile and cross sectional geometry of the illuminator beam.

In one embodiment of the invention a laser display further comprises a light integrator pipe may be disposed in the light path after the ESBG despeckler device.

In one embodiment of the invention a laser display further comprises a micro lens element may be disposed between the laser die and the ESBG despeckler device.

In an alternative embodiment of the invention the ESBG despeckler device is disposed between the flat panel display and the projection lens.

In a further embodiment of the invention the ESBG despeckler device is disposed within a projection lens.

In one embodiment of the invention a laser display further comprises a diffractive beam steering element disposed between the laser source and the ESBG despeckler device.

In one embodiment of the invention directed at providing color sequential red green and blue laser illumination there are provided separated red, green and blue laser modules each comprising at least one laser source, beam expansion and collimation lens system and an ESBG despeckler device further comprising a first ESBG array and a second ESBG array. The red green and blue beams are reflected into a common direction by means of dichroic filter. The reflected beams directed towards a display panel. A projection lens projects an image of the display panel onto a screen.

In a further embodiment of the invention there is provided an edge illuminator comprising an ESBG despeckler device wherein the substrates of the ESBG despeckler device provide a total internal reflection (TIR) light guiding structure. An input light-coupling optical element provides a means for injecting light from a laser source into the light guiding structure. An output light-coupling optical element provides a means for ejecting light from the light guide into an illumination path directed at a flat panel display.

In a further embodiment of the invention there is provided an edge illuminator comprising an ESBG despeckler device. The ESBG despeckler device comprises two or more ESBG layers. The substrates of the ESBG layers together form a TIR light guiding structure.

In a further embodiment of the invention there is provided a scrolling edge illuminator comprising an ESBG despeckler device wherein the substrates of the ESBG despeckler device provide a TIR light guiding structure. The ESBG despeckler device comprises at least one ESBG element. At least one ESBG element has electrodes are divided into a number of parallel.

In a further embodiment of the invention there is provide an edge lit ESBG despeckler device that also performs the function of a spatial light modulator.

In a further embodiment of the invention there is provided an edge illuminator comprising an ESBG despeckler device wherein the substrates of the ESBG despeckler device provide a TIR light guiding structure and further comprising a second trapezoidal light guiding structure disposed adjacent the ESBG substrates. The ESBG despeckler device contains ESBG portions for coupling light into and out of said second light guiding structure.

A more complete understanding of the invention can be obtained by considering the following detailed description in conjunction with the accompanying drawings wherein like index numerals indicate like parts. For purposes of clarity details relating to technical material that is known in the technical fields related to the invention have not been described in detail.

BRIEF DESCRIPTION OF THE DRAWINGS

FIG. 21A-21F is a series of schematic front elevation views of an ESBG element at successive stages in its fabrication according to the basic principles of invention.

FIG. 22A-22E shows a series of schematic side elevation views of an ESBG element at successive stages in its fabrication according to the basic principles of the invention.

FIG. 46 is a schematic front elevation view of the 3×3 ESBG array module used in one embodiment of the invention.

FIG. 47 is a chart illustrating the waveform applied to the ESBG in one embodiment of the invention.

FIG. 48 is a table illustrating a typical speckle sample generating process used in the embodiment of FIG. 46.

FIG. 64A is a schematic plan view of an embodiment of the invention that uses path switchable light guiding structure.

FIG. 64B is a schematic side elevation view of an embodiment of the invention that uses path switchable light guiding structure.

FIG. 65A is a schematic plan view of another embodiment of the invention that uses path switchable light guiding structure.

FIG. 65B is a schematic side elevation view of another embodiment of the invention that uses path switchable light guiding structure.

FIG. 65C is a schematic front elevation view of an aspect of another embodiment of the invention that uses path switchable light guiding structure.

DETAILED DESCRIPTION OF THE INVENTION

It is a first object of the present invention to provide an ESBG despeckler device that can overcome the problem of laser speckle.

It is a second object of the present invention to provide a compact, efficient laser display incorporating an ESBG despeckler device that can overcome the problem of laser speckle.

To assist in clarifying the basic principles of the despeckler device the invention will be described in relation to a practical laser display which comprises a laser source comprising one or more red, green or blue laser die, a flat panel microdisplay and projection optics. It will be clear that the despeckler embodiment to be described is not restricted to application in laser display configurations of the type described.

For the purposes of explaining the invention an ESBG despeckler device will be understood to comprise one or more ESBGs layers or cells each comprising an ESBG encapsulated between parallel transparent glass walls according to the principles to be discussed below. In some cases an ESBG layer or cell may simply be referred to as an ESBG. An ESBG array will refer to an ESBG with switching electrodes patterned such that individual ESBG pixels can be switched selectively.

It will be apparent to those skilled in the art that the present invention may be practiced with only some or all aspects of the present invention as disclosed in the following description. For the purposes of explaining the invention well-known features of laser technology and laser displays have been omitted or simplified in order not to obscure the basic principles of the invention.

Parts of the following description will be presented using terminology commonly employed by those skilled in the art of optics and laser displays in particular.

It should also be noted that in the following description of the invention repeated usage of the phrase "in one embodiment" does not necessarily refer to the same embodiment.

Figure 1A:
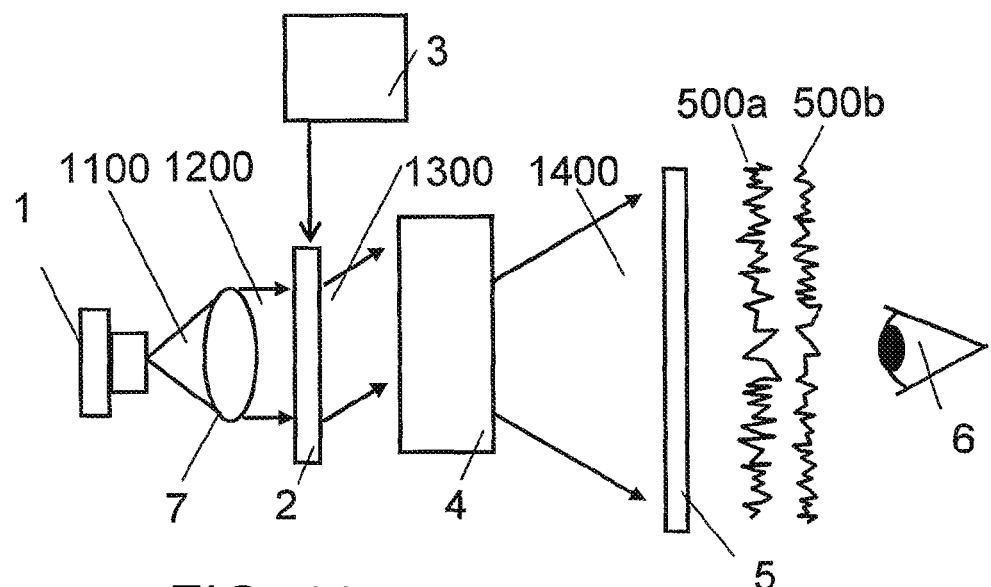
FIGS. 1A and 1B is a schematic side elevation view of a laser display according to one embodiment of the invention.

FIG. 1A shows a schematic side elevation view of one embodiment of the invention in which a laser display comprises a laser source 1 and an Electrically Switchable Bragg Grating (ESBG) device 2, which is disposed along the laser beam path and a projection optical system generally indicated by 4. The laser source 1 comprises at least a single laser emitter die providing monochromatic light. The ESBG drive electronics are indicated by 3. The laser and ESBG despeckler device form part of an apparatus for illuminating an electronic display to provide a viewable image. The projection optical system may comprise an electronic display panel such as an LCD, a projection lens, and relay optics for coupling the ESBG despeckler device to the display panel, filters, prisms, polarizers and other optical elements commonly used in displays. The final image is projected onto a projection screen 5. A lens 7 may be used to convert diverging laser emission light 1100 into a collimated beam 1200. The collimated beam is diffracted into a direction 1300 by the ESBG despeckler device. The optical system 4 forms a diverging beam 1400, which illuminates the screen 5. The details of the projection optical system do not form part of the invention. The invention is not restricted to any particular type of display configuration. At least one viewable surface illuminated by the laser light exhibits laser speckle. Said viewable surface may be at least one of the projection screen 5 or an internal optical surface within the projection optical system. Although a rear projection screen is illustrated in FIG. 1A the invention may also be used in front projection.

The invention is not restricted to the projection of information displayed on an electronic display panel. The invention may also be applied to reducing speckle in laser scanner displays in which the projection optical system would typically comprised beam scanning components and light modulators well known to those skilled in the art of scanned laser displays. Although in FIG. 1A the ESBG despeckler device is disposed between the lens 7 and the projection optical system 4, the invention does not assume any particular location for the ESBG. Advantageously, the ESBG despeckler device is located in a collimated beam path to provide high diffraction efficiency.

An ESBG despeckler device according to the principles of the invention typically comprises at least one ESBG element. Each ESBG layer has a diffracting state and a non-diffracting state. Typically, the ESBG element is configured with its cell walls perpendicular to an optical axis. An ESBG element diffracts incident off-axis light in a direction substantially parallel to the optical axis when in said active state. However, each ESBG element is substantially transparent to said light when in said inactive state. An ESBG element can be designed to diffract at least one wavelength of red, green or blue light. In the embodiments to be discussed in the following description of the invention at least one ESBG layer in the ESBG despeckler device is configured as an array of selectively switchable ESBG pixels.

ESBG despeckler devices for reducing speckle according to the principles of the present invention are configured to generate set of unique speckle patterns within an eye resolution cell by operating on the angular and/or phase characteristic of rays propagating through the ESBG despeckler device. The ESBG despeckler devices disclosed herein may be used to overcome both objective and subjective speckle.

As will be explained below, in any of the embodiments of the invention the ESBG despeckler device may comprise more than one ESBG layer fabricated according to the principles described above. Furthermore, the ESBG despeckler device may be configured in several different ways to operate on one or more of the phase, and ray angular characteristics of incoming light.

Varying the electric field applied across the ESBG despeckler device varies the optical effect of the ESBG despeckler device by changing the refractive index modulation of the grating. Said optical effect could be a change in phase or a change in beam intensity or a combination of both. The optical effect of the ESBG despeckler device is varied from zero to a predetermined maximum value at a high frequency by applying an electric field that varies in a corresponding varying fashion. Said variation may follow sinusoidal, triangular, rectangular or other types of regular waveforms. Alternatively, the waveform may have random characteristics. Each incremental change in the applied voltage results in a unique speckle phase cell. A human eye 5 observing the display of FIG. 1A integrates speckle patterns such as those illustrated by 500a, 500b to provide a substantially de-speckled final image.

Figure 1B:
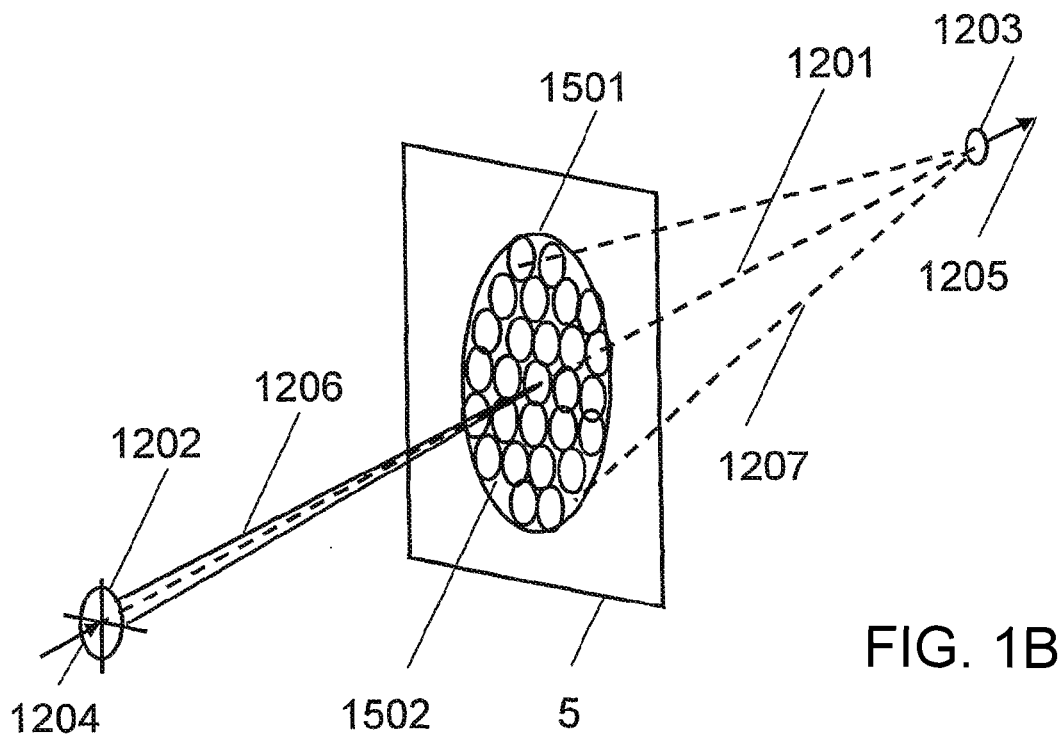

The basic principles of speckle reduction using angular diversity are illustrated schematically in FIG. 1B. The projection beam axis and the eye line of sight are assumed to lie on a common optical axis indicated by 1201. The exit pupil of the projection systems is indicated by 1202 and the entrance pupil of the eye is indicated by 1203. The diameters of the projection and eye pupils are $D_1$ and $D_2$ respectively and the projection and eye pupils are located at distances of $R_1$ and $R_2$ respectively from a transmissive screen 5. The projection light indicated by 1204 is provided by an optical system such as the one illustrated in FIG. 1A. The light detected by eye indicated by 1203 is imaged onto the retina. In order for the eye to detect the optimum speckle reduction the eye must resolve the laser illuminated area into resolution spots having a resolution spot size indicated by 1501 which is greater than or approximately equal to a speckle surface resolution cell such as the one indicated by 1502 For light of wavelength λ the diameter of the eye resolution spot is given by the Airy point spread function diameter $2.44\lambda R_1/D_1$. The diameter of the speckle resolution cell such as 1501 is given by $2.44\lambda R_2/D_2$. Temporally varying the phase pattern faster than the eye temporal resolution destroys the light spatial coherence, thereby reducing the speckle contrast.

Figure 2:
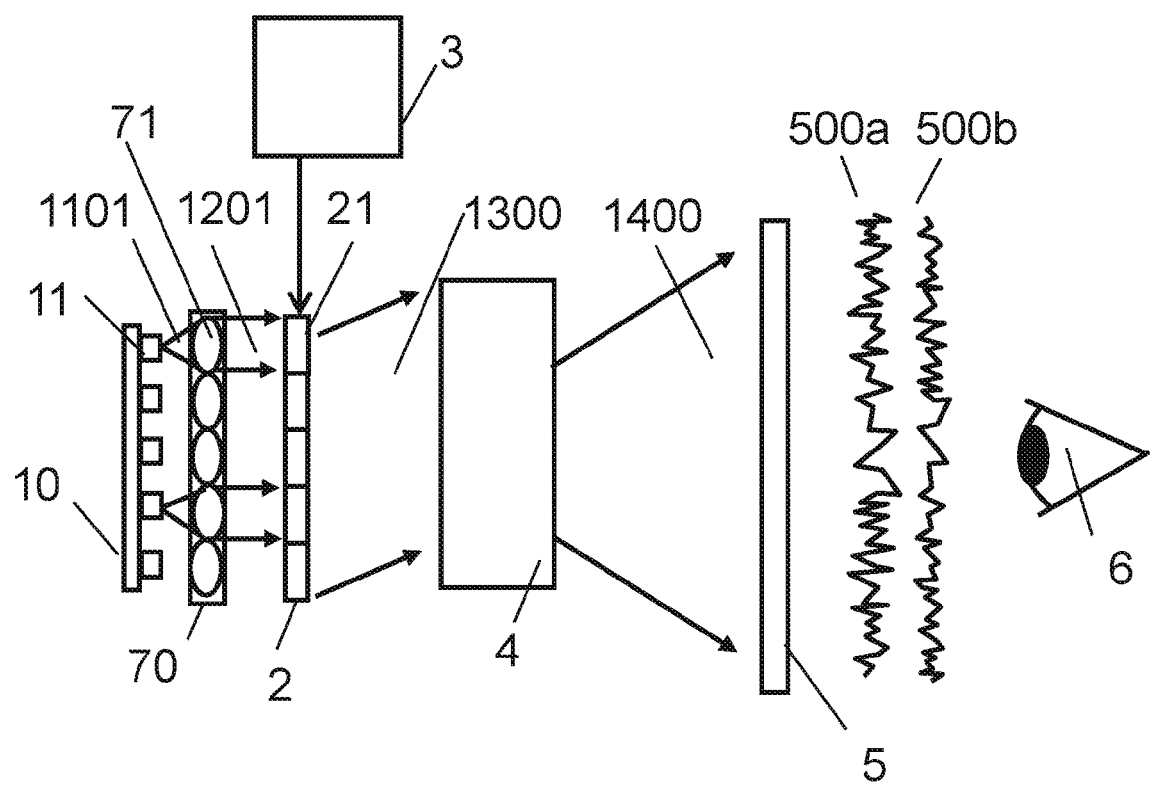
FIG. 2 is a schematic side elevation view of a laser display according to one embodiment of the invention.

The invention does not assume any particular type of laser or laser configuration. The laser source may be a single die or an array of die. In one embodiment of the invention shown in the schematic side elevation view of FIG. 2, the laser source comprises a multiplicity of laser emitter die configured as a two-dimensional array 10. A microlens array 70 containing microlens elements may be provided. For example in the array shown in FIG. 2 the lens element 71 converts diverging light 1101 from laser element 11 into a collimated beam 1201. The microlens array does not form part of the invention. The ESBG despeckler device 2 comprises at least one ESBG array where each array contains a multiplicity of separately controllable ESBG elements similar to the one shown in FIG. 1. As shown in FIG. 2, a collimated beam 1201 propagates through an ESBG array element 21. Each ESBG element is operative to receive light from one laser die. In one operational embodiment of the invention said lasers and said ESBGs are operated such that the illumination from the lasers is provided in a time sequence.

In a further embodiment of the invention, which is also illustrated by FIG. 2, the lasers emit light simultaneously. Each ESBG despeckler device provides a unique set of speckle phase cells from its corresponding laser die.

Figure 3A:
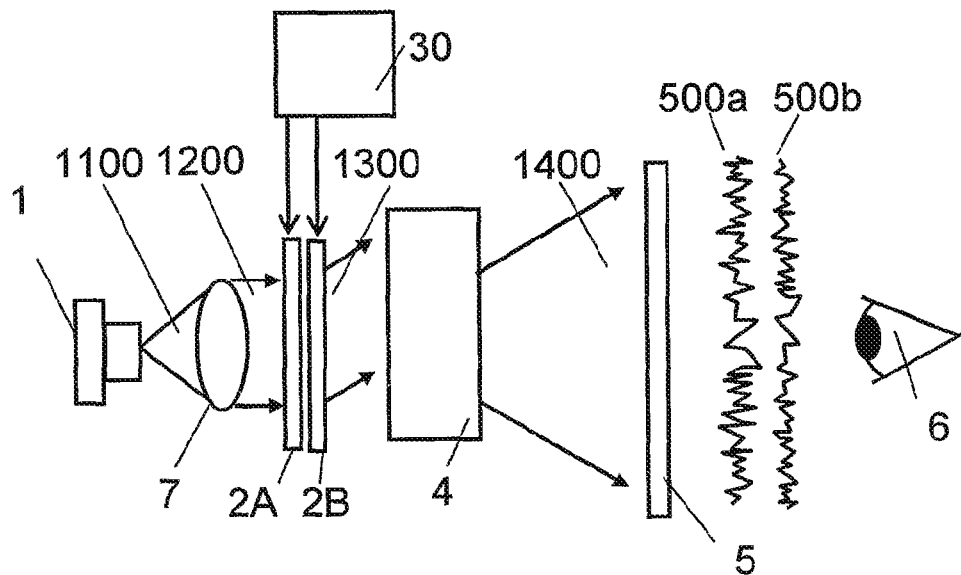
FIG. 3A is a schematic side elevation view of a laser display according to one embodiment of the invention.
Figure 3B:
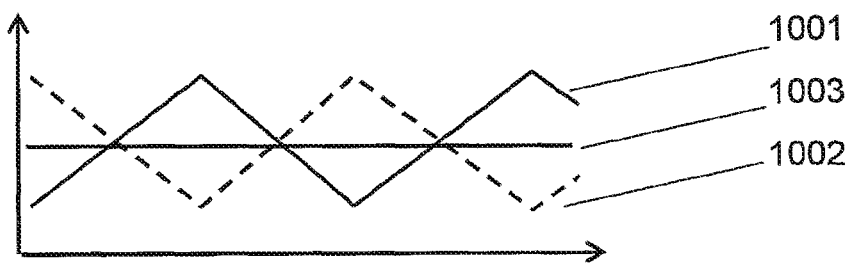
FIG. 3B is a chart showing a first ESBG applied voltage characteristic.
Figure 3C:
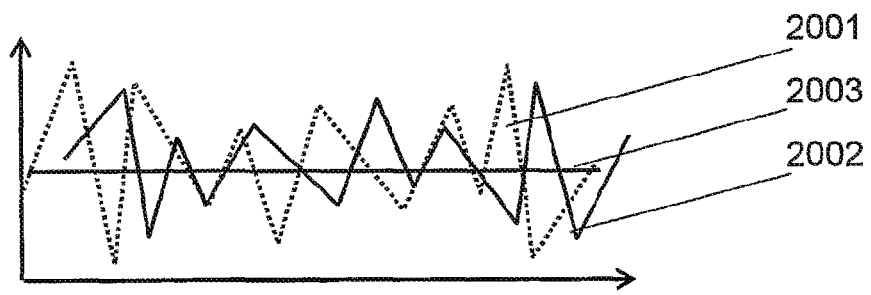
FIG. 3C is a chart showing a second ESBG applied voltage characteristic.

In further embodiments of the invention the ESBG despeckler devices in any of the embodiments described above may be configured using multiple ESBG elements disposed in sequence. For example, referring to the side elevation view of FIG. 3A, it will be seen that the ESBG element of FIG. 1A has been replaced by the two ESBG elements 2A, 2B, which are controlled by the ESBG controller 30. The ESBG elements are operated in tandem with alternating voltages applied across the ESBG layers. The optical effect of each ESBG despeckler device is varied from zero to maximum value at a high frequency by applying an electric field that varies in a corresponding varying fashion. Each incremental change in the applied voltage results in a unique speckle phase cell. Referring to FIG. 3B which is a chart showing voltage versus time applied to the ESBG elements it will be seen that there is a phase lag between the voltages 1001,1002 applied across the ESBGs. The effect of applying such waveforms is that the average intensity 1003 of the speckle phase cells remains substantially constant, thereby satisfying the statistical requirements for speckle reduction. Other types of waveforms may be applied, for example sinusoidal, triangular, rectangular or other types of regular waveforms. Alternatively, it may be advantageous in statistical terms to use waveforms based on a random stochastic process such as the waveforms illustrated in the chart of FIG. 3C. The chart of FIG. 3C shows voltage versus time characteristics for phase shifted random voltages 2001, 2002 applied to the ESBG elements. Again, the effect of applying the waveforms is that the average intensity 2003 of the speckle phase cells remains substantially constant.

Figure 4:
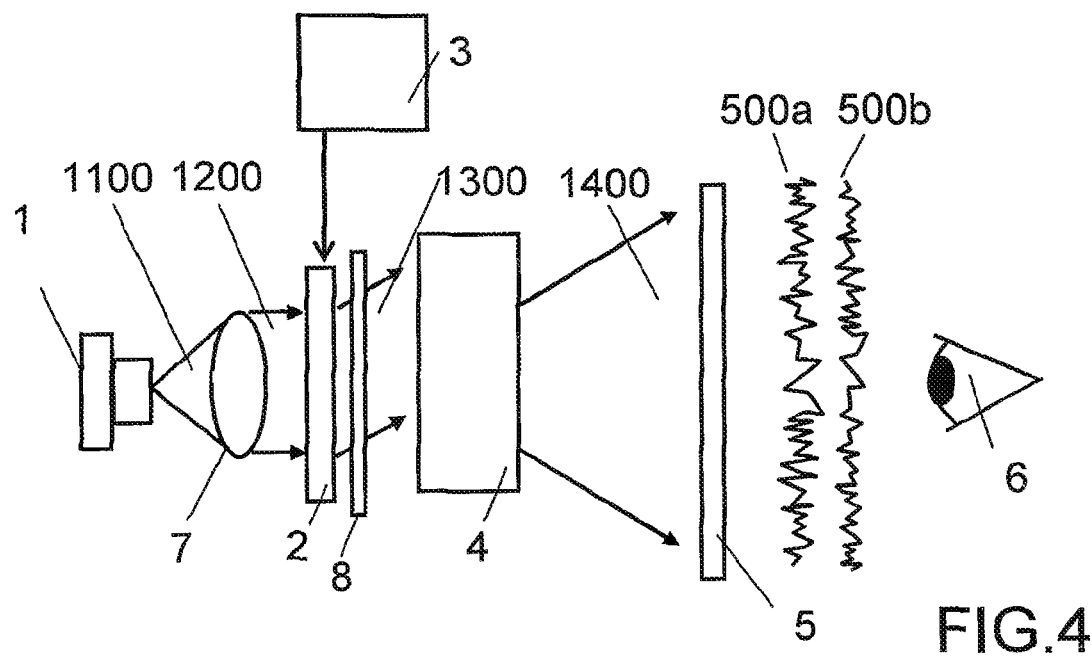
FIG. 4 is a schematic side elevation view of a laser display according to one embodiment of the invention.

In any of the embodiments of the invention beam-shaping element disposed along the laser beam paths may be used to shape the intensity profile of the illuminator beam. Laser array tend to have emitting surface aspect ratios of that are incompatible with the aspect ratios of common microdisplay devices. FIG. 4 shows a side elevation view of an illuminator similar to the embodiment of FIG. 1, which further comprises the beam-shaping element 8. The beam-shaping element may be a light shaping diffuser such as the devices manufactured by POC Inc. (USA) or a Computer Generated Hologram. Other technologies may be used to provide the light shaping function.

The ESBG despeckler device may be configured to perform the additional function of beam steering. This may be advantageous with laser arrays in which the die has large separations. In such a configuration at least one ESBG layer is configured to generate speckle phase cells while a further one or more ESBG layers are configured to diffract incident light into a specified direction. Desirably, the second ESBG operates according to the basic principles described in U.S. Pat. No. 6,115,152 entitled HOLOGRAPHIC ILLUMINATION SYSTEM.

Figure 5A:
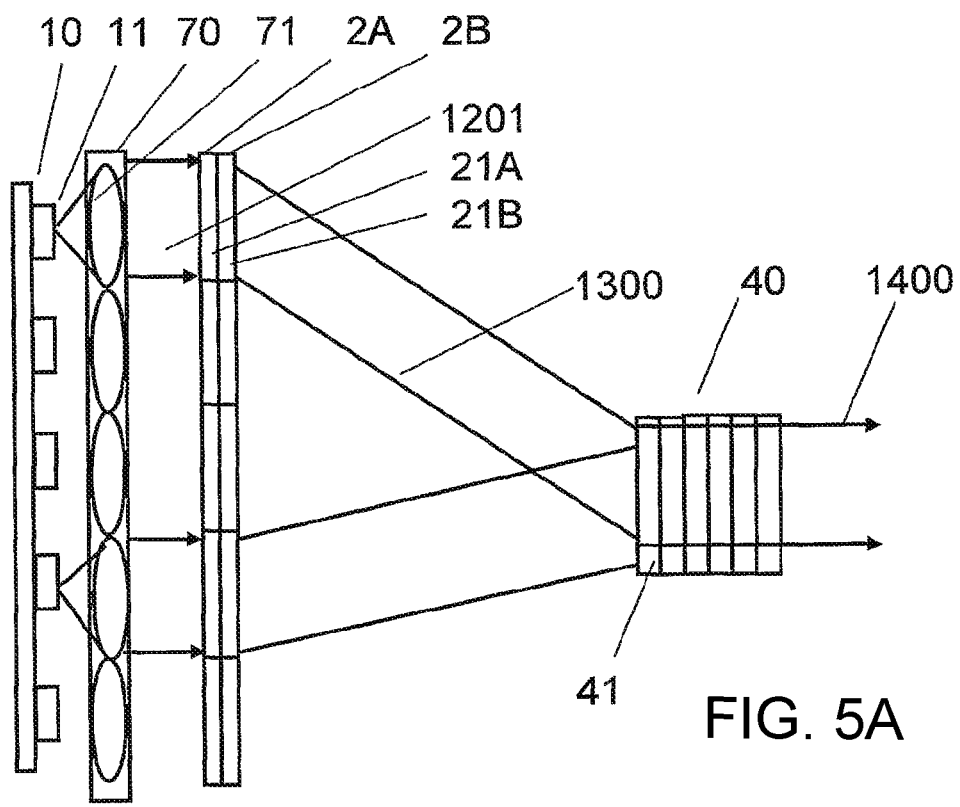
FIG. 5A is a schematic side elevation view of a laser display according to one embodiment of the invention.
Figure 5B:
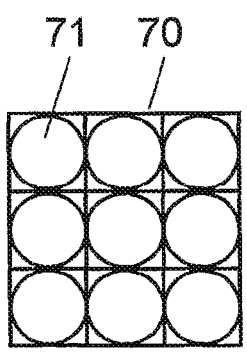
FIG. 5B is a front elevation of a first detail of the embodiment of FIG. 5A.
Figure 5C:
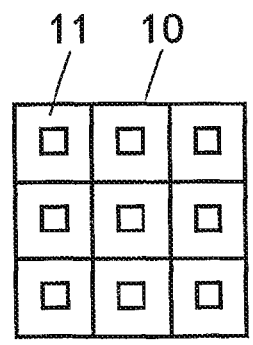
FIG. 5C is a front elevation of a first detail of the embodiment of FIG. 5A.

In one embodiment of the invention shown in the schematic side elevation view of FIG. 5A the laser display comprises a multiplicity of laser emitter die configured as a two dimensional array 10, a flat panel display, a projection lens and an ESBG despeckler device comprising a first array of separately controllable ESBG elements 2A and a second array of separately controllable ESBG elements 2B. The illuminator further comprises a multiplicity of ESBG elements configured as a stack 40. The first ESBG array operates in a similar fashion to the ESBG despeckler device illustrated in FIG. 2. However the function of the second ESBG array is to deflect beams from the laser die towards the ESBG stack 40. The illuminator may further comprise the microlens array 70. The ESBG stack directs light beams from said laser die towards the viewer. For example the converging light from the die 11 is collimated by the microlens element 71 into the beam direction 1201. The angular or polarization characteristics of the beam are modified by the ESBG element 21A. The ESBG element 21B deflects the beam 1201 into the beam direction 1300. The beam 1300 is deflected into the direction 1400 by element 41 of the ESBG stack 40. FIG. 5B is a front elevation view of a portion of the microlens array. FIG. 5C is a front elevation view of a portion of the laser die array. The configuration of FIG. 5A may be used in conjunction with any of the speckle reduction methods disclosed in the present application. It will be clear that that by eliminating the first ESBG array from the apparatus shown in FIG. 5 there is provide a means for combining beams from multiple laser sources into a common direction. In a further embodiment of the invention the functions performed by the ESBG arrays in FIG. 5 may be combined in a single ESBG layer.

Figure 6:
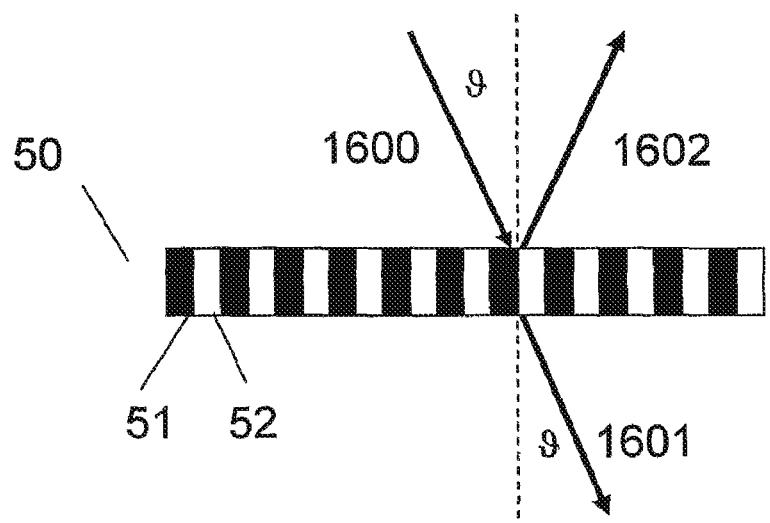
FIG. 6 is a schematic side elevation view of a further embodiment of the invention.

As indicated above ESBG despeckler devices according to the principles of the present invention can be configured to provide a range of spatio-temporal speckle averaging schemes. In any of the embodiments shown in FIGS. 1-5 the ESBG despeckler device could be configured as a variable subwavelength grating. Essentially the ESBG despeckler device acts as a variable phase retarder. FIG. 6 shows a cross section view of a sub wavelength grating 50. The light regions 51 represent polymer fringes. The shaded regions 52 represent PDLC fringes. The grating pitch must be much larger than the incidence light wavelength. Light 600 incident at an angle θ continues to propagate at the same angle after passing through the grating 601. Sub-wavelength gratings are high spatial frequency gratings such that only the zero order 600, forward diffracted 601 and backward "diffracted" waves 602 propagate. All higher diffracted orders are evanescent. Incident light waves cannot resolve the sub-wavelength structures and see only the spatial average of the grating material properties.

An ESBG configured as a sub wavelength grating exhibits a property known as form birefringence whereby polarized light that is transmitted through the grating will have its polarization modified. Subwavelength gratings behave like a negative uniaxial crystal, with an optic axis perpendicular to the PDLC planes. The basic principles of sub wavelength gratings are discussed is Born and Wolf, Principles of Optics, 5th Ed., New York (1975). It is known that the retardance is related to the net birefringence, which is the difference between the ordinary index of refraction and the extraordinary index of refraction of the sub-wavelength grating.

Where the combined thickness of the PDLC plane and the polymer plane is substantially less than an optical wavelength the grating will exhibit form birefringence. The magnitude of the shift in polarization is proportional to the length of the grating. By carefully selecting the length of the subwavelength grating for a given wavelength of light, one can rotate the plane of polarization. Thus, the birefringence of the material may be controlled by simple design parameters and optimized to a particular wavelength, rather than relying on the given birefringence of any material at that wavelength.

It is known that the effective refractive index of the liquid crystal is a function of the applied electric field, having a maximum when the field is zero and a value equal to that of the polymer at some value of the electric field. Thus, by application of an electric field, the refractive index of the liquid crystal and, hence, the refractive index of the PDLC plane can be altered. When the refractive index of the PDLC plane exactly matches to the refractive index of the polymer plane, the birefringence of the subwavelength grating can be switched off. To form a half-wave plate, the retardance of the subwavelength grating must be equal to one-half of a wavelength and to form a quarter-wave plate, the retardance must be equal to one-quarter of a wavelength.

ESBGs based on sub-wavelength gratings as described above may be operated in tandem with alternating voltages applied across the ESBG layers according to the principles illustrated in FIG. 3. The retardance of each ESBG is varied from zero to maximum value at a high frequency by applying an electric field that varies in a corresponding varying fashion. Each incremental change in the applied voltage results in a unique speckle phase cell. The effect of applying waveforms such as those illustrated in FIG. 3 is that the average intensity of the speckle phase cells remains substantially constant thereby satisfying the statistical requirements for speckle reduction. Despeckling schemes based on controlling retardance are sometimes referred to as polarization diversity schemes.

ESBG despeckler devices according to the principles of the present invention can be also configured as variable axicon devices. In such embodiments of the invention the ESBG acts as a variable phase retarder. According to the basic theory of axicons, a uniform plane wave passing through an infinite axicon has a transverse intensity profile represented by a first order Bessel function. The intensity profile is constant along the path giving what is effectively a non-diffracting beam. The basic principles of axicons are discussed in an article by J. H. McLeod entitled "Axicons and Their Uses" (JOS A, 50 (2), 1960, p. 166) and another article by R. M. Herman and T. A. Wiggins entitled "Production and uses of diffraction less beams" (JOSA A, 8 (6), 1991). Practical axicons use collimated Gaussian input beams and generate output beams that are referred to in the literature as a Bessel-Gauss beams. Classical axicons are typically conical single element lenses. The transverse intensity distribution at a specific position is created by constructive interference from a small annulus of rays incident on the axicon. Beam intensity is characterized by an intense central region encircled by rings of lower intensity. Each ring contain same amount of energy. Axicons have minimal optical power imparting only a small deviation to the incoming beam.

ESBG despeckler devices based on axicons as described above may operate in tandem with alternating voltages applied across the ESBG layers according to the principles illustrated in FIG. 3. The retardance of each ESBG axicon device is varied from zero to a predetermined maximum value at a high frequency by applying an electric field that varies in a corresponding varying fashion. Each incremental change in the applied voltage results in a unique speckle phase cell. The effect of applying waveforms such as those illustrated in FIG. 3 is that the average intensity of the speckle phase cells remains substantially constant thereby satisfying the statistical requirements for speckle reduction. In one embodiment of the invention ESBG despeckler devices based on axicons could be configured in tandem. In such a configuration laser wavefronts will not be diffracted but will only experience phase retardation. The diffracted beams substantially overlay the non-diffracted beams. Both diffracted and non-diffracted beams undergo phase retardation.

Figure 7A:
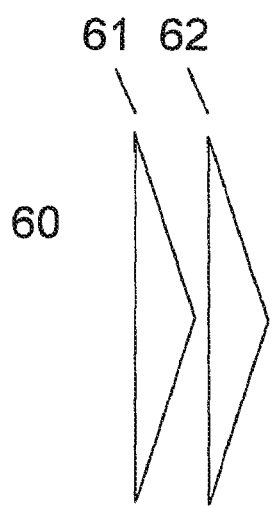
FIG. 7A is a schematic side elevation view of a prior art device related to one particular embodiment of the invention.
Figure 7B:
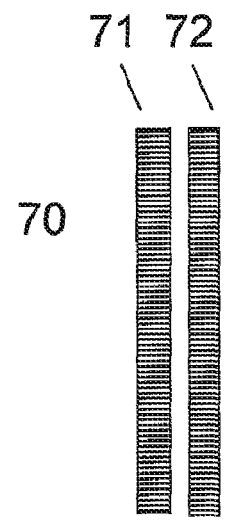
FIG. 7B is a schematic side elevation view of one particular embodiment of the invention.
Figure 7C:
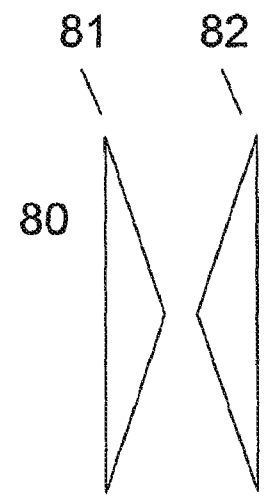
FIG. 7C is a schematic side elevation view of a prior art device related to one particular embodiment of the invention.

FIG. 7A is a schematic side elevation view of one configuration 60 of a pair of conical lens axicons 61, 62. FIG. 7B is a schematic side elevation view of an ESBG despeckler device 70 comprising a pair of ESBG layers 71,72 having optical characteristics equivalent to conical lens axicons 61,62 respectively. FIG. 7C is a schematic side elevation view of an alternative arrangement of conical lens axicons 80 comprising a pair of conical lens axicons 81, 82 which could be encoded into the ESBG layers 71, 72 respectively.

Figure 8:
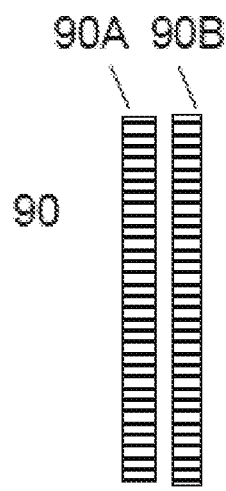
FIG. 8 is a schematic side elevation view of a one embodiment of the invention.

ESBG despeckler devices according to the principles of the present invention can be also configured as variable diffusers or scatterers. A variable diffuser is provided by recording diffusing characteristics in to an ESBG layer using procedures well known to those skilled in the art of holography. Conventionally, holographic optical element with diffusing characteristics are recorded by using a holographic cross beam recording apparatus with a diffuser inserted into one of the recoding beams. ESBGs characterized as diffusers may be operated in tandem with alternating voltages applied across the ESBG layers according to the principles illustrated in FIG. 3. FIG. 8 is a schematic side elevation view of one configuration 90 of an ESBG despeckler device comprising a pair of ESBG diffusers 90A, 90B. The transmittance of each ESBG is varied from zero to a predetermined maximum value at a high frequency by applying an electric field that varies in a corresponding varying fashion. Each incremental change in the applied voltage results in a unique speckle phase cell. The effect of applying waveforms such as those illustrated in FIG. 3 is that the average intensity of the speckle phase cells remains substantially constant thereby satisfying the statistical requirements for speckle reduction. Despeckling schemes based on diffusers or scatters are sometimes referred to as angular diversity schemes.

Figure 9:
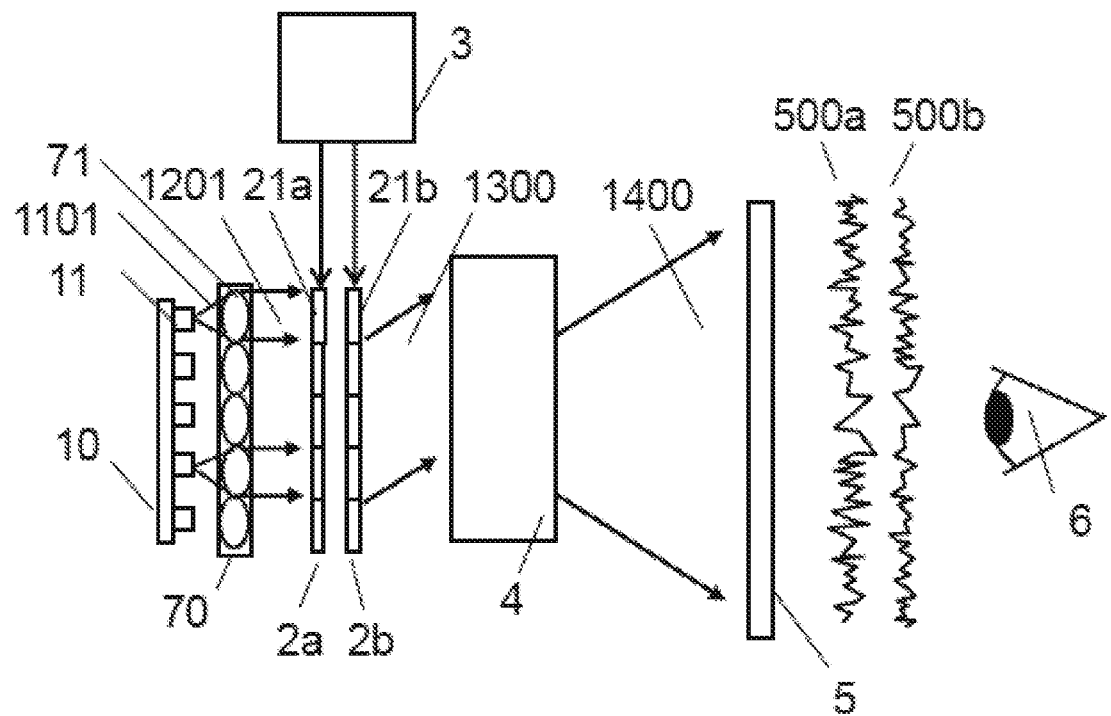
FIG. 9 is a schematic side elevation view of a laser display according to one embodiment of the invention.

In a further embodiment of the invention shown in FIG. 9 which is similar to that illustrated in FIG. 2 it will be seen that the ESBG array 2 of FIG. 2 has been replaced by the two ESBGs 2a and 2b, which are controlled by the ESBG controller 30. The ESBGs 2a, 2b may encode axicons, sub-wavelength gratings or diffusers. As discussed in the preceding paragraphs, the ESBGs 2a and 2b are operated in tandem with alternating voltages applied across the ESBG layers. The angular or polarization effect of each ESBG array cell is varied at a high frequency by applying an electric field that varies in a corresponding varying fashion. Each incremental change in the applied voltage results in a unique speckle phase cell. The laser source comprises a multiplicity of laser emitter die configured as a two-dimensional array 10. A microlens array 70 containing elements may be provided. For example in the array shown in the Figure the lens element 71 converts diverging light 101 from laser element 11 into a collimated beam 201. The beam 201 propagates through the ESBG array elements 21a and 21b in sequence.

Figure 10:
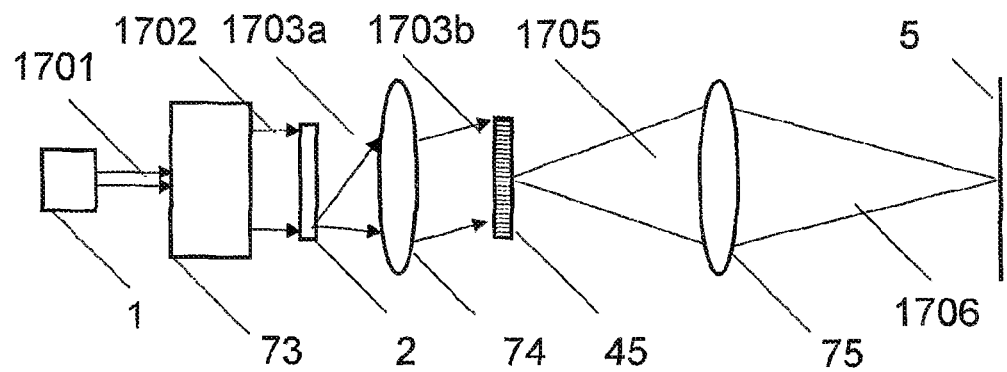
FIG. 10 is a schematic side elevation view of a laser display according to one embodiment of the invention.

A laser display according to the principles of the invention is shown in the side elevation view of FIG. 10. The laser display comprises a laser source 1 and an Electrically Switchable Bragg Grating (ESBG) device 2, which is disposed along the laser beam path. The apparatus of FIG. 10 further comprises a beam expander 73 a lens system indicated by 74 and a projection lens indicated by 75. There is further provided a flat panel display 45. The beam expander converts the laser output beam indicated by 1701 into the expanded beam indicated by 1702. The beam emerging from the ESBG despeckler device is indicated by 1703a. The ESBG despeckler device, which is not shown in detail, may be based on any of the ESBG despeckler devices discussed above. The ESBG despeckler device may be an array of selectively controllable cells as discussed above. In certain cases the ESBG despeckler device may comprise a single cell. The ESBG despeckler device may comprise a stack of similarly configured ESBG arrays or single cells. The ESBG despeckler device may include ESBG arrays designed to operate on red, green or blue light. The ESBG despeckler device may comprise arrays disposed adjacent to each other in a plane. In FIG. 10 the beam 1703a corresponds to the light emitted from a single cell of the ESBG despeckler device. The lens system 74 transforms the beam 1703a into the beam 1703b forming an illumination path that covers the active area of the flat panel display 45. The projection lens collects the image light indicated by 1705 from the flat panel display and focuses light indicated by 1705 to form an image at the screen 5. The laser source 1 comprises at least a single laser emitter die. Typically, the laser source comprises separate red, green and blue die. Alternatively, each of the red, green and blue lights may be provided by arrays of die. The invention is not restricted to any particular laser source configuration. The ESBG drive electronics are not illustrated. The flat panel display may be an LCD or any other type of device commonly used in video projection. The apparatus may further comprise relay optics, beam folding mirrors, light integrators, filters, prisms, polarizers and other optical elements commonly used in displays.

Figure 11:
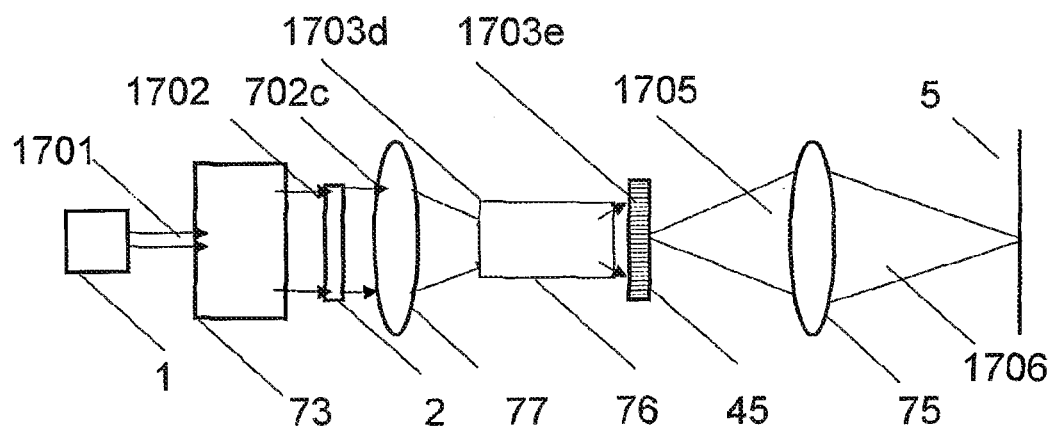
FIG. 11 is a schematic side elevation view of a laser display according to one embodiment of the invention.

Another laser display according to the principles of the invention is shown in the side elevation view of FIG. 11. The laser display comprises a laser source 1 and an Electrically Switchable Bragg Grating (ESBG) device 2, which is disposed along the laser beam path. The apparatus of FIG. 11 further comprises a beam expander 73, a lens system indicated by 77, a projection lens indicated by 75 and a light integrator pipe indicated by 76. There is further provided a flat panel display 45. The beam expander converts the laser output beam indicated by 1701 into the expanded beam indicated by 1702. The beam emerging from the ESBG is indicated by 1703c. The ESBG despeckler device, which is not shown in detail, may be based on any of the ESBG despeckler devices discussed above. The ESBG despeckler device may be an array of selectively controllable cells as discussed above. In certain cases the ESBG despeckler device may comprise a single cell. The ESBG despeckler device may comprise a stack of similarly configured ESBG arrays or single cells. The ESBG despeckler device may include ESBG arrays designed to operate on red, green or blue light. The ESBG despeckler device may comprise arrays disposed adjacent to each other in a plane. In FIG. 11 the beam 1703c corresponds to a portion the light emitted from a single cell of the ESBG despeckler device. The lens system 77 transforms the beam 1703c into the beam 1703d forming an illumination patch at the aperture of the light integrator pipe. The integrator pipe emits light 1703e towards the flat panel display. It should be noted that further lens elements may be inserted at any point in the optical train illustrated in FIG. 11 for the purpose of beam illumination profile shaping and aberration correction. The projection lens collects the image light indicated by 1704 from the flat panel display and focuses light indicated by 1705 to form an image at the screen 5. The laser source 1 comprises at least a single laser emitter die. Typically the laser source comprises separate red, green and blue die. Alternatively, each of the red, green and blue lights may be provided by arrays of die. The invention is not restricted to any particular laser source configuration. The ESBG drive electronics are not illustrated. The flat panel display may be an LCD or any other type of device commonly used in video projection. The apparatus may further comprise relay optics, beam folding mirrors, light integrators, filters, prisms, polarizers and other optical elements commonly used in displays. The apparatus may further comprise relay optics, beam folding mirrors, light integrators, filters, prisms, polarizers and other optical elements commonly used in displays.

Figure 12:
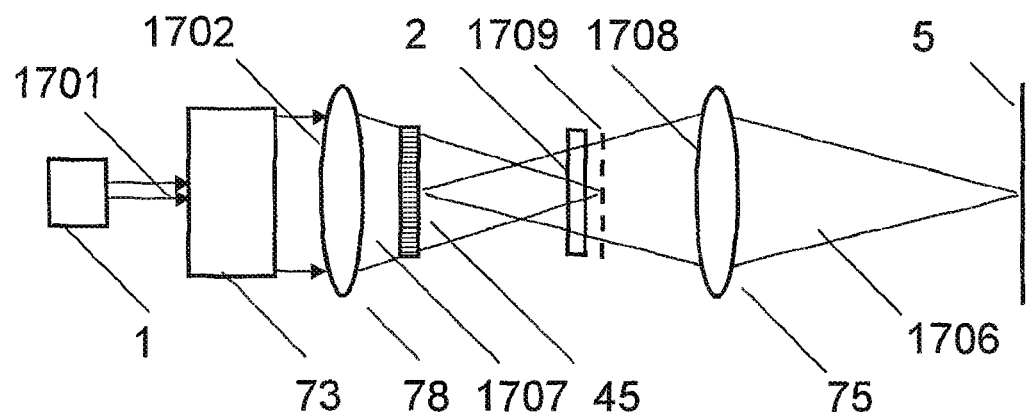
FIG. 12 is a schematic side elevation view of a laser display according to one embodiment of the invention.

In the embodiments of the invention discussed above the ESBG despeckler device is located in the illumination path leading up to the flat panel display. In alternative embodiments of the invention the ESBG despeckler device may be located in the optical train after the flat panel display. Another laser display according to the principles of the invention is shown in the side elevation view of FIG. 12. The laser display comprises a laser source 1 and an Electrically Switchable Bragg Grating (ESBG) device 2, which is disposed along the laser beam path. The apparatus of FIG. 12 further comprises a beam expander 73 a lens system indicated by 78 and a projection lens indicated by 75. There is further provided a flat panel display 45. The beam expander converts the laser output beam indicated by 1701 into the expanded beam indicated by 1702. The ESBG despeckler device, which is not shown in detail, may be based on any of the ESBG despeckler devices discussed above. The ESBG despeckler device may be an array of selectively controllable cells as discussed above. In certain cases the ESBG despeckler device may comprise a single cell. The ESBG despeckler device may comprise a stack of similarly configured ESBG arrays or single cells. The ESBG despeckler device may include ESBG arrays designed to operate on red, green or blue light. The ESBG despeckler device may comprise arrays disposed adjacent to each other in a plane. In FIG. 10 the beam 1703a corresponds to the light emitted from a single cell of the ESBG despeckler device. The lens 78 essentially functions as a Fourier transform lens directing light indicated by 1707 towards a Fourier plane indicated by 1709. The ESBG despeckler device is disposed in close proximity to the Fourier plane. Desirably, the aperture of ESBG coincides with the illumination patch formed at the Fourier plane by the lens 78. The basic principles of Fourier optics are discussed in a book entitled "Introduction to Fourier Optics" by Joseph Goodman published by McGraw-Hill (2nd Edition January 1996). The projection lens collects the image light indicated by 1708 from the flat panel display and focuses light indicated by 1705 to form an image at the screen 5. The laser source 1 comprises at least a single laser emitter die. Typically the laser source comprises separate red, green and blue die. Alternatively, each of the red, green and blue lights may be provided by arrays of die. The invention is not restricted to any particular laser source configuration. The ESBG drive electronics are not illustrated. The flat panel display may be an LCD or any other type of device commonly used in video projection. The apparatus may further comprise relay optics, beam folding mirrors, light integrators, filters, prisms, polarizers and other optical elements commonly used in displays.

Figure 13:
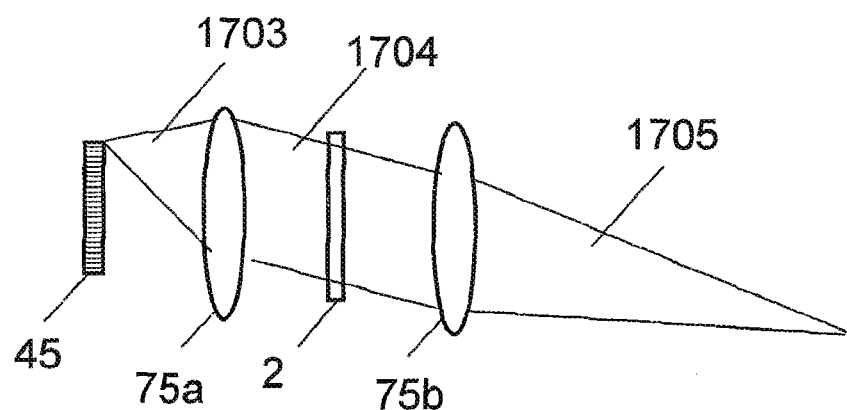
FIG. 13 is a schematic side elevation view of a projection lens according to embodiment of the invention.

In one embodiment of the invention in which the ESBG despeckler device is located after the flat panel display the ESBG despeckler device forms part of the projection lens. Such an embodiment is illustrated in the schematic side elevation view of FIG. 13. In FIG. 13 the projection lens is represent by the elements 75a, 75b. The ESBG despeckler device is disposed between lens elements 75a, 75b. Desirably the ESBG despeckler device is position adjacent to the aperture stop. Light 1703 from the flat panel display 45 forms a beam 1704 inside the lens. The light indicated by 1705 emerging from the projection lens forms an image on a projection screen. Certain types of projection lenses are designed with external aperture stops located in front of the lens that is between the lens and the display panel. In such lens configurations the ESBG despeckler device would likewise be disposed in front of the lens near the external aperture stop. It will be appreciated that the lens shown in FIG. 13 is greatly simplified for the purposes of explaining the invention. In general the projection lens will be a complex multi-element system.

FIGS. 14-17 shows schematic front elevation views of different configurations of the ESBG despeckler device in which the ESBGs are configured as arrays of selectively controllable ESBG pixels.

Figure 14:
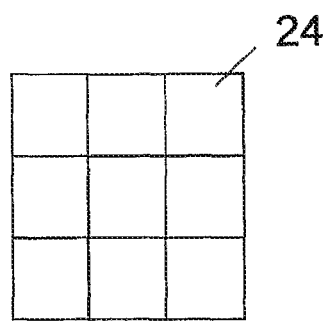
FIG. 14 is a schematic front elevation view of an ESBG array used in one embodiment of the invention.

In the embodiment of FIG. 14 the ESBG comprises an array containing ESBG pixels such as the one indicated by 24. The pixels may be configured as variable subwavelength gratings, diffusers or axicons.

Figure 15:
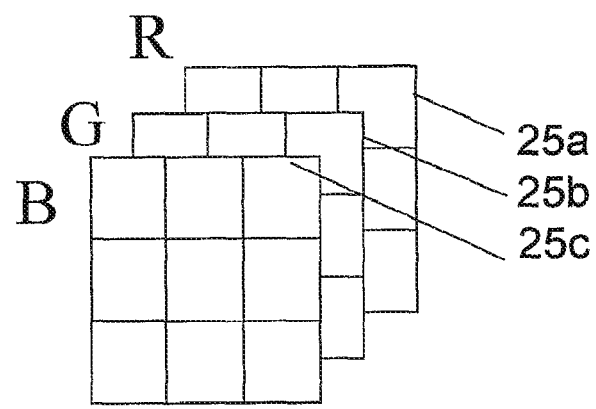
FIG. 15 is a schematic front elevation view of an ESBG array used in one embodiment of the invention.

In the embodiment shown in FIG. 15 the ESBG despeckler device comprises a stack of three layers indicated by the symbols R, G, B where the layers have substantially the same specifications but are designed to operate on red, green and blue light respectively. The arrays indicated by R, G, B contains ESBG pixels such as the ones indicated by 25a, 25b, 25c respectively. The pixels may be configured as variable subwavelength gratings, diffusers or axicons.

Figure 16:
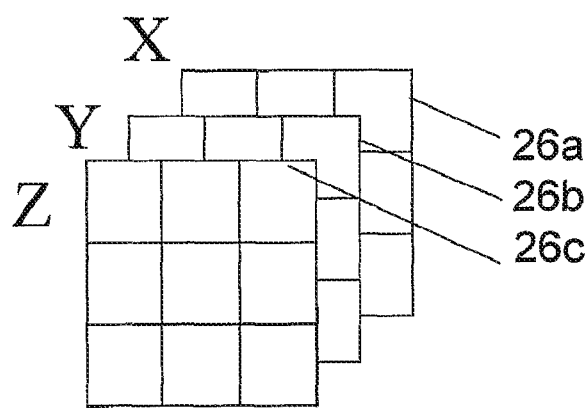
FIG. 16 is a schematic front elevation view of an ESBG array used in one embodiment of the invention.

In the embodiment of FIG. 16 the ESBG despeckler device comprises a stack of three layers indicated by the symbols X, Y, Z containing ESBG pixels such as 26a, 26b, 26c respectively. The layer indicated by the symbol X comprises variable diffusers. The layer indicated by the symbol Y comprises variable subwavelength gratings. The layer indicated by the symbol Z comprises variable axicons. It will be clear that many variations of the embodiment of FIG. 16 are possible using different combinations of ESBG types as well as ESBG configured for specific wavelengths. The number of layers is only limited by transmission losses and switching circuitry complexity.

Figure 17:
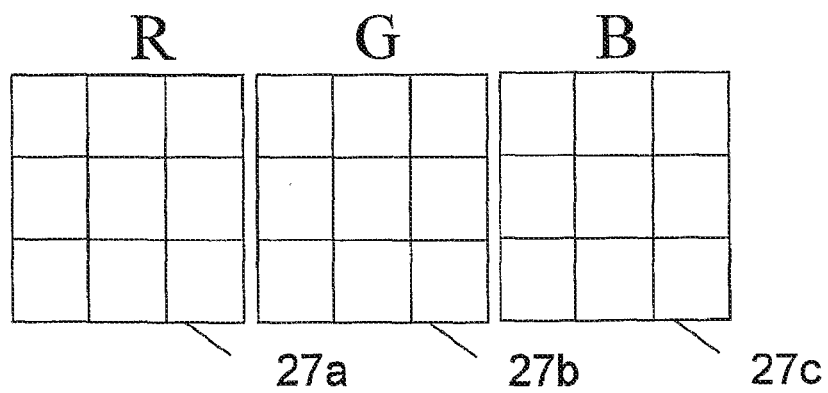
FIG. 17 is a schematic front elevation view of an ESBG array used in one embodiment of the invention.

In one embodiment of the invention ESBG arrays may be configured adjacent to each other as shown in the schematic front elevation view of FIG. 17. Desirably the ESBG arrays would be mounted on a common substrate. In the embodiments of FIG. 17 separate ESBG arrays are provided for red green and blue light indicated by the symbols R, G, B respectively with typical cells in each array being indicated by 27a, 27b, 27c respectively. The embodiments of FIG. 17 will required special light guide schemes for delivering light from red green and blue sources to the ESBG despeckler device and for combining light into a common beam path after the ESBG despeckler device. It will be clear from consideration of FIGS. 15-16 that the principles of stacking ESBG arrays and disposing ESBG arrays on a common substrate as taught above can be combined to provide many different ESBG despeckler device configurations.

Figure 18:
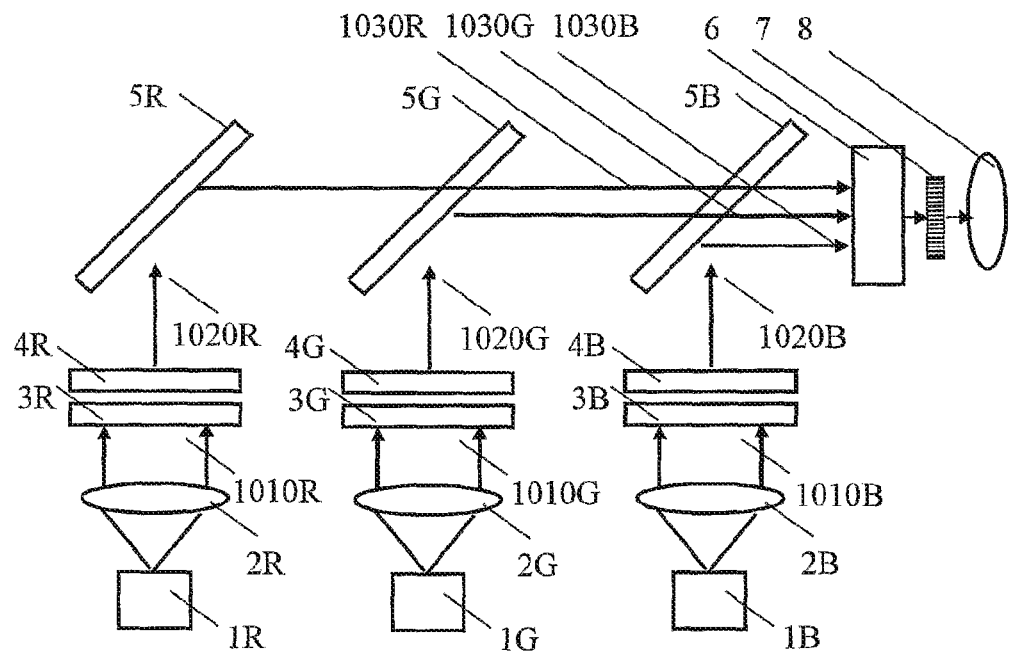
FIG. 18 is a schematic side elevation view of a laser display according to one embodiment of the invention.

FIG. 18 shows a plan schematic view of one operational embodiment of the invention for providing color sequential red green and blue laser illumination. There are provided separated red, green and blue laser modules. The red module comprises at least one laser source 1R, beam expansion and collimation lens system represented by 2R, an ESBG despeckler device further comprising a first ESBG array 3R and a second ESBG array 4R. The lens 2R forms the collimated beam generally indicated by 1010R. The despeckled beam at the output of the red module is generally indicated by 1020R. The green module comprises at least one laser source 1G, beam expansion and collimation lens system represented by 2G, an ESBG despeckler device further comprising a first ESBG array 3G and a second ESBG array 4G. The lens 20 forms the collimated beam generally indicated by 1010G. The despeckled beam at the output of the blue module is generally indicated by 1020B. The blue module comprises at least one laser source 1B, beam expansion and collimation lens system represented by 2B, an ESBG despeckler device further comprising a first ESBG array 3B and a second ESBG array 4B. The lens 2B forms the collimated beam generally indicated by 1010B. The despeckled beam at the output of the blue module is generally indicated by 1020B. A mirror 5R reflects the red beam along an optical axis to provide a beam 1030R. A green reflecting dichroic mirror 5G reflects the green beam along an optical axis to provide a beam 1030G. A blue reflecting dichroic mirror 5B reflects the blue beam along an optical axis to provide a beam 1030G. A lens system generally indicated by 6 directs the beams 1030R, 1030G, 1030B towards a display panel 7. A projection lens 8 projects an image of the display panel onto a screen, which is not shown.

In one embodiment of the invention based on the embodiment illustrated in FIG. 18 the first red, green and blue ESBG arrays may be provided on a first common substrate and the second red, green and blue ESBG arrays may be provided on a second common substrate.

In one embodiment of the invention based on the embodiment of FIG. 18 the ESBG arrays are each configured to operate as variable diffusers as described above. In other embodiments of the invention based on the embodiment of FIG. 18 one of the ESBG arrays may operate as a variable diffuser and the other as a variable sub wavelength grating. In a yet further embodiment of the invention based on the embodiment of FIG. 18 at least one of the ESBGs may combine the optical functions of a variable diffuser and beam homogenizer.

Figure 19:
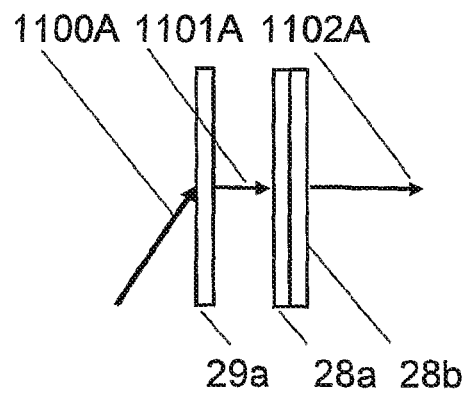
FIG. 19 is a schematic side elevation view of a one particular operational embodiment of the invention.

FIG. 19 shows another operational embodiment of the invention. There is provided a despeckler comprising a first ESBG array 28a and a second ESBG array 28b. There is further provided a Diffractive Optical Element (DOE) 29a. Said DOE may be a holographic element such as a Bragg hologram. Said DOE may be a SBG. The DOE directs off axis incident laser light 1100A into a direction 1101A normal to the surfaces of the ESBG arrays. The light emerging from the ESBG arrays is emitted in the average ray direction 1102A. The direction 1102a may be substantially the same as the ray direction 1101A. Normally, ESBGs require off axis illumination for high diffraction efficiency.

Figure 20:
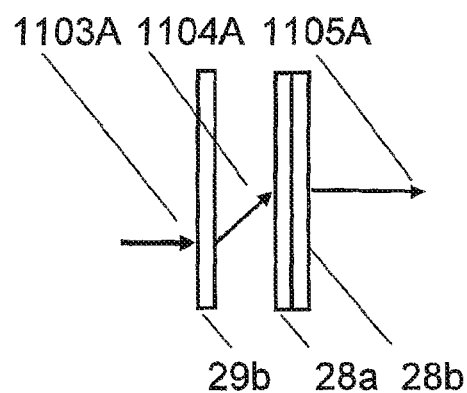
FIG. 20 is a schematic side elevation view of a one particular operational embodiment of the invention.

FIG. 20 shows an alternative embodiment of the invention similar to that of FIG. 19 in which incident light 1103A is substantially normal to the surfaces of the ESBG arrays. A DOE 29 B is used to deflect the light away from the incident light direction in the direction 1104A. The ESBG arrays then deflect light into an average ray direction 1105A substantially parallel to the incident light direction 110A.

In one embodiment of the invention based on the embodiment of FIGS. 19-20 the ESBG arrays are each configured to operate as variable diffusers as described above. In other embodiments of the invention based on the embodiment of FIGS. 19-20 one of the ESBG arrays may operate as a variable diffuser and the other as a variable sub wavelength grating. In a yet further embodiment of the invention based on the embodiment of FIGS. 19-20 at least one of the ESBGs may combine the optical functions of a variable diffuser and beam homogenizer.

Electrode Structure for ESBG Arrays

A method of fabricating an ESBG array for use within the present invention will now be discussed. The method is very similar to the one described in a co-pending PCT US2006/043938 filed 13 Nov. 2006, claiming priority to U.S. provisional patent application 60/789,595 filed on 6 Apr. 2006, entitled METHOD AND APPARATUS FOR PROVIDING A TRANSPARENT DISPLAY. Although said PCT is directed at the use of ESBGs as transparent elements for displaying symbolic information, the fabrication methods described therein may be applied directly to the present invention.

The process of fabricating an ESBG array according to the basic principles of the invention is shown in FIGS. 21 to 24. The first six steps are shown in FIGS. 21-22. For the purposes of explaining the invention an ESBG array comprising a single rectangular shaped ESBG is considered. It will be clear from consideration of the drawings that the process for fabricated a one or dimensional array will require identical steps.

Step 1 is illustrated by the plan view of FIG. 21A and the side elevation view of FIG. 22A. In Step 1a substrate coated on one side with an anti-reflection coating 102 and coated on the opposing side with a layer of Indium Tin Oxide (ITO) 103 is provided. The element shown in FIG. 21A and FIG. 22A is referred to as the electrode plate. Only the ITO coated surface is shown in FIG. 21A. The antireflection coating may not be required in certain embodiments of the invention.

Step 2 is illustrated by the plan view of FIG. 21B and the side elevation view of FIG. 22B. In Step 2 portions of the ITO on the electrode plate are removed to provide a patterned ITO region generally indicated by 130 and comprising the ESBG array pixel pad 131, an electrical connection path 132 and a power supply connector pad 133. At this stage in the process the alignment markers 111, 112 may be deposited onto the substrate.

Step 3 is illustrated by the plan view of FIG. 21C and the side elevation view of FIG. 22C. In Step 3 a layer of UV absorbing dielectric material 104 is deposited over the electrode layer 130.

Step 4 is illustrated by the plan view of FIG. 21D and the side elevation view of FIG. 22D. In Step 4 a portion of said UV absorbing dielectric material overlaying ESBG array pixel pad 131 is removed. FIG. 21E shows a plan view of the superimposed dielectric layer and ITO layer.

At Step 5, which is not illustrated, a second substrate again coated on one side with an anti-reflection coating and coated on the opposing side with a layer of ITO is provided. The antireflection coating may not be required in certain embodiments of the invention.

Step 6 is illustrated by the plan view of FIG. 21F and the side elevation view of FIG. 22E. In Step 6 the ITO layer of said second substrate is etched to provide the electrode structure general indicated by 170 comprising a central portion 171 substantially identical to and spatially corresponding with the ESBG array pixel pad 131, the background area 172 and the perimeter regions 173a, 173b from which ITO material has been removed. The width of the perimeter regions 173a, 173b are required to be large enough to avoid the risk of short circuits occurring. Desirably the width of the perimeter regions should be less than 50 microns.

In a further step, Step 7, which is not illustrated, the two substrates processed according to the above steps are combined to form a cell with the electrode coated surfaces of the two substrates aligned in opposing directions and having a small separation.

In a further step, Step 8, which is not illustrated, the cell is filled with a PDLC mixture.

In the final step, Step 9, of the fabrication process the HPDLC region corresponding to the ESBG array pixel pad is recorded.

Figure 23:
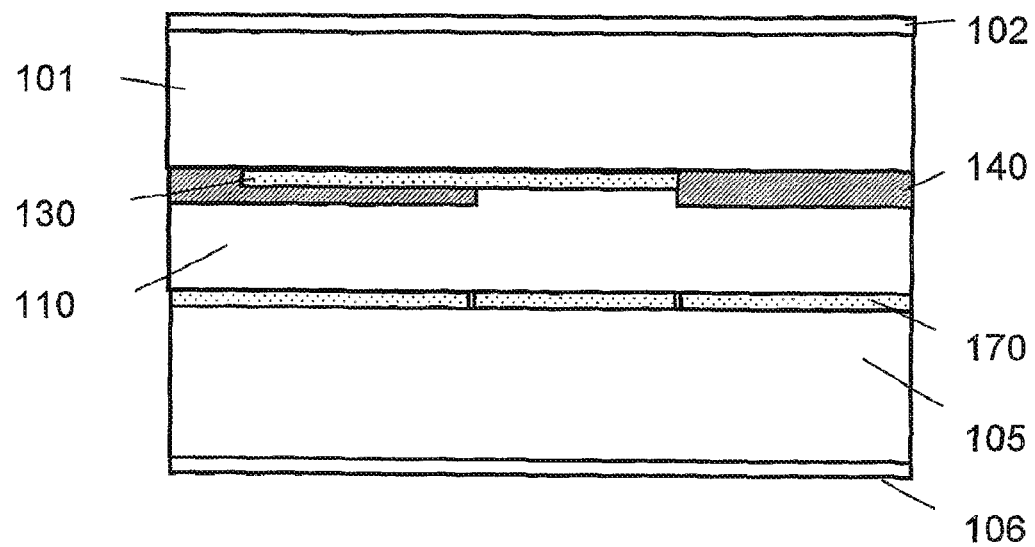
FIG. 23 is a side elevation view of the assembled ESBG element.

A schematic side view of an assembled ESBG array cell according to the basic principles of the invention is shown in FIG. 23. Again, only one pixel pad of the array is shown for simplicity. The ESBG array comprises a first transparent substrate 101, an antireflection coating 102, a first ITO layer 130 covering a portion of the surface of the substrate, a UV absorbing dielectric layer 140 covering a portion of the ITO and of the substrate, a PDLC layer 110, a second substrate 105 having one surface coated with an ITO pattern indicated by 170 and the opposing face coated with an antireflection coating 106. The antireflection coatings 102, 106 may not be required in certain embodiments of the invention.

Figure 24:
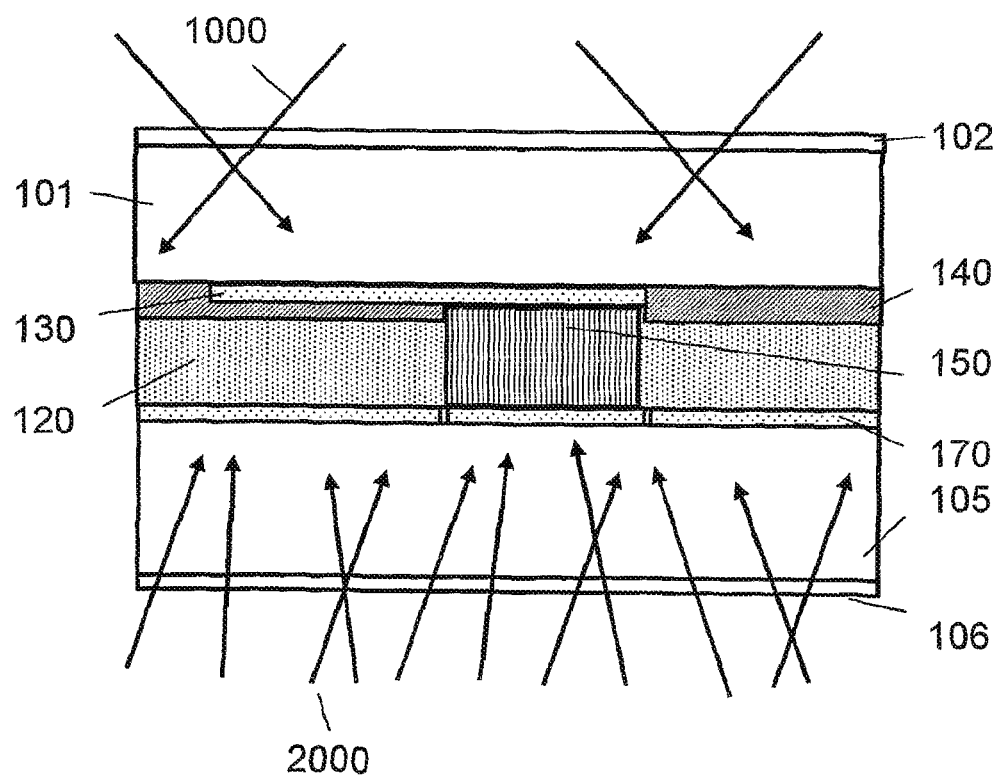
FIG. 24 is a side elevation view of the assembled ESBG showing the recording process.

FIG. 24 shows the HPDLC recording process used. The cell is illuminated from one side by a pair of intersecting beams generally indicated by 1000 from a UV laser. The incidence angles of the beams will be precise beam angle requirements of the illuminator device. The intersecting laser beams interfere only in the region of PDLC under the apertures etched out of the dielectric layer. As described earlier the interference causes a grating 300 comprising alternating LC-rich/polymer-depleted and LC-depleted/polymer-rich regions to be formed. At the same time, the PDLC material is UV cured by illuminating the cell from the opposite side using incoherent UV light generally indicated by 2000. The incoherent UV light gives rise to the PDLC region 300. The PDLC is characterized by large LC droplets having random orientations. However, the HPDLC grating is characterized by tiny droplets having a preferred alignment. The relative intensities of the UV laser and the incoherent UV source are balanced to optimize the switching characteristics of the PDLC and HPDLC regions. When an electric field source is coupled across the ITO electrodes 130 and 170 the grating remains active when no field is applied but is deactivated when a field is applied.

For the purposes of explaining the invention the thicknesses of the coatings in FIGS. 21-24 have been greatly exaggerated. The details of the wiring around the pads and the means of connecting the pad to the power supply have not been shown in FIGS. 21-24. Although FIGS. 21-24 show only one ESBG pixel pad, the process steps may be applied to an array of ESBG pixels arrayed on large area substrates, such as commercially available seven inch substrates. Although the ESBG pixel pad shown in FIGS. 21-24 is of rectangular shape, the process may generally be applied to ESBGs of any required shape and size.

A method of fabricating an ESBG array in accordance with the invention will now be described with reference to FIG. 25.

At step 500, a substrate to which a transparent electrode layer has been applied is provided.

At step 501, portions of said transparent electrode layer are removed to provide a patterned electrode layer including at least one ESBG pixel pad.

At step 502, a layer of UV absorbing dielectric material is deposited over said patterned electrode layer.

At step 503, the portion of said UV absorbing dielectric material overlapping said ESBG pixel pad is removed.

At step 504, a second substrate to which a transparent electrode layer has been applied is provided.

At step 505, the transparent electrode layer of said second substrate layer is etched to provide a patterned electrode layer including an electrode element substantially identical to and spatially corresponding with said ESBG pixel pad.

At step 506, the substrates are combined to form a cell with the coated surfaces of the two electrode coated surfaces aligned in opposing directions and having a small separation.

At step 507, said cell is filled with a PDLC mixture.

At step 508, the cell face formed by the first substrate is illuminated by crossed UV laser beams, and simultaneously illuminating the cell face formed by the second substrate by an incoherent UV source.

In production, the masks will need to be mirror imaged and colored appropriately for the particular process and photo-resist used. The top level ITO mask would typically include a set of alignment features such as the ones shown in FIG. 24 to facilitate the assembly of the ESBG array. Further alignment features may be incorporated if required by the process.

The ITO layer typically has a coating resistance of typically 300-500 Ohm/sq. A typically example of an ITO film used by the inventors is the N00X0325 film manufactured by Applied Films Corporation (Colorado). Typically, the ITO film has a thickness of 100 Angstrom. Typically, the ITO film is applied to 0.7 mm thickness 1737F glass. The ITO layer 170 should have the same properties as the ITO of Level 1.

The dielectric layer 140 in FIG. 23 should have a thickness sufficient to withstand a peak voltage of 100V between the ITO layers. Desirably, the dielectric should be free from pinholes. The transmission of the dielectric layer at a wavelength of 365 nm and incidence angle in the range 30 to 60 degrees should, ideally, be less than 0.1%. However, in many applications transmissions of up to 5% may be acceptable.

Typically the layer-to-layer registration should be + or −0.25 micron (+ or −0.001 inch).

A first benefit of the process discussed above is that it eliminates the need for a focused mask in the exposure set-up. In mask-based exposure processes the grating area would need to be slightly larger than the actual ESBG pixel in order to improve background clarity. The use of an etched UV absorbing dielectric layer as disclosed in the present application allows more readily achievable production tolerances, simplifying mass production and lowering cost. A second benefit of the disclosed fabrication process is that it provides an extremely clear background, which is highly desirable in illumination applications. An important feature of an ESBG array fabricated using the above process is that the HPDLC is localized to the ESBG array pixels. The ESBG array fabrication method described above results in a more efficient and cost effective mass production process.

The present invention does not assume any particular process for fabricating ESBG despeckler devices. The fabrication steps may be carried out used standard etching and masking processes. The number of steps may be further increased depending on the requirements of the fabrication plant used. For example, further steps may be required for surface preparation, cleaning, monitoring, mask alignment and other process operations that are well known to those skilled in the art but which do not form part of the present invention.

Figure 25:
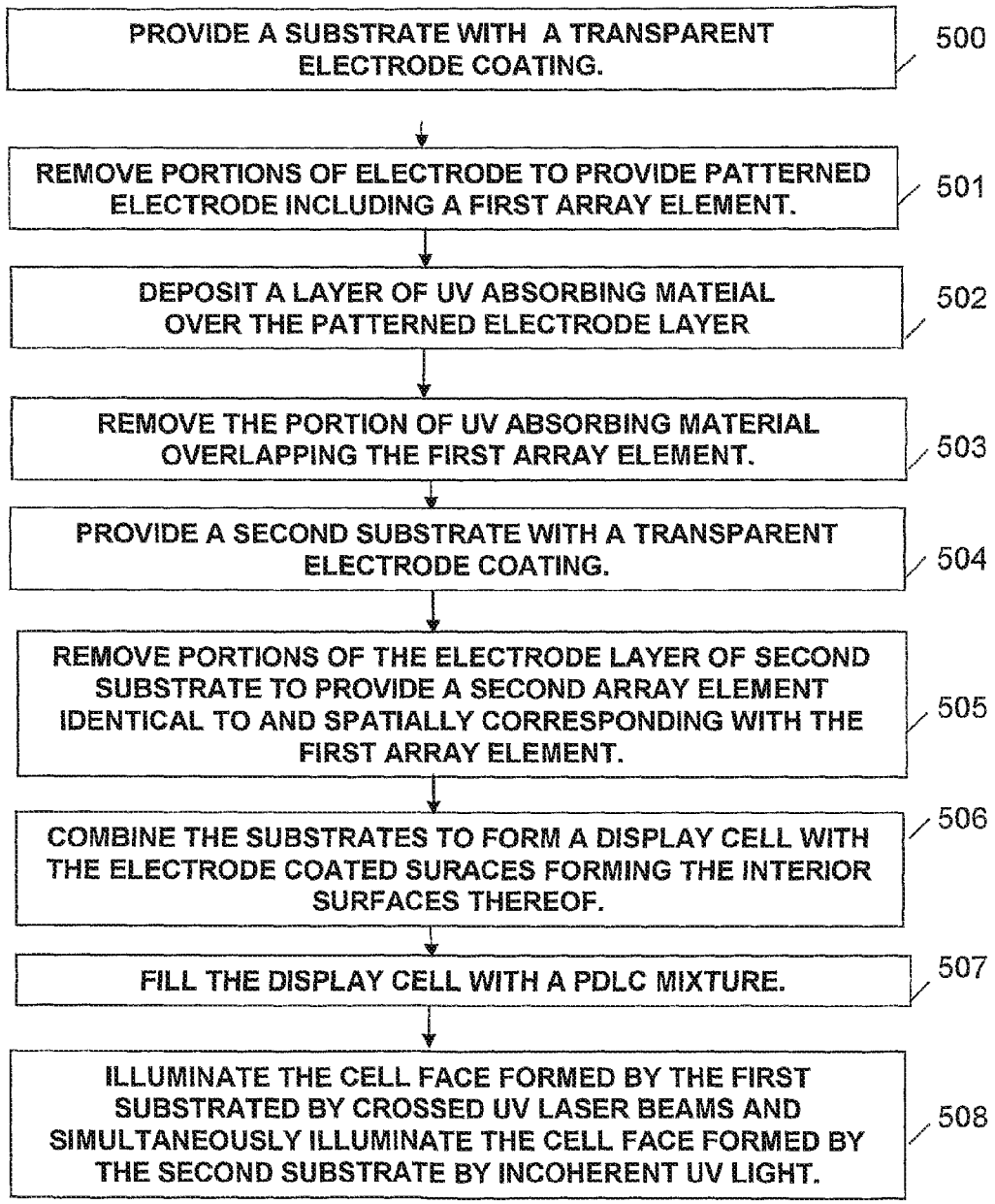
FIG. 25 is a flow diagram of a method of fabricating the ESBG according to the principles of the invention.
Figure 26:
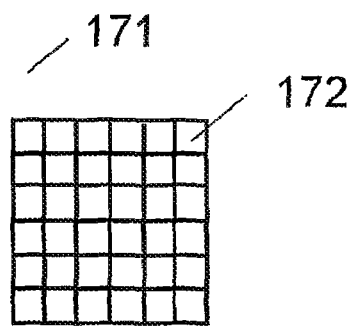
FIG. 26 is a plan view of a particular embodiment of an ESBG electrode array used in an embodiment of the invention.

Although ESBG electrode patterning methods for use with the present invention have been discussed in relation to uniformly patterned two-dimensional arrays such as the array illustrated in FIG. 25 where an ESBG array 171 comprises square ESBG pixels such as 172 it will be clear that the invention may be applied using electrodes patterned in more complex geometries. For example, FIG. 26 shows a plan view of an electrode structure 173 that provides a non-uniform ESBG array pattern for use in a dual electrode structure such as the one illustrated in FIG. 23. The electrode elements such as 174 have very fine gaps to eliminate super grating effects. Typically, the gaps are approximately five microns. From consideration of FIG. 23 it will be appreciated that the electrode elements are energized from underneath by electrical connections to second layer electrode drive tracks. The first and second electrodes sandwich ESBG layers of shape defined by the electrode element shapes. Alignment features such as the one indicated by 175 may be provided.

In one embodiment of the invention that uses an electrode structure of the type shown in FIG. 26 the ESBG regions sandwiched between the irregular electrode elements may encode clusters of point sources for use in angular diversity despeckling.

A Preferred Angular Diversity Despeckler Embodiment

The preferred embodiments of the invention will now be discussed with reference to the drawings in FIGS. 28-41. The ESBG elements are designed to function as diffusers providing speckle reduction according to the principle of angular diversity.

Figure 28:
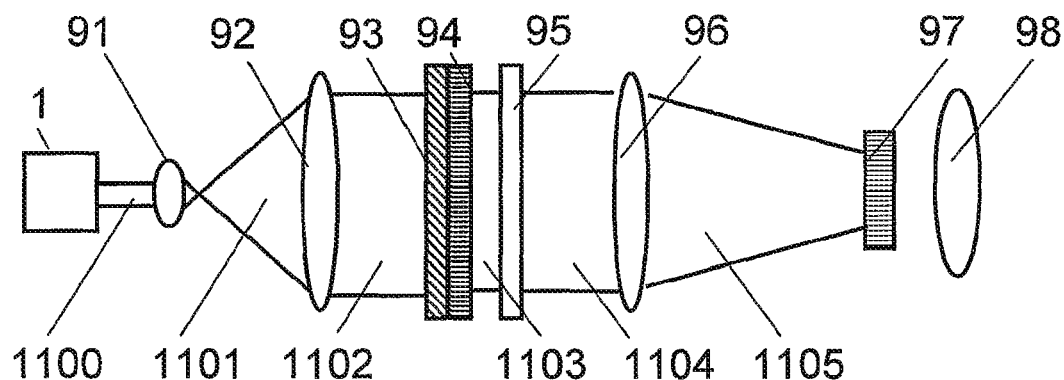
FIG. 28 is a schematic side elevation view of a laser display according to one embodiment of the invention.

One particular embodiment of the invention that uses angular diversity speckle reduction is illustrated in the schematic side elevation view of FIG. 28. The apparatus comprises a laser source 1, a beam expander comprising the lens elements 91, 92 a despeckler further comprising the ESBG elements 93, 94, a Diffractive Optical Element (DOE) 95, a lens 96 a flat panel display 97 and a projection lens 98.

The first ESBG element 93 is a plane Bragg grating in other words a grating in which the Bragg surface vectors are aligned in a common direction such that a collimated input beam in a first direction is deflected into a collimated beam in a second direction. The second ESBG element 94 comprises an array of ESBG elements. Advantageously, the ESBG elements and the DOE which are shown as separated in FIG. 28 form a single laminated element. As will be explained below, the second ESBG element provides a multiplicity of narrow beams, referred to as beamlets, separated by small angles where each beamlet is associated with a unique ESBG array pixel.

Each ESBG array pixel may be understood to be a plane grating characterized by a unique grating vector or a grating vector selected from a set of predetermined grating vectors. The angles of separation of the beamlets are referred to as Inter Beamlet Angle (IBA). In certain embodiments of the invention said ESBG elements may incorporate optical power to control the IBA and individual beamlet divergence angles. The effect of incorporating optical power into the ESBG array pixels is equivalent to disposing a microlens array in series with the ESBG 94. The ESBG arrays may encode further optical properties for optimizing the optical characteristics of the beamlets. For example, in further embodiments of the invention the ESBG arrays may encode diffusing characteristics. In yet further embodiments of the invention the ESBG arrays may encode keystone correction.

Figure 29:
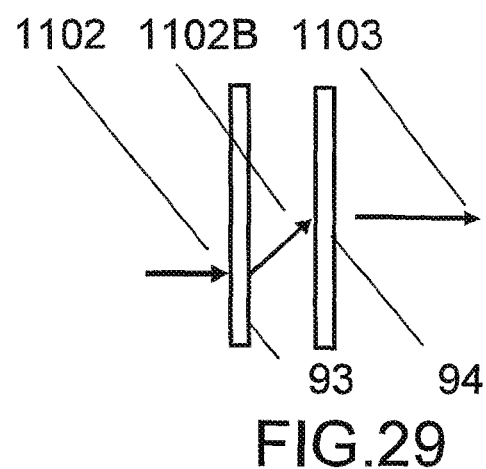
FIG. 29 is a schematic side elevation view of a one particular operational embodiment of the invention.

FIG. 29 illustrates the operation of the ESBG element 93, 94 in more detail. For convenience the ESBG elements 93, 94 are illustrated as separated single pixel elements. Normally, ESBGs require off axis illumination for high diffraction efficiency. The incident light 1102 is substantially normal to the surfaces of the ESBG elements. The ESBG element 93 deflects the light away from the incident light direction in the direction 1102B. The ESBG element 94 then deflects light 1102B into an average ray direction 1103 substantially parallel to the incident light direction 1102.

The purpose of the DOE element 95 is to modify the intensity profile of the illumination light to generate a flat average intensity profile at the flat panel display. Typically, the output light from the laser will exhibit a Gaussian intensity profile. A further function of the DOE element 95 may be to apply a predetermined amount of diffusion to the illumination light. However, as indicated above the diffusion may instead be provided by one of the ESBG elements.

As illustrated in FIG. 28 the laser provides a collimated output beam 1100 which is expanded into a diverging beam 1101 by the lens 91 and then re-collimated into the beam 1102 by the lens 92. The beam 1102 is diffracted by the ESBG elements in turn providing a collimated beam 1102. The beam 1102 passes through the DOE 95, which changes the spatial intensity profile of the beam providing an output beam 1104. The lens 96 focuses the beam 1104 into the converging beam 1105, which forms an illumination patch at the surface of the flat panel display. The projection lens 98 then projects an image of the microdisplay onto a remote screen. The invention is not restricted to any type of projection lens. The ray paths after the flat panel display are not illustrated since the invention is not restricted to any particular method of displaying an image. In certain applications of the invention the image displayed on the flat panel display may be viewed by means of an eyepiece as used in, for example, a wearable display.

Figure 30:
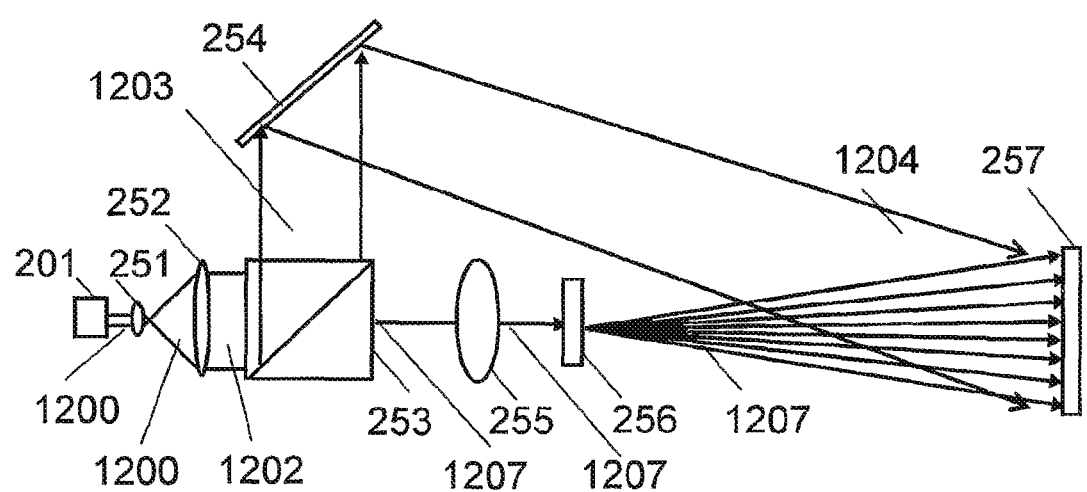
FIG. 30 is a schematic side elevation view illustrating one method of recording an ESBG array for use with the invention.

A method of recording the ESBG array is illustrated in the schematic side elevation view of FIG. 30. The recording apparatus comprise a laser source 201a beam expander lens system comprising the lenses 251, 252 a beam splitter 253, a mirror 254, a second lens 255, a computer generated hologram (CGH) 256 and a cell 257 containing the HPDLC mixture into which the SBG is recorded. The mirror 254 is typically a planar element. In certain embodiments of the invention it may be advantageous to use a curved mirror or a diffractive mirror encoding optical power in order to control the geometrical characteristics of the light reflected from the mirror. The beam splitter may be a beam splitter cube or a flat plate to which a beams splitter coating has been applied. The CGH 256 is designed to generate a set of beamlets of the type described above from a single input beam. As illustrated in FIG. 28 the laser provides a collimated output beam 1204 which is expanded into a diverging beam 1201 by the lens element 51 and then re-collimated into the beam 1202 by the lens 252. The invention does not rely on any particular method of expanding and collimating the light from the laser. The arrangement shown in FIG. 30 is suitable for lasers providing collimated output. Solutions for collimating and expanding the laser beam where the laser provides a divergent beam output are well known to those skilled in the art of laser optics. The beam splitter 253 divides the beam 1202 into the reflected beam 1203 and a transmitted beam 1205. The reflected beam 1203 is reflected by the mirror 254 to provide the beam 1024 incident on the ESBG cell 257. The lens 255 converts the transmitted beam 1205 into the beam 1206 incident on the CGH. The CGH is designed to convert the incident beam 1206 into the fanned out beamlets generally indicated by 1207. An ESBG is recorded by exposing a HPDLC mixture contained in the cell to the simultaneously applied beams 1204 and 1207 and patterning the cell with transparent array of electrodes according to the principles discussed above. In holographic recording terms beam 1204 provides the reference beam and beam 1207 provides the object beam. From consideration of FIG. 30 it will be apparent that after reconstruction using the reference beam the resulting ESBG element is equivalent to a N×N array of sub elements or pixels where each pixel encodes one beamlet. Typically the array would have dimension N=20.

Each beamlet contributes a separate speckle pattern. The cumulative effect of combining the full set of speckle patterns provided by the beamlets is to reduce speckle contrast and hence reduce the magnitude of the speckle perceived by a viewer. The physical mechanism by which the speckle is reduced relies on the angular diversity resulting from combining many beamlets characterized by small IBAs. The ESBG array pixels are modulated by selectively applying a voltage waveform to each ESBG pixel. By providing a sufficiently large dimension N and modulating the ESBG pixels using a suitable waveform a large number of speckle patterns may be averaged within the eye integration time. The applied waveform at any given ESBG pixel may have a range of possible characteristics such as rectangular or triangular and may be regular or random. The inventors have found that approximately 27 speckle patterns must be integrated to reduce the intensity variation along line in the speckle pattern to 1%. Assuming a 1/60 second eye integration time this gives 27×60=1620 speckle samples per second.

An exemplary monochromatic despeckler embodiment would have the following specifications: operating wavelength: 550 nm; an inter beam angle of 0.2 degree giving a total angle for a 40×40 width of 39*0.2=7.8 degrees. The size of the ESBG elements is typically 50×50 mm. The DOE element 95 would typically provide isotropic diffusion over a 2.5-degree cone.

Figure 31:
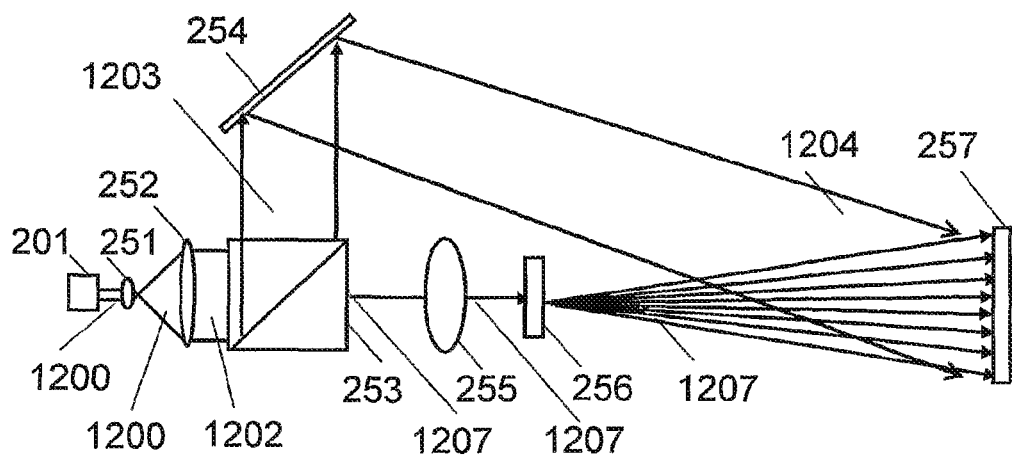
FIG. 31 is a schematic side elevation view illustrating one method of recording an ESBG array for use with the invention.
Figure 32A:
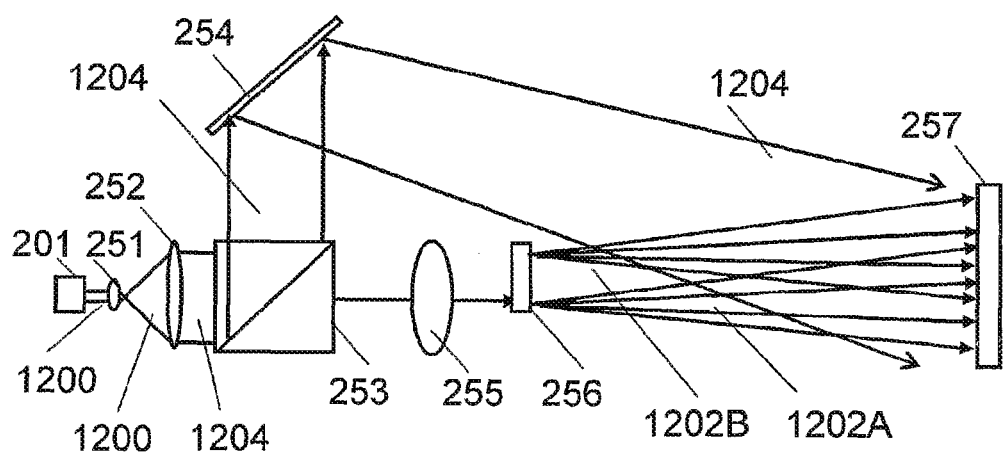
FIG. 32A is a schematic side elevation view illustrating one method of recording an ESBG array for use with the invention.
Figure 32B:
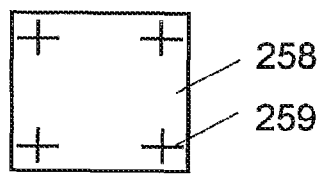
FIG. 32B is a front elevation view showing one aspect of a computer generated hologram used to record an ESBG array for use with the invention.

FIGS. 31-32 illustrate an alternative method of recording the ESBG array to the one illustrated in the schematic side elevation view of FIG. 30. FIG. 31 is identical to FIG. 30 and is shown again for comparison purposes. FIG. 32A is a schematic side elevation view of an alternative embodiment in which the recording apparatus again comprises a laser source 201a beam expander lens system comprising the lenses 251, 252 a beam splitter 253, a mirror 254, a second lens 255, a computer generated hologram (CGH) 256 and a cell 257 containing the BPDLC mixture into which the SBG is recorded. However in the case of FIG. 32A the CGH 56 generates four fan out beams instead of a single beam as used in FIG. 31. FIG. 32B is a front elevation view indicated the effective origins of the beams near to the output surface of the CGH 258 with the origin of one beam being indicated by the symbol 259.

Figure 33A:
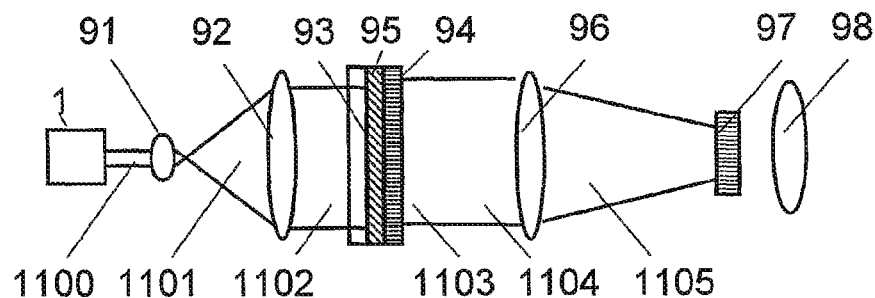
FIG. 33A is a schematic side elevation view of a laser display according to one embodiment of the invention.
Figure 33B:
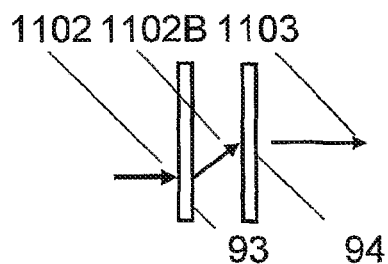
FIG. 33B is a schematic side elevation view of one particular operational embodiment of the invention.

A further embodiment of the invention illustrated in the schematic side elevation view of FIG. 33A is similar to the embodiment of FIG. 32. Again the first ESBG 93 is a plane Bragg grating in other words a grating in which the Bragg surface vectors are aligned in a common direction such that a collimated input beam in a first direction is deflected into a collimated beam in a second direction. The second ESBG 94 comprises an array of ESBG elements. However, in the case of FIG. 33A the DOE diffuser 93 is disposed in front of the ESBG elements. Advantageously, the ESBGs and the DOE form a single laminated element. As indicated in FIG. 33B the ESBG elements are again configured to operate in the fashion illustrated in FIG. 29

Figure 34B:
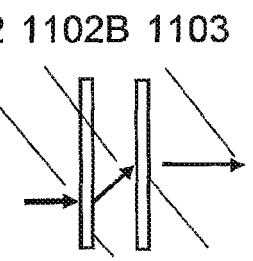
FIGS. 34A and 34B is a schematic side elevation view of a laser display according to one embodiment of the invention.
Figure 34A:
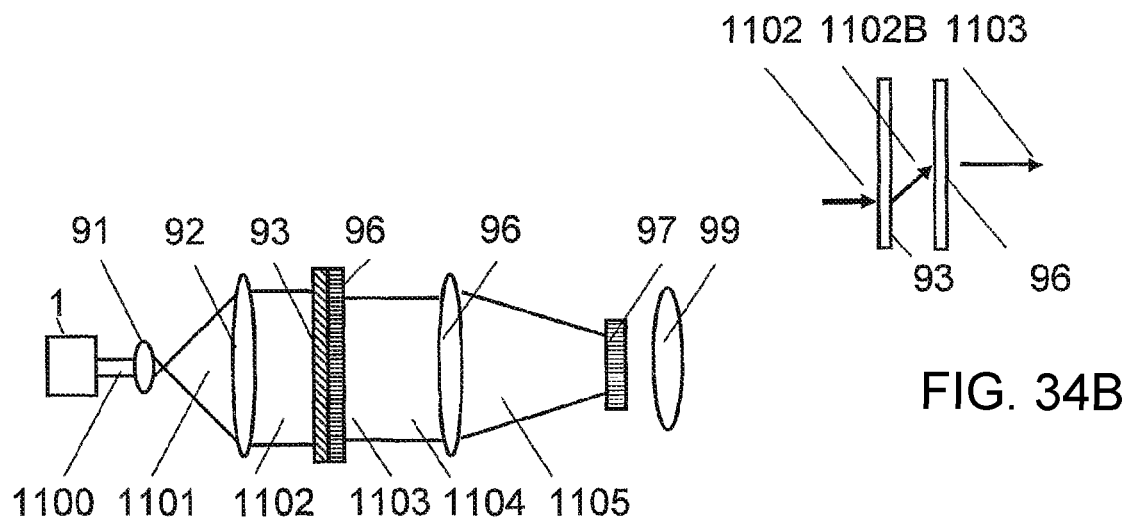

29. In an alternative embodiment of the invention illustrated in the schematic side elevation view of FIG. 34 the ESBG despeckler device is also based on two ESBG elements. Again the first ESBG element 93 is a plane Bragg grating in other words a grating in which the Bragg surface vectors are aligned in a common direction such that a collimated input beam in a first direction is deflected into a collimated beam in a second direction. The second ESBG element 96 comprises an array of ESBG pixels, which operate according to the principles of the ESBG array 94 discussed above. However, the ESBG element 96 now encodes diffusion characteristics eliminating the need for the DOE diffuser 95. Advantageously, the ESBG elements form a single laminated element. As indicated in FIG. 34B the ESBG elements 93, 96 are configured to operation in the same fashion as the ESBG elements 93, 94 illustrated in FIG. 29 and are referenced using the same symbols.

Advantageously, in the embodiments of FIGS. 28-34 the ESBG array is fabricated by first designing and fabricating a CGH with the required optical properties and then recording said CGH into the ESBG element. Recording the CGH into the ESBG element essentially means forming a hologram of the CGH using conventional holographic recording techniques well known to those skilled in the art of holography. It should be noted that the resulting ESBG element is not identical in every respect to the CGH since properties of a CGH rely on its surface phase relief features while the optical characteristics of a Bragg grating such as an ESBG rely on a complex three dimensional fringe distribution.

A volume hologram as an ESBG has much a much higher SBWP (Space Band Width Product) than a surface relief CGH since any point in the hologram can take a specific phase value. In the case of a CGH the entire optical functionality burden must be carried by just two phase levels. The CGH is calculated or iteratively optimized via a direct or iterative Fast Fourier Transform (FFT) algorithm where the reconstruction occurs in the far field. Advantageously, there are very many different solutions to a given intensity diffraction pattern problem. Hence the speckle grains in the reconstructed image can be changed, without changing the overall intensity image. There are many ways to implement such a phase change. For example: a) by recalculating the CGH with a different phase on the object; b) by recalculating the CGH with a different algorithm, or differently tuned algorithm; c) by adding a constant or slightly randomized phase carrier on the CGH; or d) by reverting the phase pixels where the CGH operates according to a binary or Babinet principle.

Embodiments Using ESBG Arrays Operating in Anti Phase

Figure 35A:
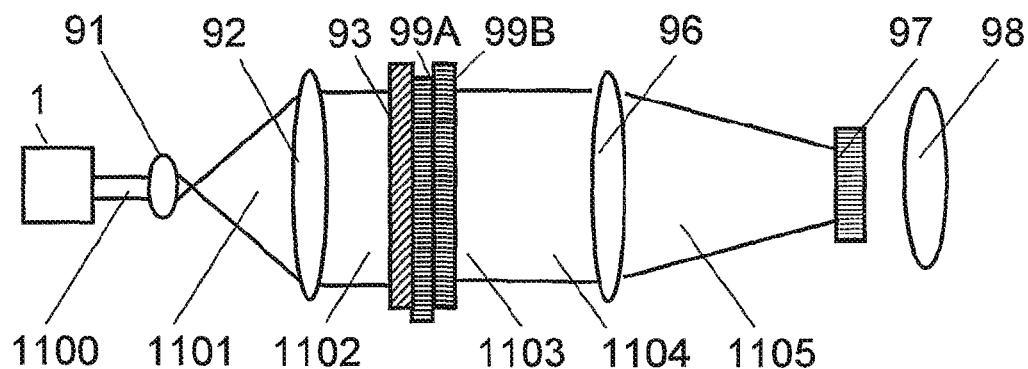
FIG. 35A is a schematic side elevation view of a laser display according to one embodiment of the invention.

In an one embodiment of the invention illustrated in the schematic side elevation view of FIG. 35A there is provided a display device comprising a laser source 1, a beam expander comprising the lens elements 91, 92 a despeckler further comprising the HOE 93, the ESBG arrays 99A, 99B, a lens 96 a flat panel display 97 and a projection lens 98. The ESBG elements 99A, 99B are each arrays of selectively switchable ESBG elements. Each ESBG array operates according to the principles of the ESBG arrays of FIGS. 28-34. Each ESBG array essentially provides a multiplicity of beamlets separated by small angles. Each ESBG array also provides a predetermined amount of diffusion to each said beamlet.

The HOE 97 is typically recorded in a photopolymer of the type manufacture by DuPont. Desirably, the HOE has a diffraction efficiency of at least 99%. The HOE typically diffracts incident collimated light at normal incident into a direction at 30 degrees to said normal incidence direction. The output angle of the HOE provides the off axis launch angle for the ESBGs. The invention does not rely on any particular value of the launch angle. However the inventors have found that typical launch angles are in the range 30-50 degrees. The apparatus of FIG. 35A may further comprise a DOE for providing illumination control functions of the type discussed above. As indicated above the need for the DOE may be eliminated by providing suitable diffusion and other illumination control optical functions within the ESBGs.

Advantageously the ESBG arrays are offset by a fraction of the ESBG element width in at least one of the vertical or horizontal array axes. In some cases the ESBGs may be offset by an ESBG element width in at least one of the vertical or horizontal axes.

Figure 35B:
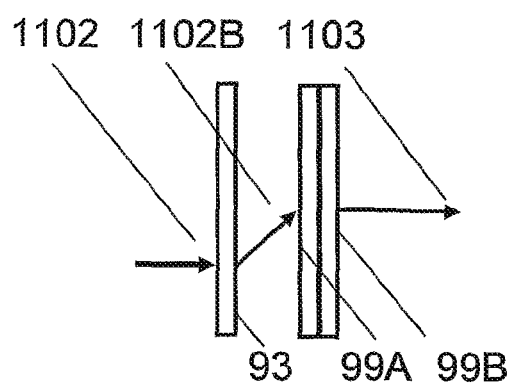
FIG. 35B is a schematic side elevation view of one particular operational embodiment of the invention.

The configuration of the HOE 93 and the ESBG arrays 99A, 99B is illustrated in FIG. 35B. In other embodiments of the invention the HOE may be replaced by another diffractive device suitable for performing the required beam steering such that each ESBG elements diffracts light incident at some specified launch angle into a direction normal to the surfaces of the ESBG elements. It will be clear from consideration of FIGS. 35A-35B that and equivalent arrangement of the HOE and the ESBG arrays is provided by disposing the HOE between the first and second ESBG arrays. In other embodiments of the invention the ESBG elements may be tilted at a suitable angle with respect to the illumination eliminating the need for the HOE 97.

In the embodiment of FIG. 35A the ESBG arrays 99A, 99B are driven in a random anti-phase fashion by means of an ESBG controller which is not illustrated. To put it another way the ESBGs 99A, 99B are operated in tandem with alternating voltages applied across the ESBG layers. The optical effect of each ESBG despeckler device is varied from zero to maximum value at a high frequency by applying an electric field that varies in a corresponding varying fashion. Each incremental change in the applied voltage results in a unique speckle phase cell.

It should be noted that since the ESBG arrays are driven in anti-phase only one ESBG element is active at any time along a give ray path through the ESBG arrays.

Figure 35C:
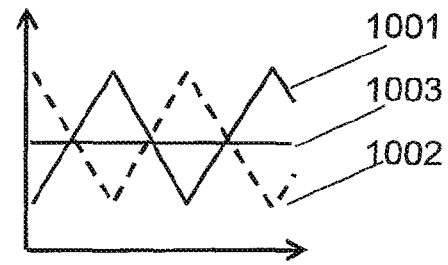
FIG. 35C is a chart showing a first ESBG applied voltage characteristic used in the embodiment of FIG. 35A.
Figure 35D:
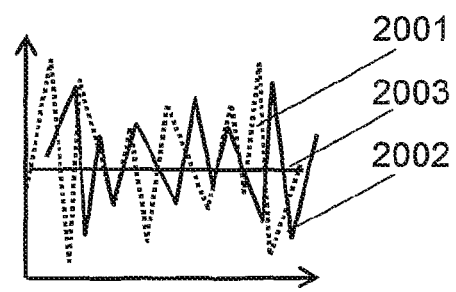
FIG. 35D is a chart showing a second ESBG applied voltage characteristic used in embodiment FIG. 35A.

Referring to FIG. 35C which is a chart showing voltage versus time applied to the ESBG arrays 99A and 99B it will be seen that there is a phase lag between the voltages 1001,1002 applied across the ESBG arrays. The effect of applying such waveforms is that the average intensity 1003 of the speckle phase cells remains substantially constant, thereby satisfying the statistical requirements for speckle reduction. Other types of waveforms may be applied, for example sinusoidal, triangular, rectangular or other types of regular waveforms. Alternatively, it may be advantageous in statistical terms to use waveforms based on a random stochastic process such as the waveforms 2001, 2002 illustrated in the chart of FIG. 35D. Again the effect of applying such waveforms is that the average intensity 2003 of the speckle phase cells remains substantially constant.

Figure 36:
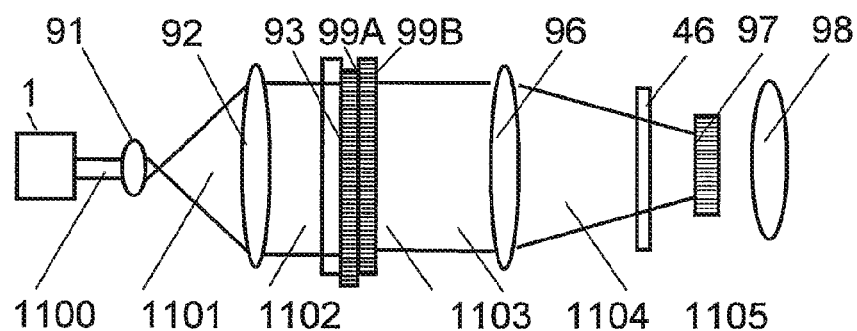
FIG. 36 is a schematic side elevation view of a laser display according to one embodiment of the invention.
Figure 37:
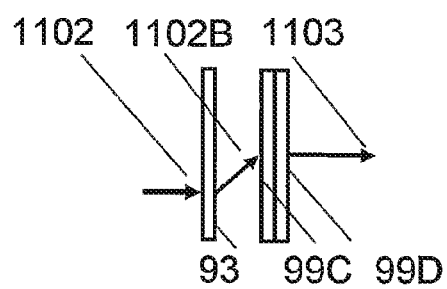
FIG. 37 is a schematic side elevational view of another particular embodiment of the invention.

FIG. 36 is a schematic side elevation view of a further embodiment of the invention similar to the one shown in FIG. 35. The apparatus of FIG. 36 further comprises an electrically controllable phase modulator cell indicated by 46. The phase modulator is any optical device that can provide a phase retardation in the range from 0 two pi radians. The invention is not limited to any particular phase modulator. Desirably, the phase modulator may be based on an ESBG despeckler devices which encodes a sub wavelength grating. By providing phase diversity and angular diversity the apparatus of FIG. 36 offers an effective solution for reducing both near and far field speckle.

Embodiment Using Combined Phase Diversity and Angular Diversity

Figure 38:
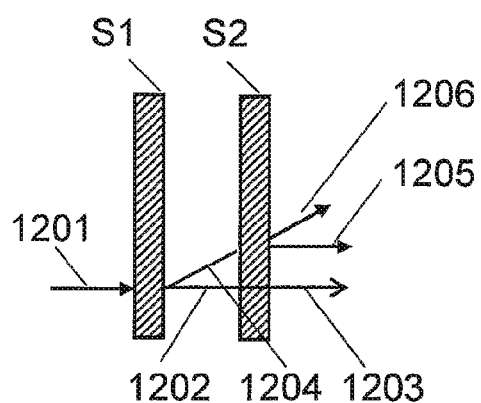
FIG. 38 is a schematic side elevation view of one particular embodiment of the invention.

In a further embodiment of the invention illustrated in the schematic side elevation view of FIG. 38 there is provided a despeckler apparatus based on the principle of angular and phase diversity. The apparatus comprises a plane ESBG indicated by S1 for deflecting normally incident collimated light 3201 through a specified angle to provide a beam 3204 and a second plane ESBG S2 design to diffract incident light 3204 at said angle into direction 3205 normal to S2 When the ESBGs S1, S2 are not in their diffracting states incident light 3201 is transmitted without substantial deviation through S1 as the light 3202 and the light 3202 is in turn transmitted through S2 without substantial deviation emerging as light 3203. When the ESBG S2 is not in a diffracting state the incident light 3204 is transmitted without deviation in the direction indicated by 3206.

The lateral displacement of the beam when the ESBGs are in a diffracting state results in an optical path difference given by the product of the separation of gratings S1, S2, the average refractive index of the optical path between gratings S1, S2 and the tangent of the diffraction angle. In effect the apparatus of FIG. 38 provides angular diversity and phase diversity simultaneously. ESBG elements illustrated in FIG. 38 may form pixels of two-dimensional ESBG arrays.

Figure 39:
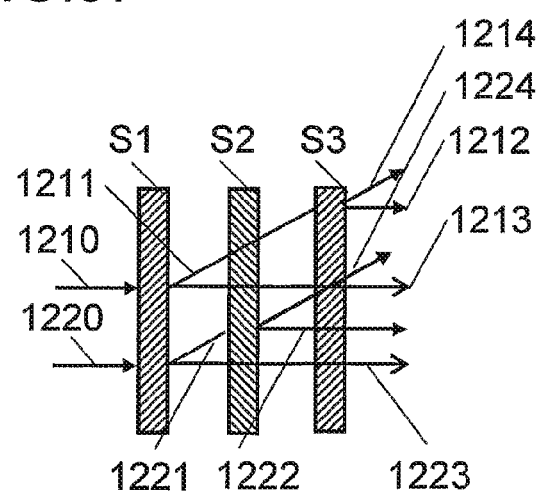
FIG. 39 is a schematic side elevation view of another particular embodiment of the invention.

FIG. 39 is a schematic side elevation view of a further embodiment of the invention related to the embodiment illustrated in FIG. 37A. The apparatus comprises a plane ESBG indicated by S1 for deflecting normally incident collimated light 3210 and 3220 through a specified angle to provide beams 3211, 3221 respectively and a second plane ESBG S2 design to diffract incident light such as 3221 at said angle into direction 3222 normal to S2. A third plane grating ESBG S3 diffracts light incident at said diffraction angle such as 3211 into a direction 3212 normal to S2. When the ESBGs S1, S2, S3 are not in their diffracting states incident light 3210, 3220 is transmitted without substantial deviation through S1, S2, S3 in turn emerging as light 3213, 3223 respectively. When the ESBG S2, S3 are not in a diffracting state the diffracted light 3211, 3221 is transmitted without deviation through S2, S3 emerging as the light 3214, 3224 respectively. It will be clear from consideration of FIG. 39 that the lateral displacement of the incident light when the ESBGs are in a diffracting state results in an optical path difference given by the product of the separation of gratings S1, S2 or S2, S3, the average refractive index of the optical path between gratings S1, S2 or S2, S3 and the tangent of the diffraction angle. In effect the apparatus of FIG. 38 provides angular diversity and phase diversity simultaneously. The ESBG elements illustrated in FIG. 38 may form pixels of two-dimensional ESBG arrays. It will be clear from consideration of FIG. 39 that a range of switching schemes may be applied to the ESBG layers to provided combined phase and angular diversity speckle reduction.

Recording of Anti-Phase ESBG Arrays

In preferred embodiments of the invention a multiplicity of different diffuser pattern are recorded in a master diffractive element such as a CGH. Said multiplicity of different diffuser patterns are then recorded into each of two ESBG arrays. Desirably, the ESBGs are operated according in random anti phase according to the principles discussed above.

Figure 40:
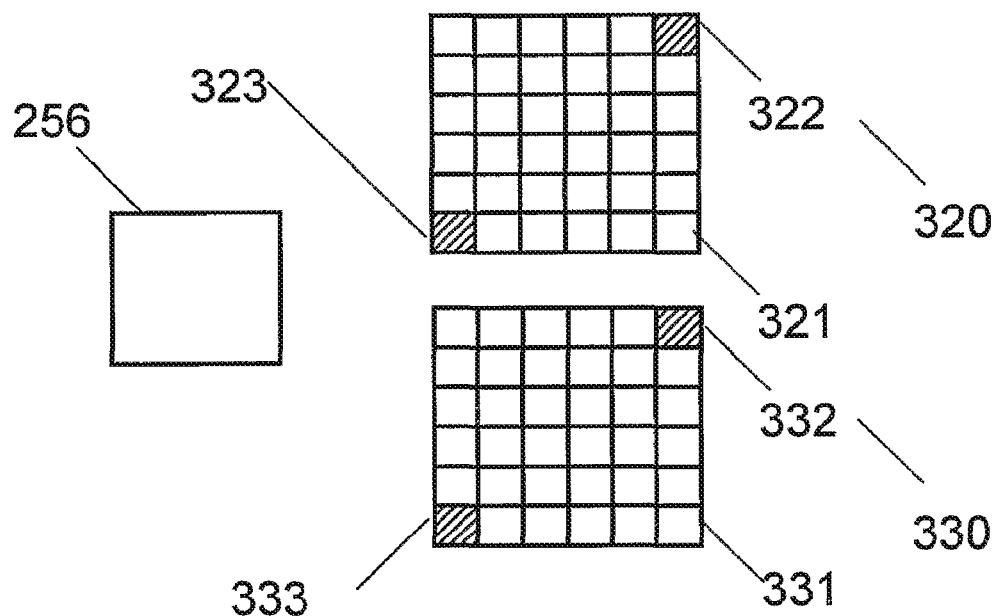
FIG. 40 is a schematic front elevation view of aspects of a computer generated hologram used to record an ESBG array used in embodiments of the invention.
Figure 41:
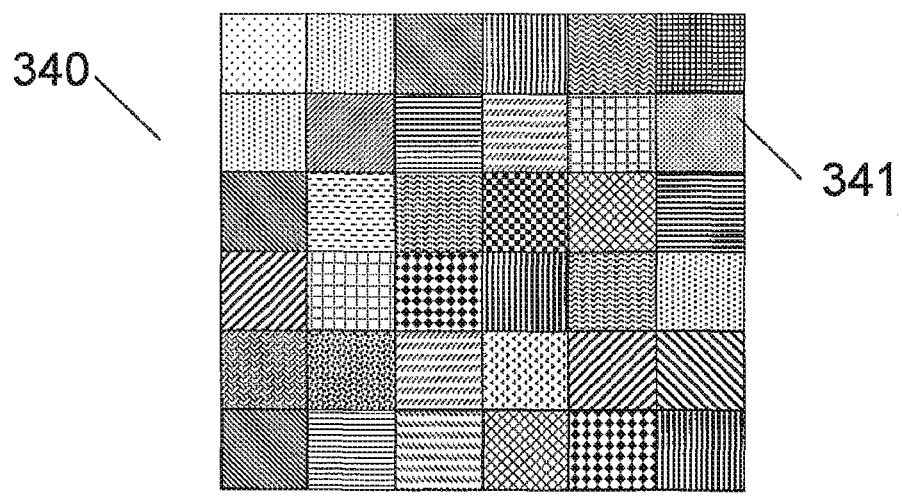
FIG. 41 is a schematic front elevation view of a computer generated hologram used to record an ESBG array used in embodiments of the invention.

The recording principles for ESBG arrays designed to operate in random anti phase are illustrated schematically in FIGS. 40-41. In a first step shown in FIG. 40 a quartz binary CGH diffuser indicated by 256 recorded using an optical arrangement similar to the one illustrated in FIG. 32 is provided. In the next step also illustrated in FIG. 40 a CGH diffuser is used in a holographic recording process to form two ESBG cells indicated by 320, 330 containing ESBG elements such as the ones indicated by 321, 331. A 10×10 pixilated electrode pattern is then deposited on each cell so that 100 individual sub-cells are provided. The second ESBG array is identical to the first ESBG array but is rotated through 180 degrees such that the ESBG elements indicated by 322, 323 in the first array become the elements indicated by 332, 333 respectively in the second array. The first and second ESBG arrays operate in random anti phase as described earlier. At any time all the cells are diffusing. However, the electrode activation pattern is randomly generated; ensuring a different phase and therefore a different speckle pattern is constantly generated. The electrode pattern would typically be updated at a frequency of around 2.5 kHz.

In FIG. 40 the diffuser 310 is an ESBG characterized by a uniform diffusion prescription modulated using a pixilated structure. In other words each pixel is characterized by the same diffusion characteristics. The number of possible speckle patterns can be greatly increased by recording a master array of CGH elements with pre-computed diffuser prescriptions mapped to the individual pixels in the ESBG arrays. The CGH elements may provide angular and phase diversity. FIG. 41 is a front elevation view of such a CGH array indicated by 340 and comprising CGH elements such 341.

Figure 27:
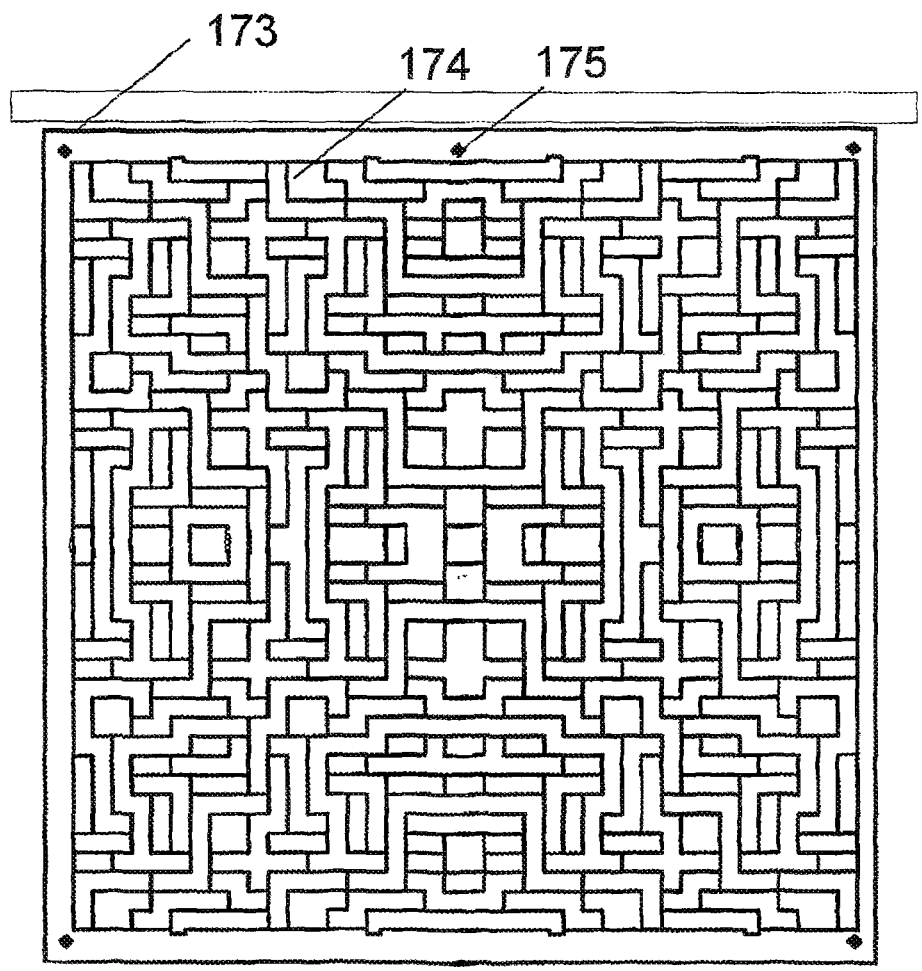
FIG. 27 is a plan view of a particular embodiment of an ESBG electrode array used in an embodiment of the invention.

Although a regular 10×10 ESBG is illustrated in FIGS. 40-41 it will be clear that arrays of much higher resolutions may be fabricated based on the principles discussed above. However, small size, cost and complexity requirements in certain despeckler applications may limit the number of elements in the array. It will also be clear that irregular electrode patterning such as that shown in FIG. 27 may be used.

The master array may comprise a wide range of different diffusers whose prescriptions may be designed to provide diffusion patterns characterized by scattering angles, scattering pattern asymmetries, structure diffusion patterns and many others. The invention is not restricted to any particular type of diffusion pattern. Typically, the inventors have found that the far field diffusion patterns required in practical despecklers require a total diffusion angle in the region of 0.5 degrees. The diversity of the available diffusion patterns which may provide angular phase and polarization diversity results in a very large number of speckle samples for integration.

The despeckler relies on combining the effects of many different types of diffuser patterns encoded within a diffractive element. The diffuser patterns may rely on angular diffusion patterns for providing angular diversity with an effect similar to that of a rotating ground glass diffuser.

Embodiments Based on Hadamard Diffusers

Approaches to speckle reduction based on diffusers suffer from the problem that assigning random phases to each speckle cell will require a large number of phase patterns to achieve the maximum theoretical speckle reduction. To overcome this problem in one embodiment of the invention the ESBG may be configured to provide Hadamard diffusers. The principles of Hadamard phase plates are well known in the optical data processing literature. The theory of Hadamard diffusers in relation to speckle reduction is discussed in some detail in a paper by J. I. Trisnadi entitled "Hadamard speckle contrast reduction," (Optics Letters 29, 11-13 (2004)). Hadamard diffusers offer the advantage of a short phase correlation length allowing the target speckle diversity to be achieved more easily. By providing the permutations of rows and columns according to Hadamard theory a set of $N^2$ Hadamard phase patterns is generated providing considerable economy in terms of the number of phase patterns with a prescribed combination of pi and 0 radian phase shifts. When these phase patterns are presented within the eye integration time with equal weight $N^2$ independent speckles are produced resulting in speckle contrast reduction by a factor of N. The corresponding classical N×N diffuser using random phase would in theory require an infinite number of phase patterns to achieve the same speckle contrast.

Passive Matrix Addressing Schemes for Embodiments Using ESBG Arrays

Several of the embodiments disclosed in the present application require an active matrix switching scheme. The passive matrix addressing schemes to be used in the present invention differs from the ones traditionally used in display panels such as LCD panels. In the latter case all the complexity and requirement for well-defined and steep transition responses is dictated by the way in which the matrix addressing process must be implemented. In normal passive matrix addressing a voltage is defined for all pixels along a first line and a line scan pulse is asserted. When the first line has been scanned the same procedure is applied for the next line and so on. The RMS voltage applied to each pixel is essentially overdriving when scanning a given line, but only by a sufficient margin to ensure that adjacent pixels are not activated, and relying on the slower decay to 'hold' state until the next scan comes round. Such a procedure is required in any imaging display where it is necessary to address any specific random pixel in the array without affecting all other pixels.

In the case of the ESBG arrays used in the present invention the row and the columns are driven with arbitrary, random bit patterns as will be explained in the following paragraphs. In other words there is no requirement for a scan drive as in an active matrix display. This offers certain advantages, which may be appreciated by considering the simple example of a 3×3 array. Only six drivers required for a multiplexed drive scheme in a 3×3 array. In this case the column drivers could program any one of $2^3=8$ patterns into the column drive shift register. The row driver could then decide for each row whether to display that row as a positive pattern (i.e. drive a zero, so anything set to 1 in the row is driven) or as a negative pattern (i.e. drive a 1 so anything set to 0 is driven). There are therefore eight distinct options for the row drive also. This gives a total of 64 patterns. Some examples are:

Column=010 Row=000, in which case a vertical stripe down the center is driven; Column=010 Row=111, in which case two outer vertical stripes are driven; Column=010 Row=010, in which case hollow diamond pattern is provided; and Column=010 Row=101, in which case an X shape pattern is provided; and so on.

The invention is certainly not limited to arrays of such low resolution. At the time of filing the present application the inventors believe that ESBG array 240×240 switched pixels or higher resolution of area 20×20 mm are feasible.

In the ESBG array each pixel provides a different hologram prescription resulting in a different mix of light for each pixel state and hence a different speckle pattern. Both the row and the columns are driven as if they were columns, with arbitrary, random bit patterns. In other words no scan drive is required as in displays. Therefore there is the simplification that only one type of driver is required. One useful feature in the dual array despeckling scheme is that if just the row drive is inverted, typically by sending a single control bit into the drive chip, then the pattern is inverted. This means that the same data can be shifted into both ESBG arrays. It would be necessary for one array to be set to the invert state and the other array to the normal state.

For example, a 20 bit column driver chip on each sheet of glass can drive a 20×20 array that has 1,099,511,627,776 distinct patterns. Even if the optical system is symmetric resulting in the need to divide the number of patterns by 16 to account for the four axes of symmetry, the number of available speckle patterns is still large. Since all the control lines are driven all the time the need for precise voltage characteristic control is eliminated. Likewise, the problems of maintaining contrast and light efficiency are eased by having the full drive voltage applied at all times. Using this method, the rows and columns are fully charged or discharged. Hence the problem of crosstalk is avoided. The pattern can be held as long as desired for optimizing the response time, power dissipation and visual integration of the diffuser descriptions.

Figures 42, 43, 44, 45:
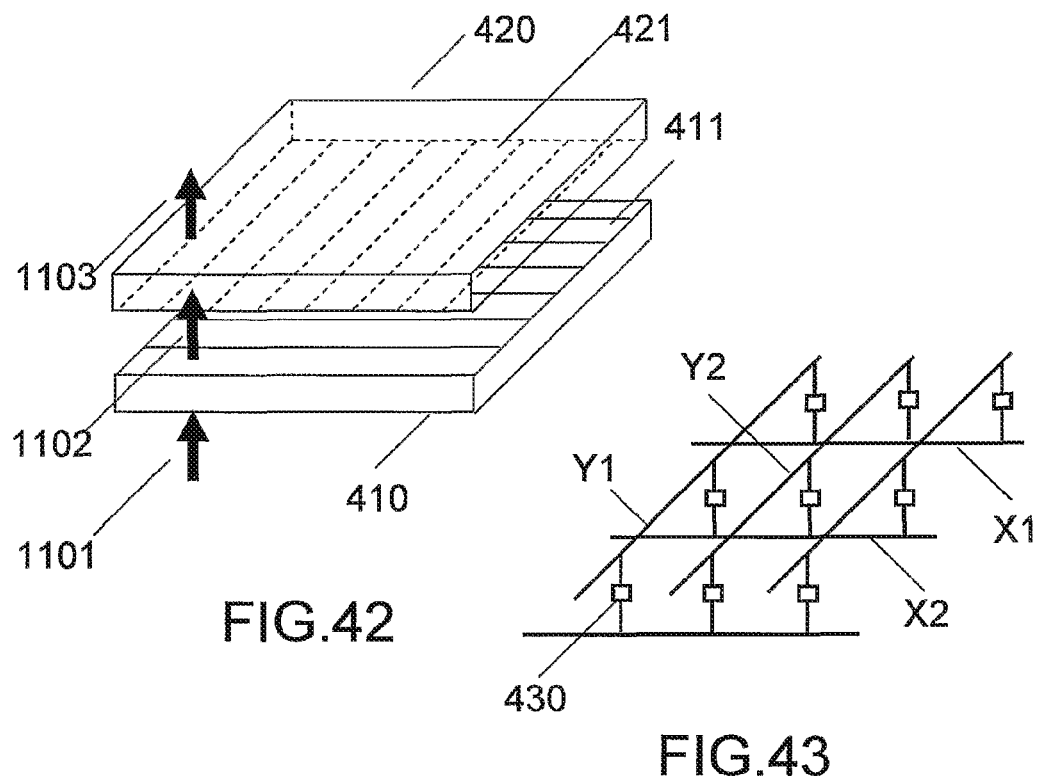
FIG. 42 is a three dimensional schematic illustration of an ESBG array switching scheme used in the invention.
FIG. 43 shows the addressing scheme in more detail used in the invention.
FIG. 44 is a table showing the sequence of logic states applied to the rows of an ESBG array used in the invention.
FIG. 45 is a table showing the sequence of logic states applied to the columns of an ESBG array used in the invention.

FIG. 42 is a schematic three dimensional illustration showing the apparatus for driving an active matrix despeckler array according to the principles of the invention. The apparatus comprises a first substrate 410 and a second substrate 420, Said first substrate has a first grid of electrodes 411 applied to its second surface. Said second substrate has a second grid of electrodes 421 applied to its first surface which opposes the second surface of the first substrate. The electrode grids are oriented in orthogonal directions providing orthogonal rows and columns as illustrated in FIG. 42. In contrast to display applications in the apparatus of FIG. 43 the rows and columns are driven with arbitrary random bit patterns. There is no scan drive as used in a display device. The rows and columns are either full charged or discharged with the pattern being as long as desired for optimizing the response time, power dissipation and visual integration of the diffuser descriptions. There is no significance to the rows and columns and identical drivers may be used for the two. By this means it is possible to provide very large numbers of random speckle patterns.

FIG. 43 shows the addressing scheme in more detail within which row addressing lines such as X1, X2 and column addressing lines such as Y1, Y2 are used to drive pixels such as the one schematically illustrated by 430.

The array may use a Chip-On-Glass (COG) mounted device such as the 240 channel NT7706 device manufactured by Novatec. Typically a custom controller, 40 v boost switcher and discrete common drive and software including the despeckler switching algorithm would also be provided. The device would typically require a 5 volt input. The link to the cell would be via a standard 10 channel off the shelf flex. Communications and power connectors would be mounted COG.

FIGS. 44-45 represent the sequence of 1 or 0 logic states applied to rows or columns of a 10×10 pixel array. FIG. 44 represents the sequence of logic states generally indicated by 441 provided by the row driver. FIG. 45 represents the sequence of logic states generally indicated by 442 provided by the column driver. Each driver provides $2^{10}$ random states into each of the column and row shift registers. It will be clear from consideration of FIG. 41 that the number of distinct patterns that can be generated by the above means is given by $(2^{20} \times 2^{20})/2 = 1,099,511,627,776$.

FIG. 46 is a schematic view of the 3×3 despeckler ESBG array module. The device generally indicated by 460 comprises ESBG elements such as 461, a column drive 462 a row driver 463, input data interface indicated by 464 and communication link 465. The column driver 463 transfers $2^3 = 8$ patterns into a column shift register. The row driver 462 transfers $2^3 = 8$ patterns into a row shift register.

FIG. 47 illustrates the waveform during despeckler ESBG element operation. High Voltage (HV) and Ground (GND) potentials are indicated in each case. The applied voltages are typically between −50 v and −80 v. The solid line plot indicated by 201 results from the ESBG element being driven clear, that is the ESBG is in its non-diffracting state. The dashed line plots indicated by 202, 204 result from the ESBG element remaining in its diffracting state. Note that the polarity of the drive must be alternated to avoid DC ionization of the HPDLC material.

Figure 49:
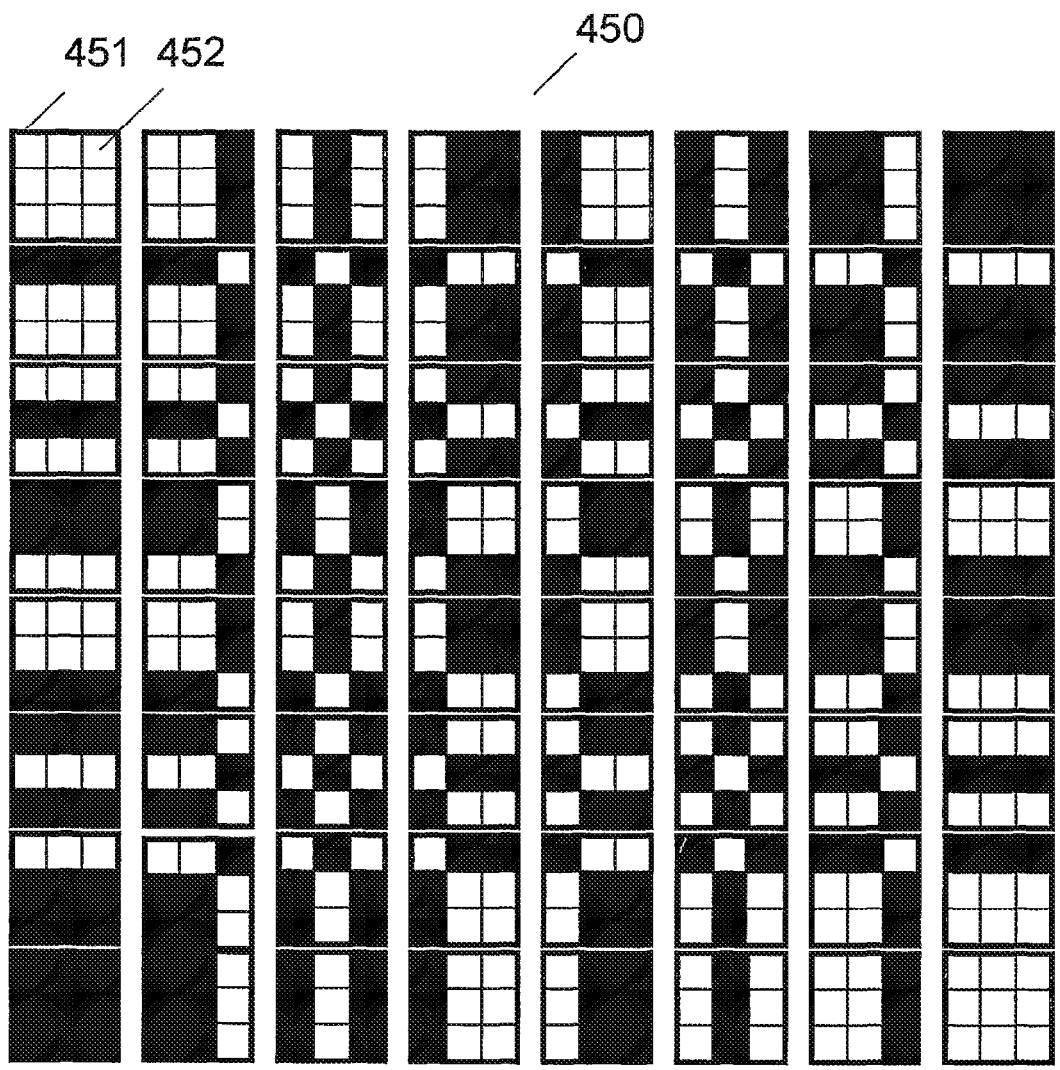
FIG. 49 is a schematic illustration of the complete set ESBG array patterns generated using the embodiment of FIG. 46.

FIG. 48 illustrates the speckle sample generating process used in FIG. 46 in more detail. Column and row data is indicated by the tables 470, 480 containing logic 1,0 data as indicated by 471, 481. The state of the ESBG array for the illustrated column and row data is indicated by the set of array patterns 490 of which the array 491 is one example comprising ESBG elements such as 492. For the 3×3 array illustrated there are 8*8=64 possible patterns. FIG. 49 provides an illustration of the complete set of patterns indicated by 50. One pattern in the set is indicated by 451 with one element of the patter 451 being indicated by 452. It should be noted that the ESBG element has been shown black whenever the row and column voltage are different and white whenever the row and column voltage are the same. It should also be noted that there are actually only 32 not 64 distinct patterns, since in the case when the cell is driven the transition 0-1 is the same as 1-0 and in the case when the cell is not driven 11 is the same as 00.

It will be clear that the switching schemes illustrated in FIGS. 42-49 may be applied to any of the ESBGs described in the present application including ESBG arrays operating in random anti phase.

Figure 50:
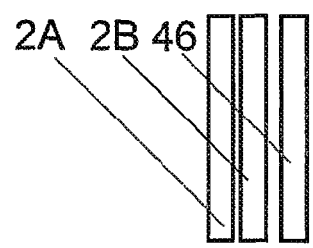
FIG. 50 is a schematic side elevation view of a an ESBG despeckler device using ESBG arrays operating in random anti phase and further comprising a polarization switch stage.

FIG. 50 is a schematic side elevation view of an ESBG despeckler device using ESBG arrays operating in random anti phase, which further comprises a polarization switch stage. The apparatus generally indicated by 90 comprises two ESBG arrays 2A, 2B operating in anti phase as described above and a polarization switch 46. The two diffusing layers operate in anti-phase triggering an angular/phase diversity due to the anti-phase operation and the 180 degree recording set-up as described above. The polarization switch provides polarization diversity. The polarization switch, which is not pixilated, is recorded as a sub wavelength grating. The polarization switch operates as a fast polarization rotator providing a phase shift for a given input light polarization. The polarization switch is randomly switched with respect to the pixelated diffuser. Its phase shift is always set to π, in order to create the maximum speckle contrast using local destructive interference.

Embodiments Providing Edge Illuminated Despecklers

In the embodiments of the invention discussed above the ESBG despeckler device has been implemented in an illuminator for use in a conventional front or rear projection display. In further embodiments of the invention the ESBG despeckler devices described above may be configured within edge illuminated illuminators and display. Such embodiments of the invention may be used to provide a backlight for illuminating and despeckling laser illuminated flat panel displays.

In certain cases to be discussed below an edge lit ESBG despeckler device may itself provide a complete display device.

Figure 51:
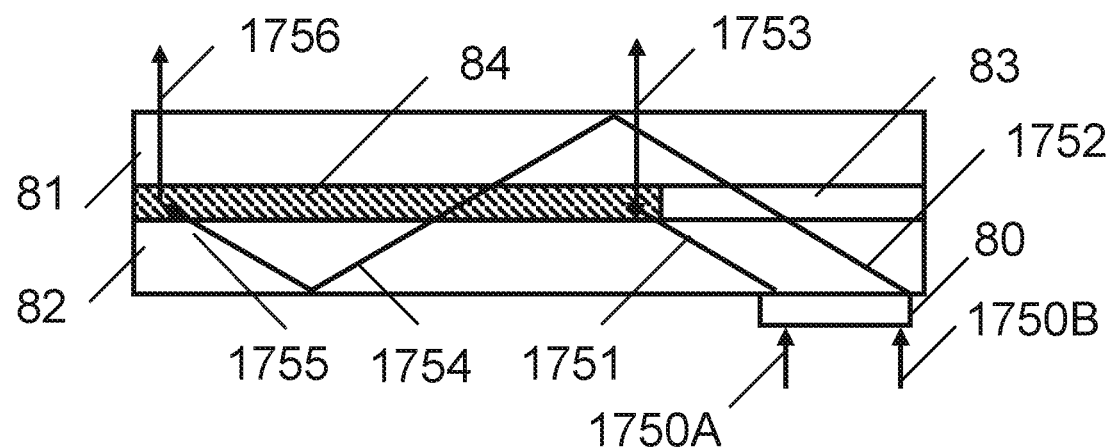
FIG. 51 is a schematic side elevation view of one embodiment of the invention providing an edge lit ESBG despeckler device.

In a further embodiment of the invention illustrates in the schematic side elevation view of FIG. 51 there is provided an edge illuminated despeckler. Referring to FIG. 51 we see that the edge-illuminated despeckler comprises first and second transparent substrates 81, 82 and ESBG element 84 sandwiched between the substrates, a transparent region 83 adjacent to the ESBG element and a light-coupling element 80. The light coupling element may be a diffractive optical element, a prismatic element or any other type of optical element commonly used for coupling light into a light guide. A diffractive optical element will in most cases provide the most compact solution. Substrates 81, 82, the ESBG element 84 and the transparent region 83 together form a total internal reflection light guiding structure. Patterned ITO electrodes are applied to the opposing surfaces of the substrates. The transparent region may be a PDLC region not containing a grating. Desirably the transparent region 83 would have a refractive substantially the same as that of the substrates. The light-coupling optical element provides a means for injecting light from a laser source, which is not illustrated into the device. The light-coupling element may be a DOE. Alternatively the light-coupling device may be a prismatic element or an array of prismatic elements. The outer face of substrates 81, that is the face opposite to the one in contact with the ESBG, provides a light output surface. Light emitted from the output surface may be used to illuminate a flat panel display. A complete illumination system will normally require additional elements such as relay lenses, prisms etc. which are not illustrated.

The ESBG element 84 comprises an array of selectively switchable ESBG pixels designed and fabricated according to the principles discussed above. The ESBG array provides an array of narrow beams or beamlets, separated by small angles. The beamlets have an average angle that is substantially normal to the plane of the ESBG array. Each ESBG array element may be a plane grating characterized by a unique grating vector or a grating vector selected from a set of predetermined grating vectors. The angles of separation of the beamlets are referred to as Inter Beamlet Angles (IBAs). In certain embodiments of the invention said ESBG elements might have optical power to control the IBA and individual beamlet divergence angles. The ESBG elements may encode further optical properties. For example, in further embodiments of the invention the ESBG elements may encode diffusing characteristics for optimizing the angular extent and uniformity of output light. In yet further embodiments of the invention the ESBG elements may encode keystone correction. The ESBG may be recorded using apparatus similar to that illustrated in FIG. 32.

Input collimated laser light is indicated by 1750. The light-coupling element diffracts said input light through a large angle into rays such as those indicated by 1751, 1752 that exceed the substrate-to-air critical angle as determined by the refractive index of the substrates. As indicated in FIG. 51 rays such as 1751 are diffracted by the ESBG arrays into the direction 1753 substantially normal to the plane of the ESBG array. On the other hand rays such as 1752 that propagate through the region 83 follow the total internal reflection path generally indicated by 1752,1754,1755 with the ray 1755 being diffracted by the ESBG array into a ray direction indicated by 1756 substantially normal to the plane of the ESBG array. The rays 1752 and 1756 provide despeckled light can be used to illuminate a display panel.

Figure 52:
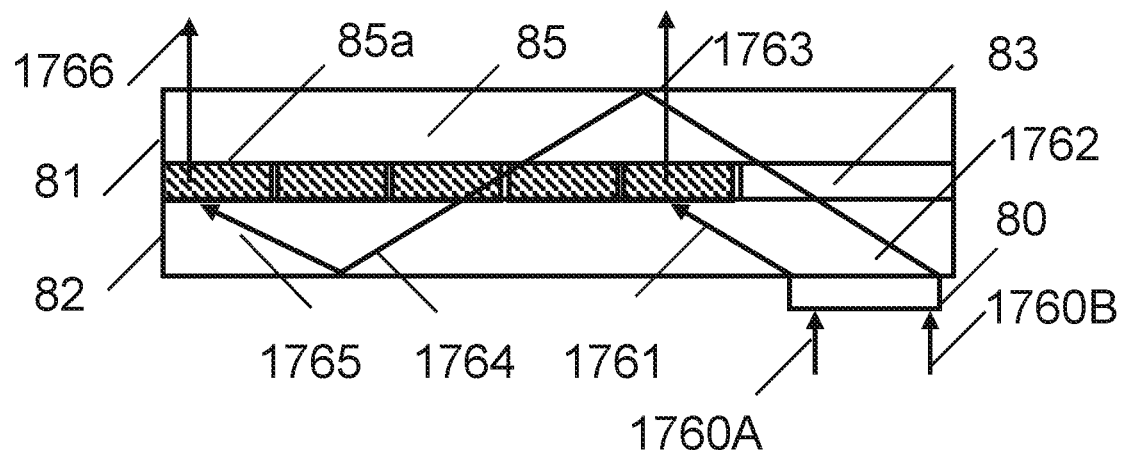
FIG. 52 is a schematic side elevation view of one embodiment of the invention providing an edge lit ESBG despeckler device.

A further embodiment of the invention is shown in the schematic sidle elevation view of the FIG. 52. The embodiment of FIG. 52 differs from the embodiment illustrated in FIG. 51 in that the ESBG element is an ESBG array 85 containing ESBG pixels such as 85A. Desirable the ESBG elements have electrodes designed according to the principles illustrated in FIGS. 21-27. The ray paths indicated by 1760, 1761, 1763 and 1760, 1762, 1764, 1765, 1766 are equivalent to the ray paths 1750, 1751, 1753 and 1750, 1752, 1754, 1755, 1756 respectively illustrated in FIG. 51.

Figure 53:
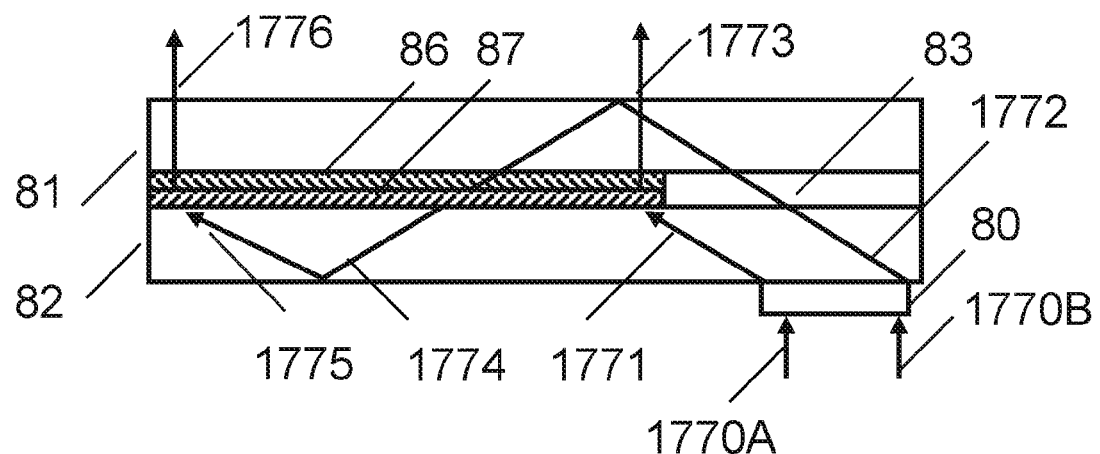
FIG. 53 is a schematic side elevation view of one embodiment of the invention providing an edge lit ESBG despeckler device.

A further embodiment of the invention is shown in the schematic sidle elevation view of the FIG. 53. The embodiment of FIG. 53 differs from the embodiment illustrated in FIG. 51 in that two ESBG layers are sandwiched between the substrates. The ray paths indicated by 1770, 1771, 1773 and 1770, 1772, 1774, 1775, 1776 are equivalent to the ray paths 1750, 1751, 1753 and 1750, 1752, 1754, 1755, 1756 respectively illustrated in FIG. 51

Figure 54:
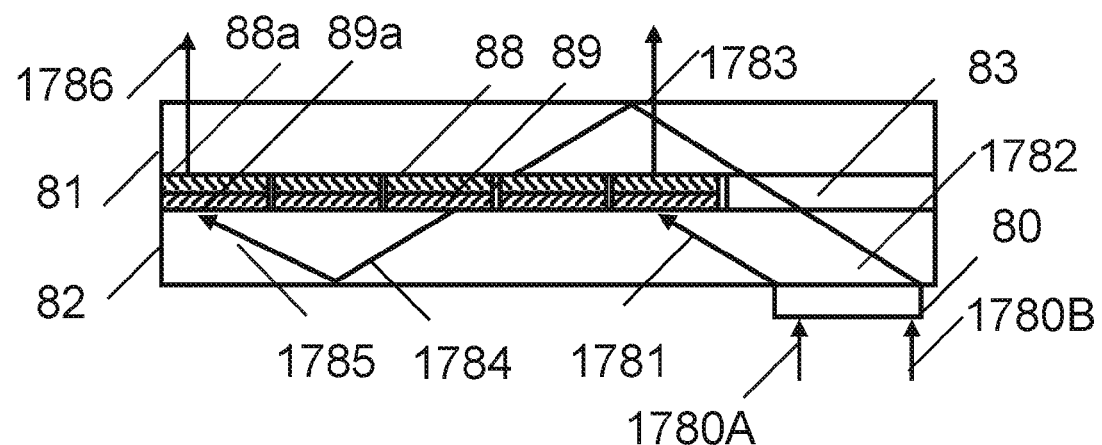
FIG. 54 is a schematic side elevation view of one embodiment of the invention providing an edge lit ESBG despeckler device.

A further embodiment of the invention is shown in the schematic sidle elevation view of the FIG. 54. The embodiment of FIG. 54 differs from the embodiment illustrated in FIG. 51 in that two ESBG layers are sandwiched between the substrates and the ESBG elements are ESBG arrays 88, 89 containing ESBG pixels such as 88a, 88b. Desirably the ESBG elements have electrodes designed according to the principles illustrated in FIGS. 21-27. The ray paths indicated by 1770, 1771, 1773 and 1770, 1772, 1774, 1775, 1776 are equivalent to the ray paths 1750, 1751, 1753 and 1750, 1752, 1754, 1755, 1756 respectively illustrated in FIG. 51.

In any of the embodiments illustrate in FIGS. 51-54 a DOE element may be to modify the intensity profile of the illumination light to generate a flat average intensity profile. The DOE element may be disposed at the output surface of the substrate 81. A further function of the DOE element could be to apply a predetermined amount of diffusion to the illumination light or to provide more favorable incident angles to match the input light to the diffraction angles of the ESBG elements.

Embodiments Providing Edge Illuminated Despeckler for Color Illumination

Figure 55:
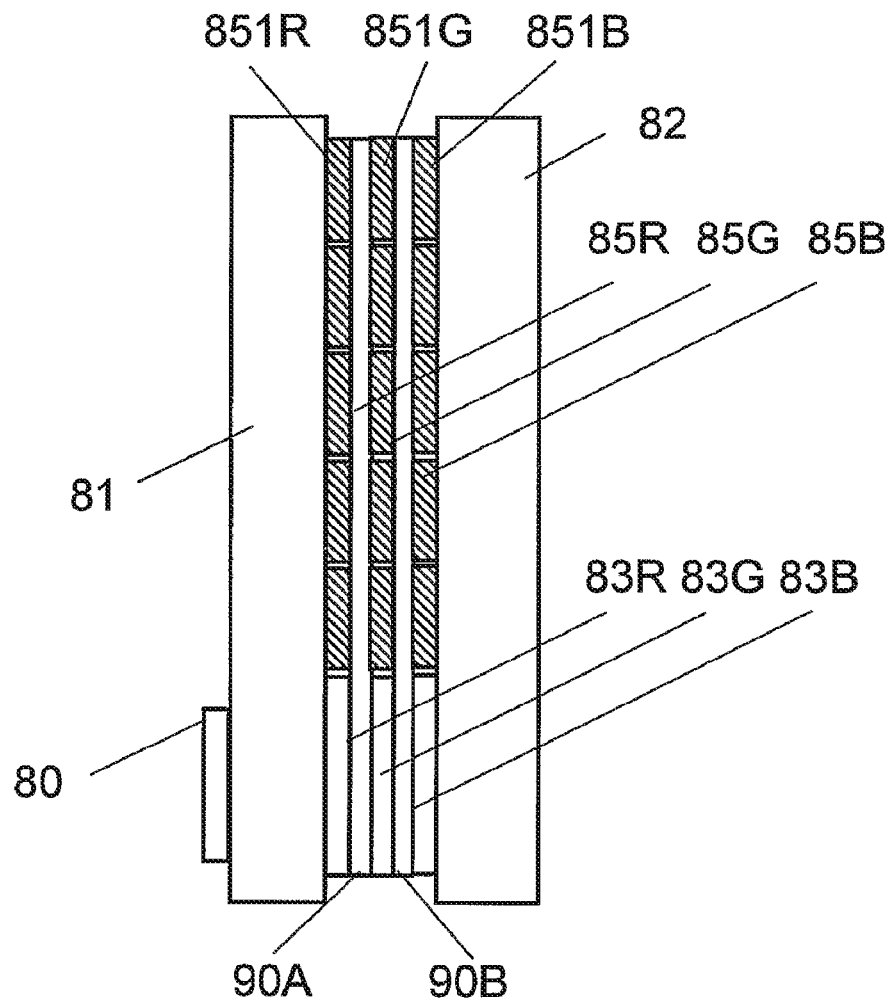
FIG. 55 is a schematic side elevation view of one embodiment of the invention providing a color edge lit scrolling illuminator.

The embodiments of FIGS. 51-54 are directed at monochromatic displays. In a further embodiment of the invention there is provided an edge lit color despeckler device. Essentially the device provides color sequential despeckling by stacking red green and blue-diffracting ESBG elements of the type illustrated in FIG. 52. Referring to the schematic side elevation view of FIG. 55 we see that the apparatus comprises first and second transparent substrates 81, 82 three ESBG layers 85A, 85B, 85C separated by transparent spacers 90A, 9B sandwiched between the substrates, a transparent region 83A, 83B, 83C adjacent to the ESBGs 85A, 85B, 85C respectively and a light-coupling element 80. The substrates, ESBGs spacers and the transparent regions together form a total internal reflection light guiding structure. The light-coupling optical element 80 provides a means for injecting light from a laser source, which is not illustrated into the device. The light-coupling element may be a DOE. Alternatively, the light-coupling device may be a prismatic element or an array of prismatic elements. The outer face of substrate 81, that is the face opposite to the one in contact with the ESBG provides a light output surface. Light emitted from the output surface may be used to illuminate a flat panel display. A complete illumination system will normally require additional elements such as relay lenses, prisms etc. which are not illustrated. The ray paths for each color through the embodiment of FIG. 55 are substantially the same as those illustrated in FIG. 52 and are not illustrated. It will be clear from consideration of FIG. 55 in relation to FIGS. 51-54 that any of the embodiments of FIG. 51-54 may be converted to color sequential despeckling device by stacking red green and blue diffracting ESBGs using the principles illustrated in FIG. 55.

Edge Lit Scrolling Despeckler Configurations

The edge lit ESBG despeckler devices discussed above may be configured to provide a scrolling display panel by patterning the ESBG electrodes to provide a set of selectively switchable ESBG stripes. The basic principles of patterning ESBG electrodes for scrolling are disclosed in the U.S. Provisional Patent Application Ser. No. 61/071,230 filed 18 Apr. 2008, entitled SCROLLING ILLUMINATOR and Ser. No. 61/071,229 filed 18 Apr. 2008, entitled SCROLLING FLAT PANEL DISPLAY. It is proposed that the ESBG despeckler device principles discussed in the present application may be with the scrolling displays concepts disclosed in the above patent applications to provide a transparent despeckled laser illuminator. In certain cases the above art may be used to provide a complete integrated display device.

A scrolling illumination scheme for use with the color display embodiment of FIG. 55 will now be discussed with reference to the embodiments of FIGS. 55-58.

Figure 56:
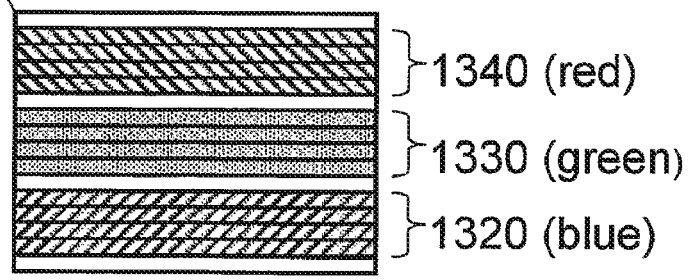
FIG. 56 is a schematic front elevation view of an aspect of a scrolling illuminator according to the principles of the invention.
Figure 57A:
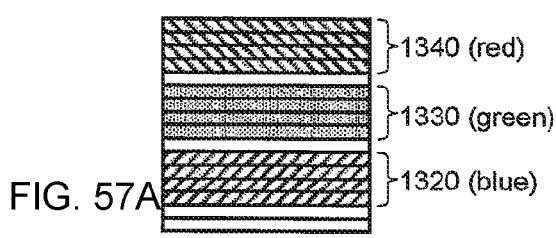
FIG. 57A-57C is a schematic front elevation view of an aspect of a scrolling illuminator according to the principles of the invention.
Figure 57B:
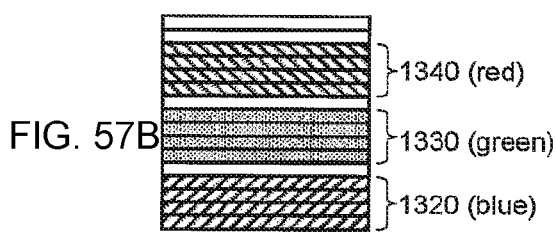
Figure 57C:
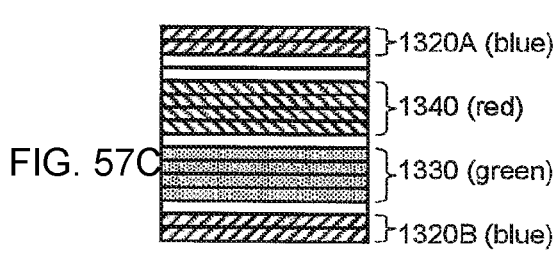

FIG. 56 shows a schematic plan view of the transparent electrodes within each of the ESBG layers. The electrodes are divided into a number of parallel sections or stripes that define a corresponding number of regions in the gratings that may be independently controlled. Sixteen stripes are shown in this illustrative example, but a different number of stripes may be used depending on the application. In the example shown in FIG. 56, region 1320 of ESBG 851B diffracts blue light. Similarly, region 1330 of ESBG 851G and region 1340 of ESBG 851R diffract green and red light, respectively, FIG. 57 illustrates one operational aspect of the transparent electrodes illustrated in FIG. 56. At an initial instant in time, as shown in FIG. 57A, red 1340, green 1330, and blue 1320 bands of light have been diffracted by means of selecting the appropriate regions of the three ESBG despeckler devices. The regions are selected by applying a suitable voltage to the transparent electrodes of regions where light extraction is not desired, and not applying a voltage where light extraction is desired. At a subsequent instant in time, as shown in FIG. 57B, the voltages applied to the ESBGs have been changed such that the three color bands have moved to a lower position. At a third instant in time, as shown in FIG. 58C, the voltages applied to the ESBGs have again been changed such that the extreme top 1320A and bottom 1320B portions are illuminated by blue light.

Figure 58A:
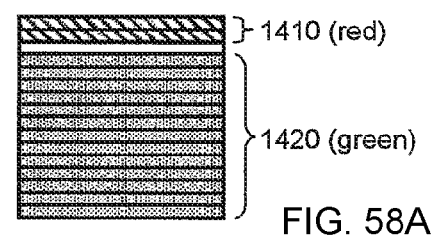
FIG. 58A-58C is a schematic front elevation view of an aspect of a scrolling illuminator according to the principles of the invention.
Figure 58B:
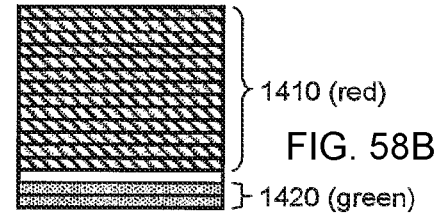
Figure 58C:
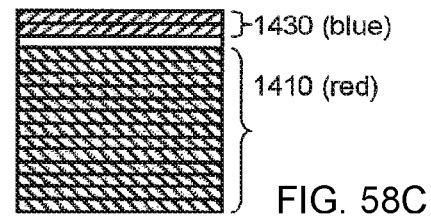
Figure 59:
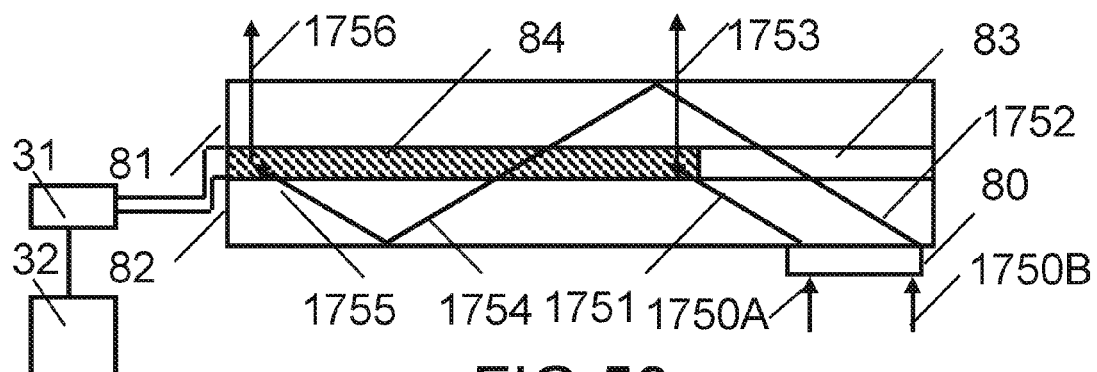
FIG. 59 is a schematic side elevation view of one embodiment of the invention providing an edge lit scrolling ESBG despeckler device.
Figure 60:
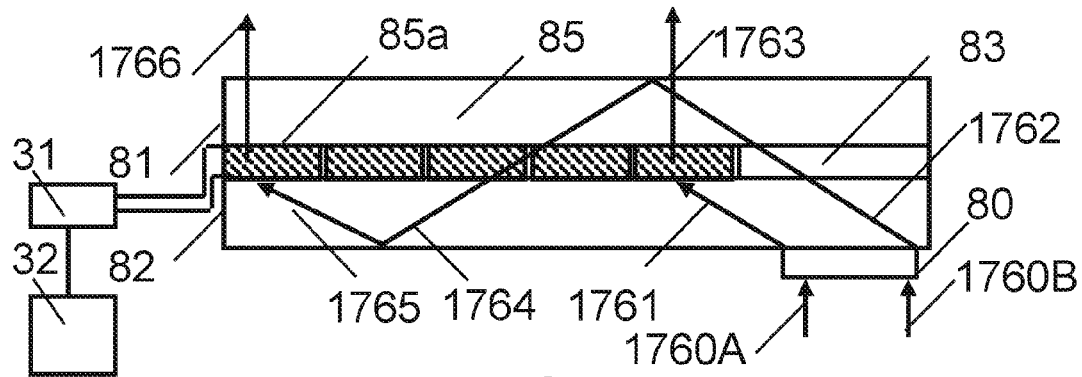
FIG. 60 is a schematic side elevation view of one embodiment of the invention providing an edge lit scrolling ESBG despeckler device.
Figure 61:
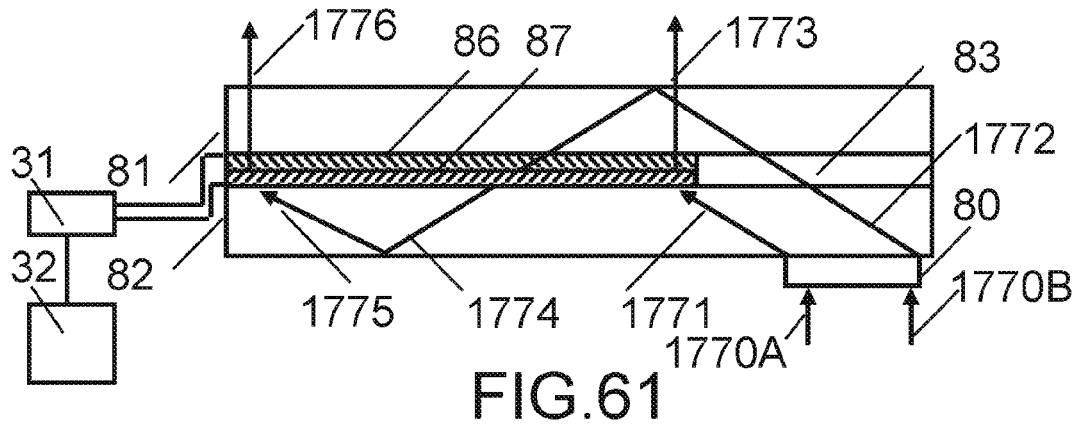
FIG. 61 is a schematic side elevation view of one embodiment of the invention providing an edge lit scrolling ESBG despeckler device.
Figure 62:
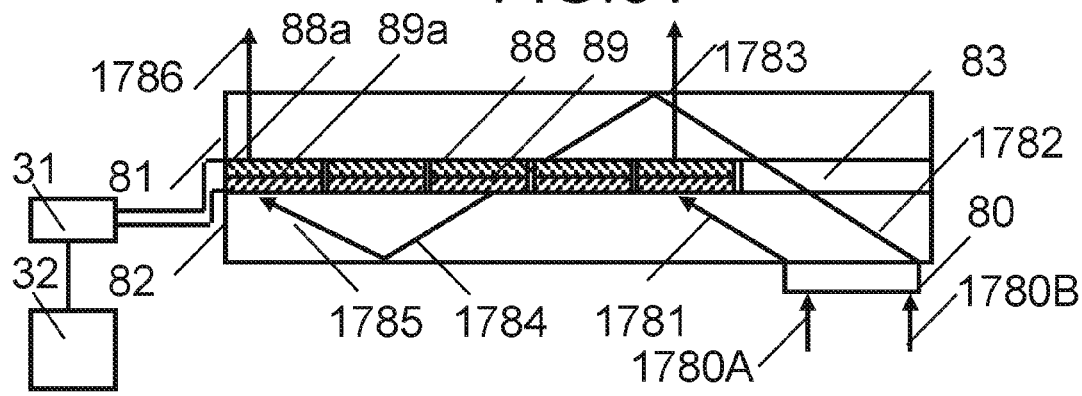
FIG. 62 is a schematic side elevation view of one embodiment of the invention providing an edge lit scrolling ESBG despeckler device.
Figure 63:
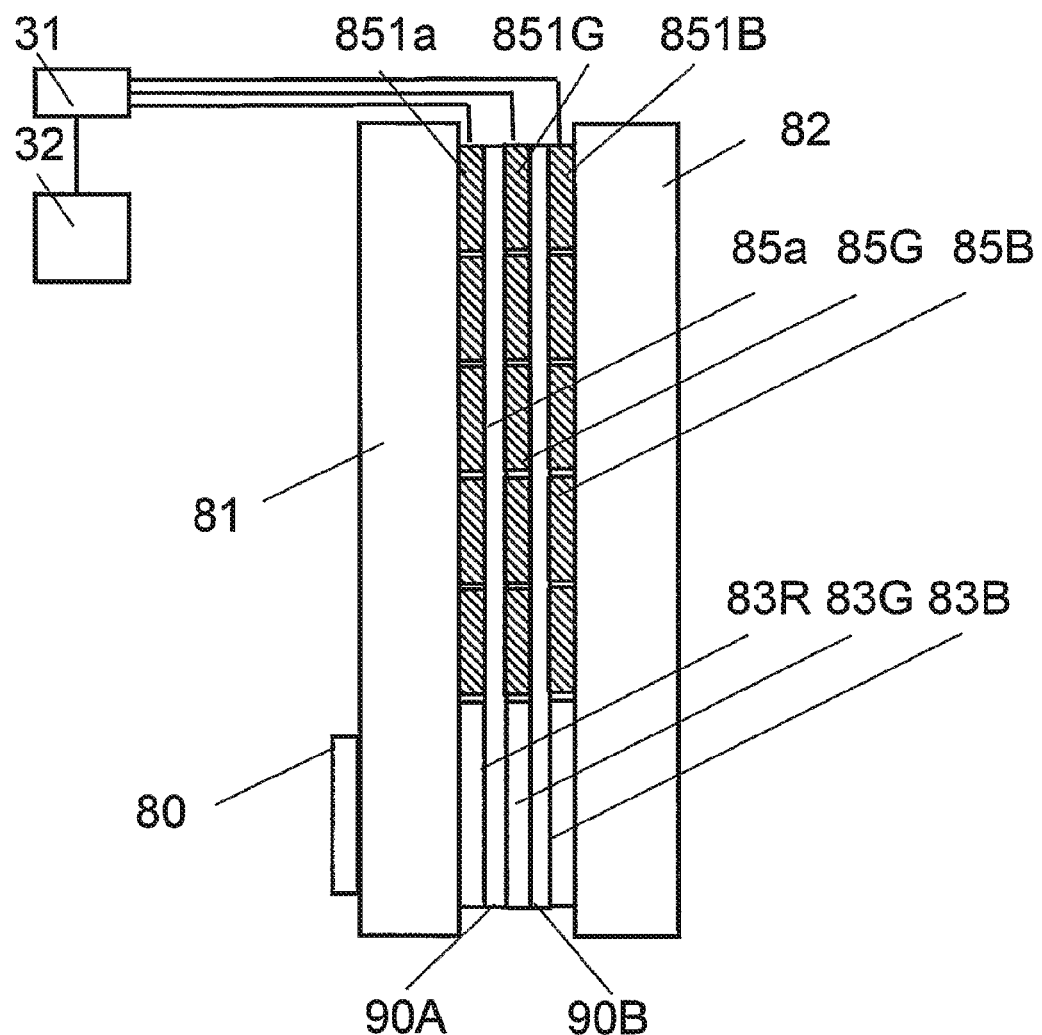
FIG. 63 is a schematic side elevation view of one embodiment of the invention providing a color edge lit scrolling ESBG despeckler device.

FIG. 58 illustrates another operational aspect of the transparent electrodes illustrated in FIG. 56. At an initial instant in time, as shown in FIG. 58A, the voltages applied to the ESBGs are selected such that green light 1420 is directed at the lower portion display device and red slight is directed towards the top portion of the display. At a subsequent instant in time, as shown in FIG. 58B, the transition from red 1410 to green 1420 has been moved, in sequential steps down the display. At a third instant in time, as shown in FIG. 58C, the voltages applied to the ESBGs are selected such that that red light 1410 is directed at the lower portion and blue light 1430 is directed towards the top portion of the ESBGs.

With respect to FIG. 57 and FIG. 58, it should be understood that other scanning sequences, including scanning multiple color bands, are possible within the scope of the invention. In all cases, the position of the color bands are moved in sequential steps by means of selecting the voltages applied to the three ESBG layers. It should also be understood that the switching of the bands must be done in synchronism with the writing of data such that the various areas of the display device display the appropriate information for the respective illumination color. Specifically, the information presented on a given row must be changed during the time interval after one color of illumination is removed and before the next illumination color is applied. Preferably, the different color bands are separated by a non-illuminated dark band to allow time to change the display content. It also must be understood that the entire sequence must be repeated at a sufficient rate that the viewer's eye mergers the sequential single-colored images into a composite full-color image.

Embodiments Providing a Combined Edge Lit Despeckler and Spatial Light Modulator It is known that the diffraction efficiency of an ESBG varies with the applied voltage. This property allows an ESBG to be used as a light modulator. An array of selectively switchable ESBG may therefore provide a spatial light modulator (SLM). The SLM may be used to display information eliminating the need for the separate flat panel display specified in the above described embodiments at the same time as providing the despeckling functions discussed above. Edge Lit color despeckler and spatial light modulator configurations based on the embodiments of FIGS. 51-55 are illustrated in FIGS. 59-63 respectively. Each of the embodiments of FIGS. 59-63 comprises identical optical components to those of FIGS. 51-55 respectively. In each case switching electronics and connecting wires are generally indicated by 31 and image generator electronics are generally indicated by 32.

Light Guide ESBG Despeckler Using Combined Phase and Angular Diversity

In one embodiment of the invention illustrates in the schematic plan view of FIG. 64A and the schematic side elevation view of FIG. 64B there is provided an edge illuminated despeckler. Referring to FIG. 64B we see that the edge-illuminated despeckler comprises first and second transparent substrates 81,82 and an ESBG element 86 sandwiched between the substrates, an input light-coupling element 87, and an output light coupling element 88. The substrates form a total internal reflection light guiding structure. A further trapezoidal light element 82 having inclined surface 83A, 83B is disposed adjacent substrate 82. Said trapezoidal element may be air separated from substrate 82. Patterned ITO electrodes are applied to the opposing surfaces of the substrates. The ESBG comprises separated ESBG regions such as 86A, 86B, 86C, 86D surrounded by clear PDLC a portion of which is indicated by regions such as the one indicated by 86.

Desirably, the clear PDLC region has a refractive index substantially the same as that of the substrates. The input light-coupling optical element provides a means for injecting light from a laser source, which is not illustrated into the device. The output light-coupling optical element provides a means for ejecting light from the light guide into an illumination path directed at a flat panel display. At least one of the coupling elements may be a DOE. Alternatively, at least one of the light-coupling elements may be a prismatic element or an array of prismatic elements. A complete illumination system will normally require additional elements such as relay lenses, prisms etc. which are not illustrated.

Input collimated laser light indicated by 1770 passes through the input light-coupling element 87 to provide the light 1771. When the ESBG element 86A is in an active state and the ESBG element 86B is in an inactive state the light 1771 is diffracted into the direction 1772. The diffraction angle is designed to exceed the substrate-to-air critical angle as determined by the refractive index of the substrates. The light 1772 is totally internally reflected into the direction 1773 passing through the ESBG elements 86B, 86C, 86D in sequence along a predetermined TIR path until said light is ejected from the light guide via the output coupling device 88. For the purposes of understanding the invention the output light-coupling device is assumed to be a diffractive optical element. Note that if the substrate 82 and the trapezoidal element 83 are not air separated the substrate will require a reflection coating to provide reflection of the light 1772. When the ESBG element 86A is not in an active state and the element 86B is in an active state the light 1771 passes through the ESBG element without deviation providing light 1775. The light 1775 is reflected at the surfaces 84A to provide the light 1776. The light 1776 is reflected at the surface 84B to provide the light 1777. The light 1777 is directed at the ESBG element 86B, which is now in an active state whereupon it is diffracted into said predetermined TIR path until said light is ejected from the light guide via the output-coupling device 88. Desirably the grating used to provide the output light coupler has a diffraction efficiency of at least 98%.

In one embodiment of the invention based on FIG. 64 the ESBG elements 86A, 86B each comprise an array of selectively switchable ESBG elements. The ESBG array provides an array of narrow beams or beamlets, separated by small angles. The beamlets have an average angle that is substantially normal to the plane of the ESBG array. Each ESBG array element may be a plane grating characterized by a unique grating vector or a grating vector selected from a set of predetermined grating vectors. The angles of separation of the beamlets are referred to as Inter Beamlet Angles (IBAs). In certain embodiments of the invention said ESBG elements might have optical power to control the IBA and individual beamlet divergence angles. The ESBG elements may encode further optical properties. For example, in further embodiments of the invention the ESBG elements may encode diffusing characteristics. In yet further embodiments of the invention the ESBG elements may encode keystone correction. The ESBG may be recorded using apparatus similar to that illustrated in FIG. 30.

In alternative embodiments of the invention based on FIG. 64 the ESBG elements 86A, 86B are configured such that each ESBG elements diffracts light incident at some specified launch angle into a direction normal to the surfaces of the ESBG elements as indicated in. Essentially, the ESBG elements 86A, 86B operate as Hadamard diffusers. Each ESBG 86A, 86B comprises an array of ESBG pixels that can be switched to provide random patterns. However, the second ESBG 86B is switched in such a way that it provides the binary inverse of the pattern provide by the first ESBG 86A. Typically the ESBG are pixelated to provide at least 10×10 arrays. Hence the ESBG elements 86A, 86B reduce speckle in the beam according to the principles of angular diversity.

The ESBG elements 86C, 86D are configured to operate as variable phase retarders according to the principles discussed above. For example the ESBG elements may be configured as variable sub wavelength gratings. Hence the ESBG elements 86C, 86D reduce speckle in the beam according to the principles of phase or polarization diversity. Advantageously the array elements of the ESBG 86A, 86B are offset by a fraction of the ESBG element width in at least one of the vertical or horizontal array axes.

The ESBG arrays 86A, 86B are driven in a random anti-phase fashion by means of an ESBG controller which is not illustrated. FIG. 48C is a chart showing voltage versus time applied to the ESBG 86A and 99B. To put it another way the ESBGs 86A, 86B are operated in tandem with alternating voltages 1001, 1002 applied across the ESBG layers. The optical effect of each ESBG is varied from zero to maximum value at a high frequency by applying an electric field that varies in a corresponding varying fashion. Each incremental change in the applied voltage results in a unique speckle phase cell. Referring to FIG. 48C it will be seen that there is a phase lag between the voltages 1001, 1002 applied across the ESBG. The effect of applying such waveforms is that the average intensity of the speckle phase cells remains substantially constant, thereby satisfying the statistical requirements for speckle reduction. Other types of waveforms may be applied, for example sinusoidal, triangular, rectangular or other types of regular waveforms. Alternatively, it may be advantageous in statistical terms to use waveforms based on a random stochastic process such as the waveforms 2001, 2002 illustrated in the chart of FIG. 48D.

Typically the length of the light guiding structure illustrated in FIG. 64 is 11 mm. The thickness of the light guiding structure formed by substrate 81, 82 as illustrated in FIG. 64B is 2.5 mm. The thickness of the trapezoidal light guiding element 83 as illustrated in FIG. 64B is 1.1 mm. The diameters of the light input and output coupling elements 87, 88 as illustrated in FIG. 64A are each typically 1 mm.

An additional DOE element which is not illustrated may be disposed in the illumination path near either the input or output light coupling elements to modify the intensity profile of the illumination light to generate a flat average intensity profile. The DOE element may be disposed at the output surface of the substrate 81. A further function of the DOE element could be to apply a predetermined amount of diffusion to the illumination light.

In further embodiments of the invention based on the embodiment illustrated in FIG. 64 may use any of the methods for providing patterned electrodes discussed above.

In further embodiments of the invention based on the embodiment illustrated in FIG. 64 the ESBG elements may be based on any of the phased diversity and angular diversity speckle reduction methods discussed in the present application.

FIG. 65 is a schematic illustration of an example of an illuminator using two ESBG arrays operating in random anti phase. The apparatus of FIG. 65 is similar to that of FIG. 64. However, in the apparatus of FIG. 65 only one beam reflection takes place within the light guiding structure. Therefore the elements 86D and 86D illustrated in FIG. 64 are not required. The ESBG 86A, 86B are pixelated as shown in FIG. 65C, each device comprising an ESBG array generally indicated by 750 containing pixels such as 751. The aperture defined by the input and output ports represented by 87 and 88 is indicated by 752.

It will be clear from the above description of the invention that the ESBG despeckler embodiment disclose here may be applied to the reduction of speckle in a wide range of laser displays including front and rear projection displays, wearable displays, scanned laser beam displays and transparent displays for use in viewfinders and HUDs.

In preferred practical embodiments of the invention the ESBG layers continued in an ESBG despeckler device would be combined in a single planar multilayer device. The multilayer ESBG despeckler devices may be constructed by first fabricating the separate ESBG and then laminating the ESBGs using an optical adhesive. Suitable adhesives are available from a number of sources, and techniques for bonding optical components are well known. The multilayer structures may also comprise additional transparent members, if needed, to control the optical properties of the illuminator.

The advantage of a solid-state approach is the resulting illumination patch can be tailored to provide any required shape. Mechanical devices such as rotating diffusers would normally only provide a circular illumination patch resulting in significant light loss.

The invention is not limited to any particular type of HPDLC or recipe for fabricating HPDLC. The HPDLC material currently used by the inventors typically switches at 170 us and restores at 320 us. The inventors believe that with further optimization the switching times may be reduced to 140 microseconds.

For the sake of simplicity most of the embodiments of the invention has been discussed with reference to monochromatic illumination. It will clear from the above discussion that the invention may be applied to illuminators using red, green and blue laser sources by providing separate ESBG layers for each color.

While the invention has been discussed with reference to single laser die or rectangular arrays of laser die, it should be emphasized that the principles of the invention apply to any configuration of laser die. The invention may be used with any type of laser device. For example the invention may be used with edge-emitting laser diodes, which emit coherent light or infrared energy parallel to the boundaries between the semiconductor layers. More recent technologies such as vertical cavity surface emitting laser (VCSEL) and the Novalux Extended Cavity Surface Emitting Laser (NEC-SEL) emit coherent energy within a cone perpendicular to the boundaries between the layers. The VCSEL emits a narrow, more nearly circular beam than traditional edge emitters, which makes it easier to extract energy from the device. The NECSEL benefits from an even narrower emission cone angle. Solid-state lasers emit in the infrared. Visible wavelengths are obtained by frequency doubling of the output. Solid-state lasers may be configured in arrays comprising as many as thirty to forty individual dies. The laser die are independently driven and would normally emit light simultaneously.

It should be emphasized that the Figures are exemplary and that the dimensions have been exaggerated. For example thicknesses of the ESBG layers have been greatly exaggerated.

The ESBGs may be based on any crystal material including nematic and chiral types.

In particular embodiments of the invention any of the ESBG arrays discussed above may be implemented using super twisted nematic (STN) liquid crystal materials. STN offers the benefits of pattern diversity and adoption of simpler process technology by eliminating the need for the dual ITO patterning process described earlier.

The invention may also be used in other applications such as optical telecommunications.

Although the invention has been described in relation to what are presently considered to be the most practical and preferred embodiments, it is to be understood that the invention is not limited to the disclosed arrangements, but rather is intended to cover various modifications and equivalent constructions included within the spirit and scope of the invention.

What is claimed is:

1. An ESBG despeckler apparatus comprising:
    a first ESBG element for diffracting a first polarization illumination light incident along an input path and transmitting a second polarization illumination light incident along said input path without substantial deviation;
    a second ESBG element for diffracting said first polarization light in a first direction into an output path and transmitting said second polarization light without substantial deviation into said output path;
    a first reflecting surface;
    a second reflecting surface; and
    a third reflecting surface,
    wherein, said first reflecting surface and said second reflecting surface reflecting second polarization light transmitted by said first ESBG element onto said second ESBG element in a direction parallel to said output path,
    said third reflecting surface reflecting first polarization light diffracted by said first ESBG element into said first direction onto said second ESBG element,
    each of said ESBG elements comprising at least one layer, at least one said ESBG element containing a layer comprising a multiplicity of ESBG pixels, and
    each said ESBG pixel having a first unique speckle state under a first applied voltage and a second unique speckle state under a second applied voltage.

2. The apparatus of claim 1 wherein said first ESBG and said second ESBG lie in a common plane parallel to said third reflecting surface and said first and second reflecting surfaces are symmetrically disposed about a normal to said plane.

3. The apparatus of claim 1 wherein said layers are sandwiched between upper and lower transparent substrates, transparent conductive coatings applied to each said substrate, and at least one of said coatings being patterned into independently addressable elements overlapping said pixels.

4. The apparatus of claim 1 wherein at least one of said first, second and third reflecting surfaces each include wavelength selective reflecting layers.

5. The apparatus of claim 1 wherein said first, second and third reflecting surfaces are disposed on faces of a polygonal refractive medium.

6. The apparatus of claim 1 wherein said first polarization is P-polarization and said second polarization is S-polarization.

7. The apparatus of claim 1 wherein said first and second speckle states occur during the integration time of a human eye.

8. The apparatus of claim 1 wherein said first unique speckle state corresponds to a first unique diffracting state of said ESBG pixel and said second unique speckle state corresponds to a second unique diffracting state of said ESBG pixel, wherein said first and second diffracting states have diffraction efficiencies having values in a range extending from zero to unity.

9. The apparatus of claim 1 wherein said first and second voltages are points on a time varying voltage characteristic.

10. The apparatus of claim 1 wherein at least one ESBG element contains ESBG pixels each having a unique grating vector.

11. The apparatus of claim 1 wherein at least one ESBG element contains ESBG pixels operative to alter the angular characteristics of incident light.

12. The apparatus of claim 1 wherein at least one ESBG element contains ESBG pixels with identical optical characteristics.

13. The apparatus of claim 1 wherein at least one ESBG element contains ESBG pixels with a first phase retarding characteristic under said first voltage and a second phase retarding characteristic under said second voltage.

14. The apparatus of claim 1 wherein at least one ESBG element contains ESBG pixels with a first light diffusing characteristic under said first voltage and a second light diffusing characteristic under said second voltage.

15. The apparatus of claim 1 wherein at least one ESBG element contains ESBG pixels with optical power.

16. The apparatus of claim 1 wherein said ESBG despeckler apparatus comprises identical first and second ESBG elements and waveforms applied to overlapping pixels of said first and second ESBG elements operate in anti-phase.

17. The apparatus of claim 1 wherein said ESBG despeckler apparatus comprises identical first and second ESBG elements and ESBG pixels from said first and second ESBG elements form an overlapping illumination beam cross section.

18. The apparatus of claim 1 wherein said first and second ESBG elements provide a two-dimensional array of independently switchable ESBG pixels forming a Hadamard diffuser.

19. The apparatus of claim 1 further comprising an external light source providing red, green and blue light, wherein at least one of the first and second ESBG elements comprise an ESBG optimized to diffract red, green and blue light.

20. The apparatus of claim 1 further comprising: a laser, a display panel, a projection lens and an image projection surface, cooperating with one another in an optical train.

* * * * *

UNITED STATES PATENT AND TRADEMARK OFFICE
CERTIFICATE OF CORRECTION

PATENT NO. : 9,465,227 B2  
APPLICATION NO. : 14/986287  
DATED : October 11, 2016  
INVENTOR(S) : Milan Momcilo Popovich, Jonathan David Waldern and John James Storey Page 1 of 1

It is certified that error appears in the above-identified patent and that said Letters Patent is hereby corrected as shown below:

Item (63) of Related U.S. Application Data should read:
"Continuation of U.S. Patent Application No. 14/056,081 filed October 17, 2013, now Patent 9,746,688 issued August 29, 2017, which is a continuation of U.S. Patent Application No. 13/549,868 filed July 16, 2012, now Patent 8,565,560 issued October 22, 2013, which is a continuation of U.S. Application No. 12/670,730 filed March 17, 2010, now Patent 8,224,133 issued July 17, 2012, which was filed as a 371 national phase of PCT/IB2008/001909 filed on July 22, 2008."

In Column 1, Lines 6-29, under CROSS-REFERENCE TO RELATED APPLICATIONS, please replace with the following:
This application is a continuation of U.S. Patent Application No. 14/056,081 filed October 17, 2013, now Patent 9,746,688 issued August 29, 2017, which is a continuation of U.S. Patent Application No. 13/549,868 filed July 16, 2012, now Patent 8,565,560 issued October 22, 2013, which is a continuation of U.S. Patent Application No. 12/670,730 filed March 17, 2010, now Patent 8,224,133 issued July 17, 2012, which is a U.S. National Phase of PCT Application No. PCT/IB2008/001909 filed on July 22, 2008, which claims the benefit of U.S. Provisional Patent Application No. 60/935,109 filed July 26, 2007 and Great Britain Application No. 0718706.5 filed September 25, 2007.

Signed and Sealed this  
Fourteenth Day of August, 2018

Andrei Iancu  
*Director of the United States Patent and Trademark Office*